(12) United States Patent
Huang et al.

(10) Patent No.: US 12,506,581 B2
(45) Date of Patent: Dec. 23, 2025

(54) ORBITAL ANGULAR MOMENTUM BASED CODEBOOK FOR ACCESS COMMUNICATIONS

(71) Applicant: QUALCOMM INCORPORATED, San Diego, CA (US)

(72) Inventors: Min Huang, Beijing (CN); Wanshi Chen, San Diego, CA (US); Peter Gaal, San Diego, CA (US); Chao Wei, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 18/696,271

(22) PCT Filed: Dec. 2, 2021

(86) PCT No.: PCT/CN2021/134947
§ 371 (c)(1),
(2) Date: Mar. 27, 2024

(87) PCT Pub. No.: WO2023/097588
PCT Pub. Date: Jun. 8, 2023

(65) Prior Publication Data
US 2025/0047445 A1    Feb. 6, 2025

(51) Int. Cl.
*H04L 5/00* (2006.01)
*H04B 7/06* (2006.01)
(52) U.S. Cl.
CPC ......... *H04L 5/0055* (2013.01); *H04B 7/0617* (2013.01)
(58) Field of Classification Search
CPC ............................ H04L 5/0055; H04B 7/0617
See application file for complete search history.

(56) References Cited

U.S. PATENT DOCUMENTS 11,974,263 B2 *  4/2024  Choi ........................ H04B 7/10
2019/0020434 A1  1/2019  Adachi et al.
(Continued)

FOREIGN PATENT DOCUMENTS

CN    112737714 A    4/2021
CN    113271280 A    8/2021
(Continued)

OTHER PUBLICATIONS

Supplementary European Search Report—EP21966021—Search Authority—Munich—Jun. 27, 2025.
(Continued)

*Primary Examiner* — Janice N Tieu
(74) *Attorney, Agent, or Firm* — Paul M. McAdams; Holland & Hart LLP

(57) ABSTRACT

Methods, systems, and devices for wireless communications are described. Feedback based codebooks for reducing or eliminating interference between orbital angular momentum (OAM) based backhaul communications between a first network node and a second network node and access communications between the first network node and a user equipment (UE) are described. The first network node may transmit a message to a UE indicating a feedback codebook for a set of reference signals associated with OAM modes. The first network node may transmit the reference signals, where each reference signals may be associated with a respective OAM mode. The UE may generate and indicate in a feedback report to the first network node codewords corresponding to UE feedback for the received reference signals. The first network node may communicate with the UE via an access link and with the second network node via a backhaul link based on the feedback report.

30 Claims, 24 Drawing Sheets

(56) References Cited

U.S. PATENT DOCUMENTS

| | | |
|---|---|---|
| 2020/0228195 A1 | 7/2020 | Sasaki et al. |
| 2020/0296599 A1 | 9/2020 | Sasaki et al. |
| 2022/0271806 A1 | 8/2022 | Zhu et al. |
| 2023/0093039 A1* | 3/2023 | Lv ........................ H04B 17/345 370/330 |
| 2023/0096819 A1* | 3/2023 | Ni ........................ H04B 7/0639 343/702 |

FOREIGN PATENT DOCUMENTS

| | | |
|---|---|---|
| WO | WO-2020262743 A1 | 12/2020 |
| WO | WO-2021093591 A1 | 5/2021 |

OTHER PUBLICATIONS

International Search Report and Written Opinion—PCT/CN2021/134947—ISA/EPO—Aug. 24, 2022.

* cited by examiner

ORBITAL ANGULAR MOMENTUM BASED CODEBOOK FOR ACCESS COMMUNICATIONS

CROSS REFERENCE

The present Application is a 371 national stage filing of International PCT Application No. PCT/CN2021/134947 by Huang et al. entitled "ORBITAL ANGULAR MOMENTUM BASED CODEBOOK FOR ACCESS COMMUNICATIONS," filed Dec. 2, 2021, which is assigned to the assignee hereof, and which is expressly incorporated by reference in its entirety herein.

FIELD OF TECHNOLOGY

The following relates to wireless communications, including orbital angular momentum based codebook for access communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support orbital angular momentum (OAM) based codebook for access communications. Generally, the described techniques provide for codebooks for reducing or eliminating interference between OAM based backhaul communications (e.g., between a first network node and a second network node) and access communications (e.g., between the first network node and a user equipment (UE)). According to aspects herein, the first network node may transmit a message indicating a configuration for a feedback codebook for a set of reference signals associated with one or more OAM modes for backhaul communications. The first network node may, additionally or alternatively, indicate one or more parameters associated with the feedback codebook. The one or more parameters may include a number of transmitter antennas, a number of OAM modes, a radius of a transmitter antenna array, a wavelength of the reference signals, or a combination thereof. The first network node may transmit the reference signals, each of which being associated with a respective OAM mode. The UE may measure the reference signals and generate feedback for the reference signals and the respective OAM modes, which may be indicated (e.g., in a feedback report) to the first network node via one or more codewords.

Based on the feedback report, the first network node may communicate with the UE via an access link and with the second network node via a backhaul link. For instance, the first network node may communicate with the UE using non-OAM beamformed signals, and the one or more codewords may be associated with reducing interference between OAM beamformed signals used for backhaul communications and the non-OAM beamformed signals used for the access communications. For example, the UE may report a number of non-dominant eigenvectors associated with reducing interference at the UE. In some cases, the number of non-dominant eigenvectors may be the same as the number of data streams used for the backhaul communications.

Additionally, or alternatively, the first network node may communicate with the UE via OAM beamformed signals, where the OAM beamformed signals used for the access communications are different OAM modes (e.g., −2, 2) than the OAM modes for OAM beamformed signals used for the backhaul communications (e.g., 1, −1). Due to the inter-mode orthogonality at the OAM receiver for backhaul communications (e.g., the second network node), the backhaul OAM beamformed signals may not be interfered with by the access OAM beamformed signals of a different mode. In such instances, the first network node may use the codewords reported by the UE to enhance access communications between the first network node and the UE. For example, the UE may report a number of dominant eigenvectors for enhancing access communications, and the number of dominant eigenvectors may be the same as the number of data streams used for the access communications.

A method for wireless communications at a UE is described. The method may include receiving, from a network node, a message indicating a configuration for a feedback codebook for a set of multiple reference signals associated with one or more orbital angular momentum modes for backhaul communications associated with the network node, receiving, from the network node, the set of multiple reference signals, each of the set of multiple reference signals associated with a respective orbital angular momentum mode of the one or more orbital angular momentum modes for the backhaul communications associated with the network node, and transmitting, to the network node and based on the configuration for the feedback codebook, a feedback report indicating one or more codewords corresponding to UE feedback for the received set of multiple reference signals and the respective orbital angular momentum modes.

An apparatus for wireless communications at a UE is described. The apparatus may include a processor, memory coupled with the processor, and instructions stored in the memory. The instructions may be executable by the processor to cause the apparatus to receive, from a network node, a message indicating a configuration for a feedback codebook for a set of multiple reference signals associated with one or more orbital angular momentum modes for backhaul communications associated with the network node, receive, from the network node, the set of multiple reference signals, each of the set of multiple reference signals associated with a respective orbital angular momentum mode of the one or more orbital angular momentum modes for the backhaul communications associated with the network node, and transmit, to the network node and based on the configuration for the feedback codebook, a feedback report indicating one or more codewords corresponding to UE feedback for the received set of multiple reference signals and the respective orbital angular momentum modes.

Another apparatus for wireless communications at a UE is described. The apparatus may include means for receiving, from a network node, a message indicating a configuration for a feedback codebook for a set of multiple reference signals associated with one or more orbital angular momentum modes for backhaul communications associated with the network node, means for receiving, from the network node, the set of multiple reference signals, each of the set of multiple reference signals associated with a respective orbital angular momentum mode of the one or more orbital angular momentum modes for the backhaul communications associated with the network node, and means for transmitting, to the network node and based on the configuration for the feedback codebook, a feedback report indicating one or more codewords corresponding to UE feedback for the received set of multiple reference signals and the respective orbital angular momentum modes.

A non-transitory computer-readable medium storing code for wireless communications at a UE is described. The code may include instructions executable by a processor to receive, from a network node, a message indicating a configuration for a feedback codebook for a set of multiple reference signals associated with one or more orbital angular momentum modes for backhaul communications associated with the network node, receive, from the network node, the set of multiple reference signals, each of the set of multiple reference signals associated with a respective orbital angular momentum mode of the one or more orbital angular momentum modes for the backhaul communications associated with the network node, and transmit, to the network node and based on the configuration for the feedback codebook, a feedback report indicating one or more codewords corresponding to UE feedback for the received set of multiple reference signals and the respective orbital angular momentum modes.

In some examples of the method, apparatuses, and non-transitory computer-readable medium described herein, transmitting the feedback report may include operations, features, means, or instructions for transmitting an indication of channel state information of an access link between the UE and the network node based on the received set of multiple reference signals.

In some examples of the method, apparatuses, and non-transitory computer-readable medium described herein, the one or more codewords may be associated with a reduction in interference the one or more orbital angular momentum modes associated with the backhaul communications for the network node to the access link.

In some examples of the method, apparatuses, and non-transitory computer-readable medium described herein, the one or more codewords may be associated with a first number of non-dominant eigenvectors of a channel response matrix associated with the set of multiple reference signals.

In some examples of the method, apparatuses, and non-transitory computer-readable medium described herein, the first number of non-dominant eigenvectors may be equal to a second number of data streams associated with the backhaul communications.

In some examples of the method, apparatuses, and non-transitory computer-readable medium described herein, transmitting the feedback report may include operations, features, means, or instructions for transmitting an indication of a third number of data streams associated with the access link based on the first number of non-dominant eigenvectors and the second number of data streams associated with the backhaul communications.

In some examples of the method, apparatuses, and non-transitory computer-readable medium described herein, transmitting the feedback report may include operations, features, means, or instructions for transmitting the feedback report indicating the one or more codewords associated with the first number of non-dominant eigenvectors corresponding to a wideband channel associated with the set of multiple reference signals.

In some examples of the method, apparatuses, and non-transitory computer-readable medium described herein, transmitting the feedback report may include operations, features, means, or instructions for transmitting the feedback report indicating the one or more codewords associated with the first number of non-dominant eigenvectors per sub-band associated with the set of multiple reference signals.

Some examples of the method, apparatuses, and non-transitory computer-readable medium described herein may further include operations, features, means, or instructions for communicating with the network node based on the feedback report.

In some examples of the method, apparatuses, and non-transitory computer-readable medium described herein, communicating with the network node may include operations, features, means, or instructions for receiving one or more non-orbital angular momentum beamformed data signals from the network node via the access link.

In some examples of the method, apparatuses, and non-transitory computer-readable medium described herein, receiving one or more non-orbital angular momentum beamformed data signals from the network node via the access link may include operations, features, means, or instructions for receiving, from the network node, a physical downlink shared channel message based on a quasi co-location information, where the quasi co-location information indicates an interference by the one or more codewords.

In some examples of the method, apparatuses, and non-transitory computer-readable medium described herein, communicating with the network node may include operations, features, means, or instructions for receiving orbital angular momentum beamformed data signals of a set of orbital angular momentum beamformed data signals via the access link, where each of the set of orbital angular momentum beamformed data signals may be associated with a respective orbital angular momentum mode of the one or more orbital angular momentum modes.

In some examples of the method, apparatuses, and non-transitory computer-readable medium described herein, the orbital angular momentum modes associated with the orbital angular momentum beamformed data signals received via the access link may be different from orbital angular momentum modes associated with orbital angular momentum beamformed data signals received via a backhaul link.

In some examples of the method, apparatuses, and non-transitory computer-readable medium described herein, transmitting the feedback report may include operations, features, means, or instructions for transmitting an indication of a first number of data streams associated with the access link, where the one or more codewords include a second number of dominant eigenvectors of a channel response matrix associated with the set of multiple reference signals, where the second number of dominant eigenvectors may be equal to the first number of data streams.

In some examples of the method, apparatuses, and non-transitory computer-readable medium described herein, transmitting the feedback report may include operations, features, means, or instructions for transmitting the feedback report indicating the one or more codewords including the second number of dominant eigenvectors corresponding to a wideband channel associated with the set of multiple reference signals.

In some examples of the method, apparatuses, and non-transitory computer-readable medium described herein, transmitting the feedback report may include operations, features, means, or instructions for transmitting the feedback report indicating the one or more codewords including the second number of dominant eigenvectors per sub-band associated with the set of multiple reference signals.

Some examples of the method, apparatuses, and non-transitory computer-readable medium described herein may further include operations, features, means, or instructions for communicating with the network node based on the orbital angular momentum modes associated with the orbital angular momentum beamformed data signals received via the access link, where at least one of the orbital angular momentum modes associated with the orbital angular momentum beamformed data signals received via the access link may be associated with an orthogonal frequency division modulation waveform.

In some examples of the method, apparatuses, and non-transitory computer-readable medium described herein, the one or more codewords may be associated with data streams of the orbital angular momentum modes associated with the orbital angular momentum beamformed data signals received via the access link and the orthogonal frequency division modulation waveform.

Some examples of the method, apparatuses, and non-transitory computer-readable medium described herein may further include operations, features, means, or instructions for receiving, with the message, one or more parameters associated with the feedback codebook, the one or more parameters including a number of transmitter antennas, a set of orbital angular momentum modes, a radius of a transmitter antenna array of the network node, a wavelength associated with the backhaul communications, or a combination thereof and generating the one or more codewords based on the one or more parameters.

Some examples of the method, apparatuses, and non-transitory computer-readable medium described herein may further include operations, features, means, or instructions for receiving, with the message, at least one of a maximum number of data streams in access link or a number of data streams in backhaul link.

In some examples of the method, apparatuses, and non-transitory computer-readable medium described herein, the one or more codewords may be based on a first angle between a first possible direction of the UE and a transmission panel boresight direction of the network node, a second angle between a projection of a second possible direction of the UE onto a transmission panel of the network node and an x-axis direction of the transmission panel of the network node, a radius of a transmitter antenna array of the network node, a wavelength associated with the backhaul communications, and an orbital angular momentum mode.

In some examples of the method, apparatuses, and non-transitory computer-readable medium described herein, the one or more codewords may be based on one or more Bessel functions, input values of the one or more Bessel functions include at least one of an angle between a first possible direction of the UE and a transmission panel boresight direction of the network node, a radius of a transmitter antenna array of the network node, and a wavelength associated with the backhaul communications, and orders of the one or more Bessel functions may be equal to orders of the one or more orbital angular momentum modes for the backhaul communications.

In some examples of the method, apparatuses, and non-transitory computer-readable medium described herein, the feedback codebook may be based on a quantization of an angle between a first possible direction of the UE and a transmission panel boresight direction of the network node and the quantization of the angle between a projection of a second possible direction of the UE onto a transmission panel of the network node and an x-axis direction of the transmission panel of the network node.

A method for wireless communications at a first network node is described. The method may include transmitting, to a UE, a message indicating a configuration for a feedback codebook for a set of multiple reference signals associated with one or more orbital angular momentum modes for backhaul communications associated with the first network node, transmitting, to the UE, the set of multiple reference signals, each of the set of multiple reference signals associated with a respective orbital angular momentum mode of the one or more orbital angular momentum modes, where the one or more orbital angular momentum modes are associated with the backhaul communications between the first network node and a second network node, receiving, from the UE and based on the configuration for the feedback codebook, a feedback report indicating one or more codewords corresponding to UE feedback for the transmitted set of multiple reference signals and the respective orbital angular momentum modes, and communicating with the UE, the second network node, or both based on the feedback report.

An apparatus for wireless communications at a first network node is described. The apparatus may include a processor, memory coupled with the processor, and instructions stored in the memory. The instructions may be executable by the processor to cause the apparatus to transmit, to a UE, a message indicating a configuration for a feedback codebook for a set of multiple reference signals associated with one or more orbital angular momentum modes for backhaul communications associated with the first network node, transmit, to the UE, the set of multiple reference signals, each of the set of multiple reference signals associated with a respective orbital angular momentum mode of the one or more orbital angular momentum modes, where the one or more orbital angular momentum modes are associated with the backhaul communications between the first network node and a second network node, receive, from the UE and based on the configuration for the feedback codebook, a feedback report indicating one or more codewords corresponding to UE feedback for the transmitted set of multiple reference signals and the respective orbital angular momentum modes, and communicate with the UE, the second network node, or both based on the feedback report.

Another apparatus for wireless communications at a first network node is described. The apparatus may include means for transmitting, to a UE, a message indicating a configuration for a feedback codebook for a set of multiple reference signals associated with one or more orbital angular momentum modes for backhaul communications associated with the first network node, means for transmitting, to the UE, the set of multiple reference signals, each of the set of multiple reference signals associated with a respective orbital angular momentum mode of the one or more orbital angular momentum modes, where the one or more orbital angular momentum modes are associated with the backhaul communications between the first network node and a second network node, means for receiving, from the UE and based on the configuration for the feedback codebook, a feedback report indicating one or more codewords corresponding to UE feedback for the transmitted set of multiple reference signals and the respective orbital angular momentum modes, and means for communicating with the UE, the second network node, or both based on the feedback report.

A non-transitory computer-readable medium storing code for wireless communications at a first network node is described. The code may include instructions executable by a processor to transmit, to a UE, a message indicating a configuration for a feedback codebook for a set of multiple reference signals associated with one or more orbital angular momentum modes for backhaul communications associated with the first network node, transmit, to the UE, the set of multiple reference signals, each of the set of multiple reference signals associated with a respective orbital angular momentum mode of the one or more orbital angular momentum modes, where the one or more orbital angular momentum modes are associated with the backhaul communications between the first network node and a second network node, receive, from the UE and based on the configuration for the feedback codebook, a feedback report indicating one or more codewords corresponding to UE feedback for the transmitted set of multiple reference signals and the respective orbital angular momentum modes, and communicate with the UE, the second network node, or both based on the feedback report.

In some examples of the method, apparatuses, and non-transitory computer-readable medium described herein, receiving the feedback report may include operations, features, means, or instructions for receiving an indication of channel state information of an access link between the UE and the first network node based on the transmitted set of multiple reference signals.

In some examples of the method, apparatuses, and non-transitory computer-readable medium described herein, the one or more codewords may be associated with a reduction in interference the one or more orbital angular momentum modes associated with the backhaul communications for the first network node to the access link.

In some examples of the method, apparatuses, and non-transitory computer-readable medium described herein, the one or more codewords may be associated with a first number of non-dominant eigenvectors of a channel response matrix associated with the set of multiple reference signals.

In some examples of the method, apparatuses, and non-transitory computer-readable medium described herein, the first number of non-dominant eigenvectors may be equal to a second number of data streams associated with the backhaul communications.

In some examples of the method, apparatuses, and non-transitory computer-readable medium described herein, receiving the feedback report may include operations, features, means, or instructions for receiving an indication of a third number of data streams associated with the access link based on the first number of non-dominant eigenvectors and the second number of data streams associated with the backhaul communications.

In some examples of the method, apparatuses, and non-transitory computer-readable medium described herein, receiving the feedback report may include operations, features, means, or instructions for receiving the feedback report indicating the one or more codewords associated with the first number of non-dominant eigenvectors corresponding to a wideband channel associated with the set of multiple reference signals.

In some examples of the method, apparatuses, and non-transitory computer-readable medium described herein, receiving the feedback report may include operations, features, means, or instructions for receiving the feedback report indicating the one or more codewords associated with the first number of non-dominant eigenvectors per sub-band associated with the set of multiple reference signals.

In some examples of the method, apparatuses, and non-transitory computer-readable medium described herein, communicating with the UE may include operations, features, means, or instructions for transmitting one or more non-orbital angular momentum beamformed data signals to the UE via the access link.

In some examples of the method, apparatuses, and non-transitory computer-readable medium described herein, transmitting one or more non-orbital angular momentum beamformed data signals from the first network node via the access link may include operations, features, means, or instructions for transmitting a physical downlink shared channel message based on a quasi co-location information, where the quasi co-location information indicates an interference by the one or more codewords.

In some examples of the method, apparatuses, and non-transitory computer-readable medium described herein, communicating with the UE may include operations, features, means, or instructions for transmitting orbital angular momentum beamformed data signals of a set of orbital angular momentum beamformed data signals via the access link, where each of the set of orbital angular momentum beamformed data signals may be associated with a respective orbital angular momentum mode of the one or more orbital angular momentum modes.

In some examples of the method, apparatuses, and non-transitory computer-readable medium described herein, the orbital angular momentum modes associated with the orbital angular momentum beamformed data signals received via the access link may be different from orbital angular momentum modes associated with orbital angular momentum beamformed data signals received via a backhaul link.

In some examples of the method, apparatuses, and non-transitory computer-readable medium described herein, receiving the feedback report may include operations, features, means, or instructions for receiving an indication of a first number of data streams associated with the access link, where the one or more codewords include a second number of dominant eigenvectors of a channel response matrix associated with the set of multiple reference signals, where the second number of dominant eigenvectors may be equal to the first number of data streams.

In some examples of the method, apparatuses, and non-transitory computer-readable medium described herein, receiving the feedback report may include operations, features, means, or instructions for receiving the feedback report indicating the one or more codewords including the second number of dominant eigenvectors corresponding to a wideband channel associated with the set of multiple reference signals.

In some examples of the method, apparatuses, and non-transitory computer-readable medium described herein, receiving the feedback report may include operations, features, means, or instructions for receiving the feedback report indicating the one or more codewords including the second number of dominant eigenvectors per sub-band associated with the set of multiple reference signals.

In some examples of the method, apparatuses, and non-transitory computer-readable medium described herein, communicating with the UE may include operations, features, means, or instructions for communicating with the UE based on the orbital angular momentum modes associated with the orbital angular momentum beamformed data signals received via the access link, where at least one of the orbital angular momentum modes associated with the orbital angular momentum beamformed data signals received via the access link may be associated with an orthogonal frequency division modulation waveform.

In some examples of the method, apparatuses, and non-transitory computer-readable medium described herein, the one or more codewords may be associated with data streams of the orbital angular momentum modes associated with the orbital angular momentum beamformed data signals received via the access link and the orthogonal frequency division modulation waveform.

Some examples of the method, apparatuses, and non-transitory computer-readable medium described herein may further include operations, features, means, or instructions for transmitting, with the message, one or more parameters associated with the feedback codebook, the one or more parameters including a number of transmitter antennas, a set of orbital angular momentum modes, a radius of a transmitter antenna array of the first network node, a wavelength associated with the backhaul communications, or a combination thereof.

Some examples of the method, apparatuses, and non-transitory computer-readable medium described herein may further include operations, features, means, or instructions for transmitting, with the message, at least one of a maximum number of data streams in an access link or a number of data streams in a backhaul link.

In some examples of the method, apparatuses, and non-transitory computer-readable medium described herein, the one or more codewords may be based on a first angle between a first possible direction of the UE and a transmission panel boresight direction of the first network node, a second angle between a projection of a possible direction of the UE onto a transmission panel of the first network node and an x-axis direction of the transmission panel of the first network node, a radius of a transmitter antenna array of the first network node, a wavelength associated with the backhaul communications, and an orbital angular momentum mode.

In some examples of the method, apparatuses, and non-transitory computer-readable medium described herein, the one or more codewords may be based on one or more Bessel functions, input values of the one or more Bessel functions include at least one of an angle between a first possible direction of the UE and a transmission panel boresight direction of the first network node, a radius of a transmitter antenna array of the first network node, and a wavelength associated with the backhaul communications, and orders of the one or more Bessel functions may be equal to orders of the one or more orbital angular momentum modes for the backhaul communications.

In some examples of the method, apparatuses, and non-transitory computer-readable medium described herein, the feedback codebook may be based on a quantization of an angle between a first possible direction of the UE and a transmission panel boresight direction of the first network node and the quantization of the angle between a projection of a possible direction of the UE onto a transmission panel of the first network node and an x-axis direction of the transmission panel of the first network node.

DETAILED DESCRIPTION

Figure 1:
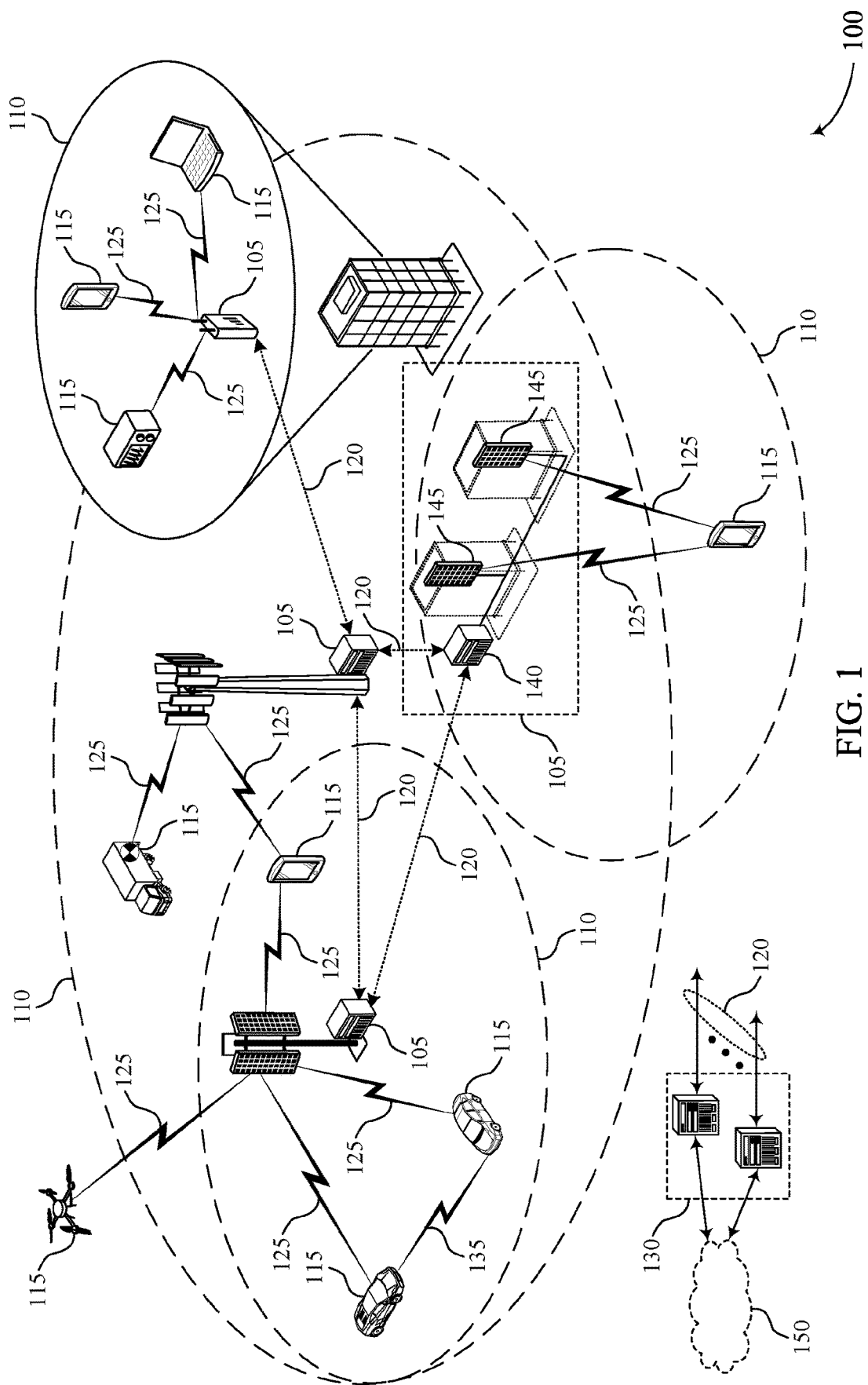
FIG. 1 illustrates an example of a wireless communications system that supports orbital angular momentum (OAM) based codebook for access communications in accordance with aspects of the present disclosure.

In some wireless communications systems, wireless devices (which may also be referred to as network nodes), such as base stations or user equipments (UEs), or both, may communicate directionally, for example, using beams to direct communication signals over one or more directions. In some systems, such as in orbital angular momentum (OAM)-capable communications systems, the wireless devices may communicate using OAM beams, which, in addition to providing signal directionality, may also provide additional dimensions for signal multiplexing. In some aspects, for example, such additional dimensions may include an OAM state, a polarization, or both, where OAM beams with different OAM states, polarizations, or both may be orthogonal to each other. As such, OAM beams with different OAM states or polarizations may be multiplexed together to increase the capacity of an OAM link. In some cases, a wireless device may use spiral phase plate (SPP) or uniform circular array (UCA)-based methodologies to generate OAM beams.

In some cases, a first network node (e.g., a base station or an integrated access and backhaul (IAB) node) at a first location (e.g., fixed location) may communicate with a second network node (e.g., another base station, IAB node, or relay node) at a second location (e.g., fixed location) via a backhaul link. The first network node and the second network node may use OAM beams to communicate via the backhaul link. The first network node may also communicate with a wireless device such as a UE via an access link. In some cases, OAM beams used to communicate between the first network node and the second network node via the backhaul link may cause interference with communications transmitted via the access link between the first network node and the UE.

The present disclosure relates to codebooks for reducing or eliminating interference between OAM based backhaul communications between a first network node and a second network node and access communications between the first network node and a UE. The first network node may transmit a message indicating a configuration for a feedback codebook for a set of reference signals associated with one or more OAM modes. The first network node may also indicate one or more parameters associated with the feedback codebook, the one or more parameters may include a number of transmitter antennas, a number of OAM modes, a radius of a transmitter antenna array, a wavelength of the reference signals, or a combination thereof. The first network node may transmit the plurality of reference signals, where each of the plurality of reference signals may be associated with a respective OAM mode of the one or more OAM modes, and where the one or more OAM modes are associated with backhaul communications between the first network node and a second network node. The UE may generate and indicate in a feedback report to the first network node one or more codewords corresponding to UE feedback for the received plurality of reference signals and the respective OAM modes. The first network node may communicate with the UE via an access link and with the second network node via a backhaul link based on the feedback report.

In some examples, the first network node may communicate with the UE via non-OAM beamformed signals, and the one or more codewords may be associated with reducing interference between the OAM beamformed signals used for backhaul communications and the non-OAM beamformed signals used for the access communications. For example, the UE may report a number of non-dominant eigenvectors, where the number of non-dominant eigenvectors may be equal to the number of data streams used for the backhaul communications.

In some examples, the first network node may communicate with the UE via OAM beamformed signals, where the OAM beamformed signals used for the access communications are at different modes (e.g., −2, 2) than the OAM beamformed signals used for the backhaul communications (e.g., 1, −1). Due to the inter-mode orthogonality at the OAM receiver, the backhaul OAM beamformed signals may not be interfered with by the access OAM beamformed signals of a different mode. The first network node may use the codewords reported by the UE to enhance the access communications. For example, the UE may report a number of dominant eigenvectors, where the number of dominant eigenvectors may be equal to the number of data streams used for the access communications.

Aspects of the disclosure are initially described in the context of wireless communications systems. Aspects of the disclosure are also described in the context of OAM configurations, system diagrams, precoding schemes, and process flows. Aspects of the disclosure are further illustrated by and described with reference to apparatus diagrams, system diagrams, and flowcharts that relate to OAM based codebook for access communications.

FIG. 1 illustrates an example of a wireless communications system 100 that supports OAM based codebook for access communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, a first network node (e.g., a base station 105 or an IAB node) at a first fixed location may communicate with a second network node (e.g., another base station 105, IAB node, or relay node) at a second fixed location via a backhaul link 120. The first network node and the second network node may use OAM beams to communicate via the backhaul link 120.

The OAM of electromagnetic waves may be different than spin angular momentum (SAM) of electromagnetic waves, and both may contribute to the overall angular momentum of an electromagnetic wave as defined by Equation 1, shown below.

$$J = \int\int\int r \times S \, dxdydz = \Sigma + L \quad (1)$$

As shown in Equation 1, J is equal to the angular momentum of the electromagnetic wave, r is a position vector, S=E×H and is equal to the Poynting flux, where E is equal to the electric field vector and H is equal to the magnetic field's auxiliary field vector, $\Sigma$ is equal to the SAM of the electromagnetic wave (and is sometimes alternatively denoted as S), and L is equal to the OAM of the electromagnetic wave. In some cases, the SAM of the electromagnetic wave may be associated with a polarization of the electromagnetic wave. For example, the electromagnetic wave may be associated with different polarizations (e.g., circular polarizations), such as left and right. Accordingly, the SAM of the electromagnetic wave may have multiple (e.g., two) degrees of freedom.

Further, the electromagnetic wave may have two polarizations, either two linear polarizations (e.g., one horizontal and one vertical) or circular and elliptical polarizations (e.g., clockwise and counter-clockwise). Polarization corresponds to SAM as opposed to OAM, and as such SAM and OAM may be two independent properties of an electromagnet wave. The techniques described herein, which support both OAM and polarizations may increase (e.g., double) the number of streams capable of being multiplexed using MIMO.

OAM-based electromagnetic waveforms may be variants of Gaussian beams, as described by the Laguerre-Gaussian modes and waveforms shown below in Equation 2.

$$u_{l,p} = \sqrt{\frac{2p!}{\pi(p+|l|)!}} \frac{1}{w(z)} \left(\frac{p\sqrt{2}}{w(z)}\right)^{|l|} \exp\left(\frac{-p^2}{w^2(z)}\right) L_p^{|l|}\left(\frac{2p^2}{w^2(z)}\right) e^{il\Phi} \times \quad (2)$$
$$\exp\left(-ik\frac{p^2 z}{2(z_R^2+z^2)}\right) \exp\left[-i(2p+|l|+1)\tan^{-1}\left(\frac{z}{z_R}\right)\right]$$

The Laguerre-Gaussian modes shown in Equation 2 may include cylindrical polar coordinates (e.g., $\rho$, $\varphi$, and z), where $L_p^{|l|}$ is an associated Laguerre polynomial, $z_R$ is a Rayleigh range (e.g., a measure of the tightness of the focus) equivalent to the term $$\frac{kw^2(0)}{2}, \text{ and } w(z) = w(0)\sqrt{1 + \frac{z^2}{z_R^2}}$$

is the beam width. In addition, the azimuth phase term (e.g., $e^{il\varnothing}$) may provide a link to OAM based on electromagnetic wave theory and quantum mechanics. In some cases, a situation may arise for a transmitter based on a specific criterion (e.g., z=0). In such cases, the Laguerre-Gaussian modes may be represented by a different equation, shown below in Equation 3.

$$u_{l,p} \propto p^{|l|} \exp\left(-p^2\right) L_p^{|l|}\left(\frac{2p^2}{w^2(0)}\right) e^{il\varphi} \quad (3)$$

The OAM waveforms, which may also be referred to as Hermite Gaussian waveforms or Laguerre-Gaussian waveforms, may form a set of complete and orthonormal basis, such that a channel between a transmitter and a receiver may correspond to multiple independent parallel channels, each of which may correspond to a respective OAM waveform indexed by (l,p). In some examples, OAM waveforms may be derived from a combination of Sturm-Liouville theory (in which the polar OAM waveform is assumed to be separable) and a polynomial expansion. OAM waveform derivations may also be derived from information theoretic consequence. According to the information theoretic consequence, a capacity of the channel may be analyzed based on each OAM waveform. In such cases, an optimal transmission scheme may be based on water-filling among the OAM waveforms. Using OAM waveforms as the set of complete and orthonormal basis may align with criteria of an information theoretic analysis.

The derivation of OAM waveforms may be based on using Maxwell equations as vector equations in free space without any free change, which may be solved by a scalar form, namely the Helmholtz equation, shown below in Equation 4.

$$\nabla^2 v + k^2 v = 0 \quad (4)$$

Assuming a paraxial wave (e.g., $v = ue^{ikz}$) and assuming the variation of amplitude (e.g., u) in the z direction is slow, a term $$\left(\text{e.g.,} \frac{\partial^2}{\partial z^2} u\right)$$

may be dropped from the Helmholtz equation shown above in Equation 4. As a result, the Helmholtz equation may become a different equation, shown below in Equation 5.

$$i\frac{\partial}{\partial z} u = -\frac{1}{2k}\left(\frac{\partial^2}{\partial x^2} + \frac{\partial^2}{\partial y^2}\right) u \quad (5)$$

The partial differential equation shown in Equation 5 may be solved using two approaches, namely a differential solution and an integral solution. More specifically, the integral solution may include the Green function and the Huygens-Fresnel Principle.

Based on the theory of the Green function, which describes a waveform from a single point source with the same boundary condition, the Helmholtz equation shown in Equation 4 may be solved in an integral form, which is the equivalent to the Huygens-Fresnel principle. A signal at a receiver plane v may be written as a function of a transmitter signal u, as shown below in Equation 6.

$$v = \int\int u \frac{\exp(jkr)}{r} \Psi \, dS \quad (6)$$

In Equation 6, $\Psi$ may be equivalent to $\cos \theta$ or some other function of the angle of propagation close to $\cos \theta$. In some cases, $\Psi$ may be close to 1 (e.g., $\Psi \approx 1$). In some cases, eigen modes may be identified by performing a singular value decomposition (SVD) on a transfer matrix, where a Gaussian term may be present in the eigenvectors.

In some cases, the OAM of the electromagnetic wave may be associated with a field spatial distribution of the electromagnetic wave, which may be in the form of a helical or twisted wavefront shape (e.g., in examples in which a light beam can be associated with a helical or twisted wavefront). For example, an electromagnetic wave (e.g., a light beam) may be in a helical mode (which may also be referred to as an OAM mode) and such helical modes may be characterized by a wavefront that is shaped as a helix with an optical vortex in the center (e.g., at the beam axis), where each helical mode is associated with a different helical wavefront structure. The helical modes (e.g., OAM modes, which may also be referred to as OAM states) may be defined or referred to by a mode index l, where a sign of the mode index l corresponds to a "handedness" (e.g., left or right) of the helix (or helices) and a magnitude of the mode index l (e.g., |l|) corresponds to a quantity of distinct but interleaved helices of the electromagnetic wave.

For example, for an electromagnetic wave associated with an OAM mode index of l=0, the electromagnetic wave is not helical and the wavefronts of the electromagnetic wave are multiple disconnected surfaces (e.g., the electromagnetic wave is a sequence of parallel planes). For an electromagnetic wave associated with an OAM mode index of l=+1, the electromagnetic wave may propagate in a right-handed pattern (e.g., has a right circular polarization or may be understood as having a clockwise circular polarization) and the wavefront of the electromagnetic wave may be shaped as a single helical surface with a step length equal to a wavelength $\lambda$ of the electromagnetic wave. Likewise, the phase delay over one revolution of the electromagnetic wave may be equal to $2\pi$. Similarly, for an OAM mode index of l=−1, the electromagnetic wave may propagate in a left-handed pattern (e.g., has a left circular polarization or may be understood as having a counter-clockwise circular polarization) and the wavefront of the electromagnetic wave may be also be shaped as a single helical surface with a step length equal to the wavelength $\lambda$ of the electromagnetic wave. Likewise, the phase delay over one revolution of the electromagnetic wave may be equal to $-2\pi$.

For further example, for an OAM mode index of l=±2, the electromagnetic wave may propagate in either a right-handed pattern (if +2) or in a left-handed pattern (if −2) and the wavefront of the electromagnetic wave may include two distinct but interleaved helical surfaces. In such examples, the step length of each helical surface may be equal to $\lambda/2$. Likewise, the phase delay over one revolution of the electromagnetic wave may be equal to $\pm 4\pi$. In general terms, a mode-l electromagnetic wave may propagate in either a right-handed pattern or a left-handed pattern (depending on the sign of l) and may include l distinct but interleaved helical surfaces with a step length of each helical surface equal to $\lambda/|l|$. Likewise, the phase delay over one revolution of the electromagnetic wave may be equal to $2l\pi$. In some examples, an electromagnetic wave may be indefinitely extended to provide for an infinite number of degrees of freedom of the OAM of the electromagnetic wave (e.g., l=0, ±1, ±2, . . . , ±∞). As such, the OAM of the electromagnetic wave (e.g., L as defined in Equation 1) may be associated with infinite degrees of freedom.

In some examples, the OAM mode index l of an electromagnetic wave may correspond to or otherwise function as (e.g., be defined as) an additional dimension for signal or channel multiplexing. For example, each OAM mode, which may correspond to an OAM state (of which there may be infinite), may function similarly (e.g., or equivalently) to a communication channel, such as a sub-channel. In other words, an OAM mode or state may correspond to a communication channel, and vice versa. For instance, the first network node or the second network node may communicate separate signals using electromagnetic waves having different OAM modes or states similarly to how the first network node or the second network node may transmit separate signals over different communication channels. In some aspects, such use of the OAM modes or states of an electromagnetic wave to carry different signals may be referred to as the use of OAM beams.

Additionally, in some examples, electromagnetic waves with different OAM modes (e.g., OAM states) may be mutually orthogonal to each other (e.g., in a Hilbert sense, in which a space may include an infinite set of axes and sequences may become infinite by way of always having another coordinate direction in which next elements of the sequence can go). Likewise, in a Hilbert sense, orthogonal OAM modes or states may correspond to orthogonal communication channels (e.g., orthogonal sequences transmitted over a communication channel) and, based on the potentially infinite number of OAM modes or states, the wireless communications system 100 employing the use of OAM beams may theoretically achieve infinite capacity. For example, in theory, an infinite number of OAM states or modes may be twisted together for multiplexing and the capacity of the OAM link can approach infinity while preserving orthogonality between signals carried by different OAM modes (e.g., indices). In practice, however, due to non-ideal factors (e.g., transmitter/receiver axial or position placement error, propagation divergence, and the like), crosstalk among OAM modes at the receiver may result, and thus a reduced number of concurrent OAM modes may be implemented between wireless devices (e.g., two or four concurrent OAM modes). In some cases, the first network node or the second network node may generate such OAM beams using SPP or UCA methodologies, as described with reference to FIGS. 2-5.

The first network node may also communicate with a wireless device such as a UE 115 via an access link 125. In some cases, OAM beams used to communicate between the first network node and the second network node via the backhaul link 120 may cause interference with communications transmitted via the access link 125 between the first network node and the UE 115.

The first network node may transmit a message to the UE 115 indicating a configuration for a feedback codebook for a set of reference signals associated with one or more OAM modes for backhaul communications. The first network node may indicate one or more parameters associated with the feedback codebook, which may include a number of transmitter antennas, a number of OAM modes, a radius of a transmitter antenna array, a wavelength of the reference signals, or a combination thereof. The first network node may transmit the plurality of reference signals, where each of the plurality of reference signals may be associated with a respective OAM mode of the one or more OAM modes. The UE 115 may generate feedback for the reference signals and OAM modes and indicate the feedback in a feedback report to the first network node via one or more codewords. The first network node may communicate with the UE 115 via an access link 125 and with the second network node via a backhaul link 120 based on the feedback report.

In some examples, the first network node may communicate with the UE 125 via non-OAM beamformed signals, and the one or more codewords may be associated with reducing interference between the OAM beamformed signals used for backhaul communications and the non-OAM beamformed signals used for the access communications. Additionally, or alternatively, the first network node may communicate with the UE 115 via OAM beamformed signals, where the OAM beamformed signals used for the access communications are at different modes (e.g., −2, 2) than the OAM beamformed signals used for the backhaul communications (e.g., 1, −1).

Figure 2:
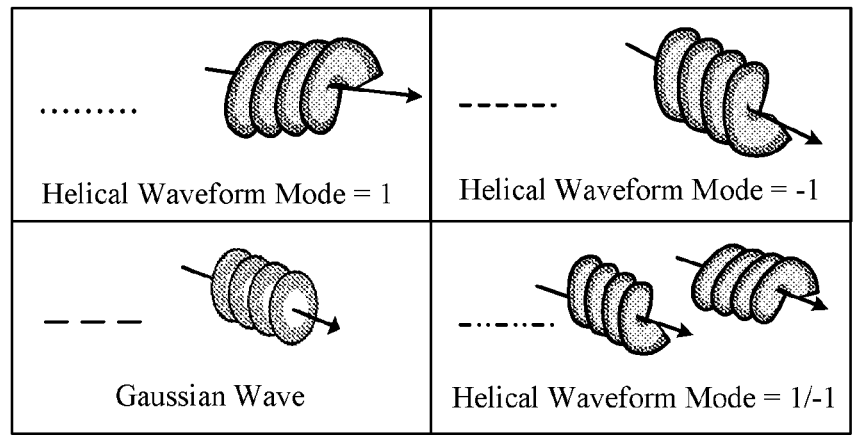
FIG. 2 illustrates an example of a spiral phase plate (SPP) OAM configuration that supports OAM based codebook for access communications in accordance with aspects of the present disclosure.
Figure 2:
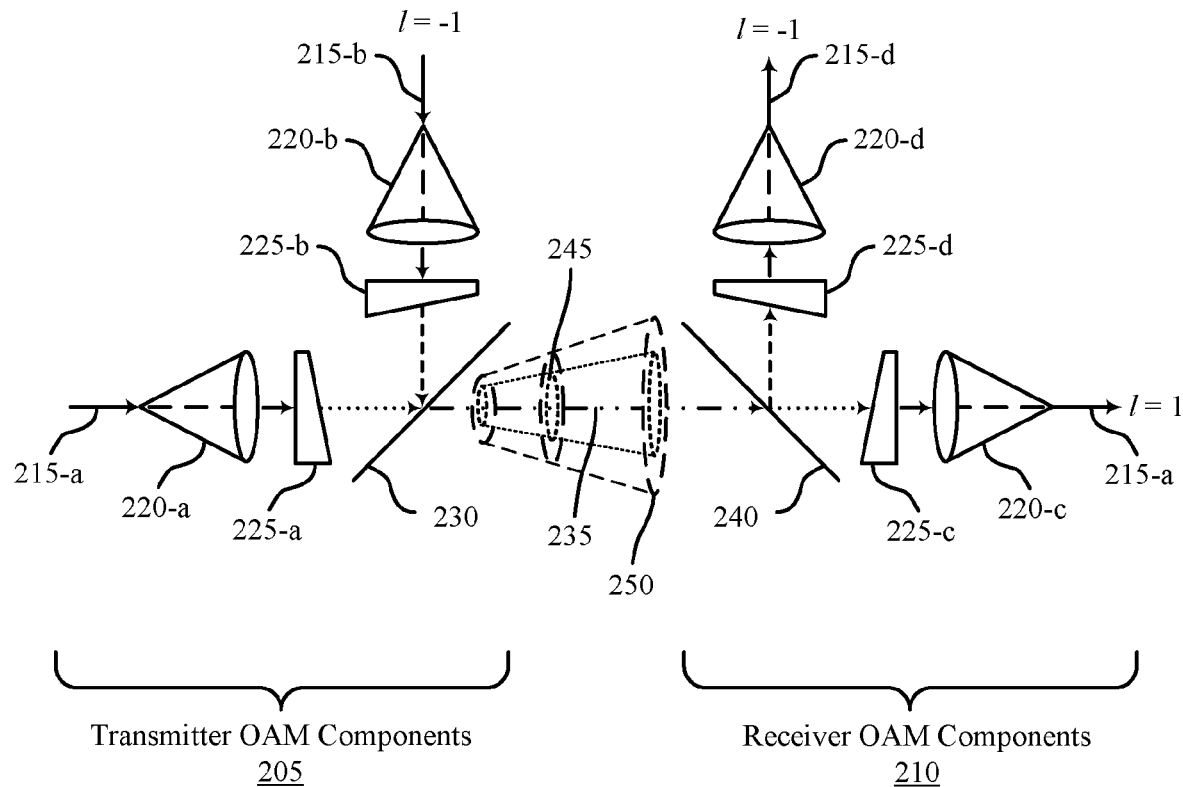

FIG. 2 illustrates an example of a spiral phase plate (SPP) OAM 200 that supports OAM based codebook for access communications in accordance with aspects of the present disclosure. In some examples, the SPP OAM configuration 200 may implement aspects of wireless communications system 100. In this example, a transmitting device (e.g., a base station or an IAB node) may include transmitter OAM components 205 and a receiving device (e.g., a UE, another base station, IAB node, or a relay node) may include receiver OAM components 210. The transmitter OAM components 205 may support transmission of non-DFT beams using a transmitter circle array such as a UCA panel, which may be configured based on feedback from the receiving device using receiver OAM components 210. The transmitter OAM components 205 or receiver OAM components 210 may be supported by a base station 105 or a UE 115, or other wireless device, as described herein.

In cases in which the wireless devices use an SPP methodology, the transmitting device may convert an electromagnetic wave 215 associated with an OAM mode index l=0 (e.g., a non-helical electromagnetic wave associated with mode-zero OAM) into an electromagnetic wave associated with an OAM mode index l≠0 (e.g., a helical electromagnetic wave associated with a non-zero OAM mode) based on passing the electromagnetic wave through an aperture 220 (or an array of apertures 220) and an SPP 225. Such an SPP 225 may be associated with geometric constraints and may be able to generate an electromagnetic wave associated with a single OAM mode. Thus, the wireless device may use one SPP 225 to generate an OAM beam 235 associated with one OAM mode. As such, a wireless device may implement a different SPP 225 for each OAM beam 235 that is associated with a different OAM mode.

SPPs 225 may be made of a high-density polyethylene. An SPP may be a round plate with a thickness that linearly increases with azimuth angles. In some examples in which a radio wave propagates through an SPP, such as SPP 225, the spiral surface of the SPP 325 induces different phase shifts, thereby generating a helical wave (e.g., an OAM beam), as the corresponding phase plane has a spiral shape. Due to the different slopes of different SPPs (e.g., SPPs 225-a, 225-b, 225-c, and 225-b), the wave of one OAM mode may be mitigated by the receiver aperture of any different OAM mode.

Figure 3:
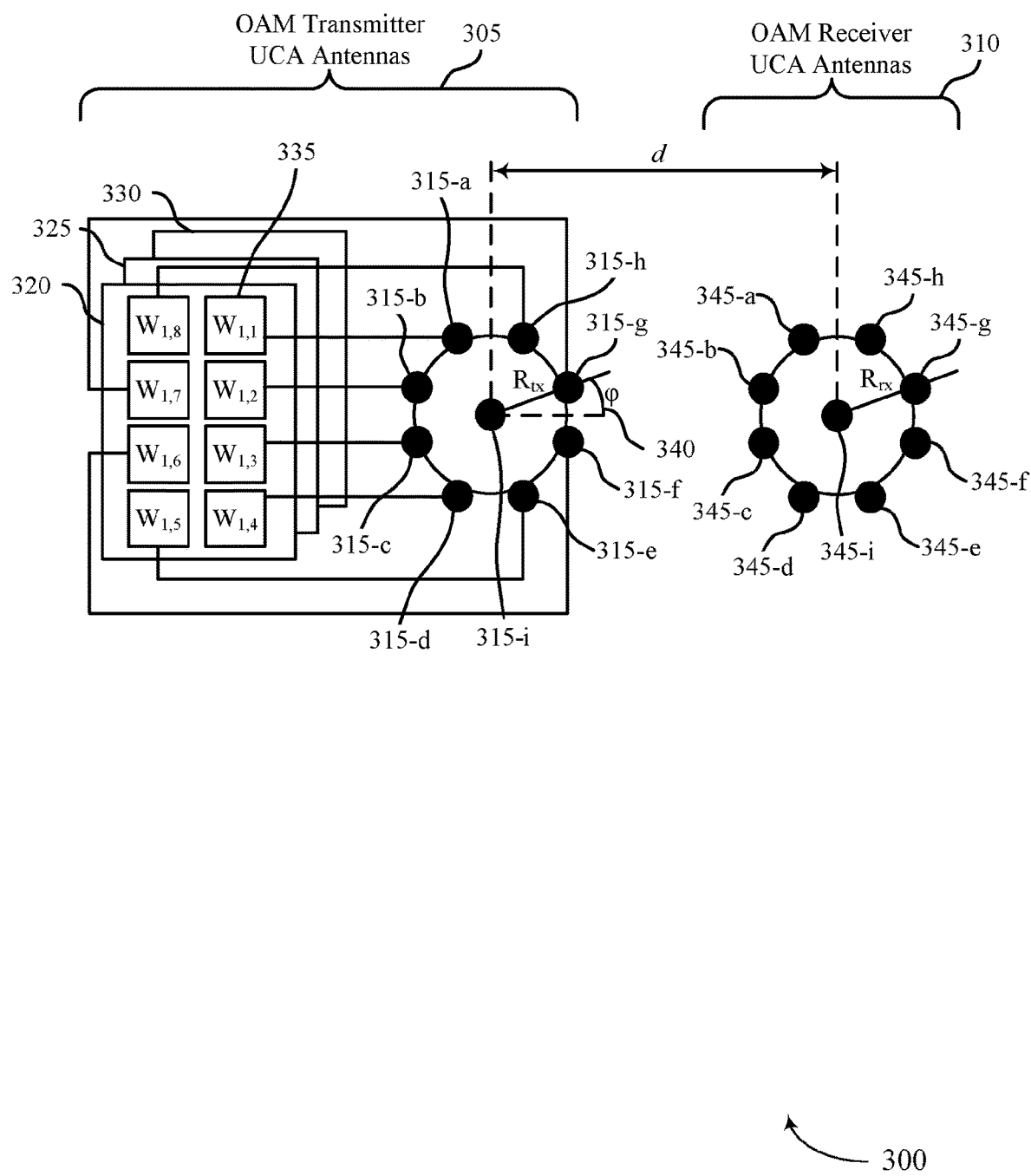
FIG. 3 illustrates an example of a uniform circular array (UCA) OAM configuration that supports OAM based codebook for access communications in accordance with aspects of the present disclosure.

In the example of FIG. 2, two OAM modes may be used (e.g., l=+1 and −1). In the transmitter OAM components 205, a first electromagnetic wave 215-a may be input to a first aperture 220-a and a first SPP 225-a, and a second electromagnetic wave 215-b may be input to a second aperture 220-b and a second SPP 225-b. A beam splitter/combiner 230 may combine the output of the first SPP 225-a and the second SPP 225-b to generate OAM beam 235. The receiver OAM components 210 may receive the OAM beam 235 as a beam splitter/combiner 240 to provide instances of the OAM beam 235 to a third SPP 225-c and a fourth SPP 225-d that provide output to a first receiver aperture 320-c and a second receiver aperture 220-d, respectively. The third SPP 225-c may have geometric constraints corresponding to the first SPP 225-a and thus the output of the first receiver aperture 220-c may correspond to the first electromagnetic wave 215-a (e.g., for OAM Mode=1). In addition, the fourth SPP 225-d may have geometric constraints corresponding to the second SPP 225-b and thus the output of the second receiver aperture 220-d may correspond to the second electromagnetic wave 215-b (e.g., for OAM Mode l=2). In devices that use SPP methodologies, separate SPPs 225-a may thus be used for each OAM mode, and the number of SPPs 225 at a device may constrain the number of usable OAM modes. Thus, in some examples, SPPs may generate waveforms with a large number of orthogonal OAM modes. In some other examples, the number of OAM modes that may be generated by SPPs may be limited. Higher-order OAM modes have a larger dispersion, as a receiver aperture with a certain size may capture a limited number of OAM modes. For example, as shown in FIG. 3, signals of OAM mode 3 (indicated by reference number 250) may disperse faster than signals of OAM mode 1 (indicated by reference number 245). If the signal strength of OAM mode 3 (250) is larger than receiver aperture (e.g., receiver aperture 220-*c* or 220-*d*), the receiver aperture may not be able to capture the signal of OAM mode 3 and may capture the signal of OAM mode 1.

As one SPP may generate one OAM mode, high dimensional multiplexing may be associated with a large number of SPPs. Accordingly, the degree of multiplexing that may be achieved by SPPs may be limited.

FIG. 3 illustrates an example of a uniform circular array (UCA) OAM configuration 300 that supports OAM based codebook for access communications in accordance with aspects of the present disclosure. In some examples, the UCA OAM configuration 300 may implement aspects of wireless communications system 100. In this example, a transmitting device (e.g., a UE or a base station) may include OAM transmitter UCA antennas 305 and a receiving device (e.g., a UE or a base station) may include OAM receiver UCA antennas 310.

In some aspects, one or both of the OAM transmitter UCA antennas 305 or the OAM receiver UCA antennas 310 may be implemented as a planar array of antenna elements which may be an example of or otherwise function as a (massive or holographic) MIMO array or an intelligent surface. In some cases, the transmitting device may identify a set of antenna elements 315 of the planar array that form a transmitter UCA, and a receiving device may identify a set of antenna elements 345 of the planar array that form a receiver UCA.

Upon selecting the set of antenna elements from the planar array, the OAM transmitter may apply a weight 335 to each of the selected antenna elements 315 based on the OAM mode index l of the transmitted OAM beam and one or more spatial parameters associated with each antenna element. In cases in which a UCA methodology is used to generate an OAM beam, the transmitting device may identify the set of antenna elements 315 on a circular array of antenna elements and may apply a first set of weights 320 to each of the identified antenna elements based on a first OAM mode index (e.g., l=0). Further, for other OAM mode indices, other weights may be used for the set of antenna elements 315, such as a second OAM mode index (e.g., l=+1) that may use a second set of weights 335 and a third OAM mode index (e.g., l=−1) that may use a third set of weights 330.

For example, to generate an OAM beam with an OAM mode index (e.g., l=0), the OAM transmitter may apply a weight 335 to each antenna element 315 on the UCA based on an angle 340 measured between a reference line on the UCA (e.g., the x-axis of the plane on which the UCA is located, where the origin is at the center of the UCA) and the antenna element 315, the OAM mode index l, and i (e.g., for complex-valued weights, which may alternatively be denoted as j in some cases). In some cases, for instance, the weight for an antenna element n may be proportional to $e^{i*l*\varphi_n}$, where $\varphi_n$ is equal to the angle 340 measured between the reference line on the UCA and the antenna element n. By multiplying respective beamforming weights 335 of each set of weights 320-330 (e.g., for first set of weights 320, $w_1 = [w_{1,1}, w_{1,2}, \cdots, w_{1,8}]^T$) onto each antenna, a signal port may be generated. If the weight 335 of each antenna element 315 is equal to $e^{i\varphi l}$, where $\varphi$ is the angle of antenna 315 in the circle (e.g., angle 340 for antenna element 315-*g*), and l is the OAM mode index, then each set of weights 320-330 provides a beamformed port that is equivalent to OAM mode l. By using different beamforming weights $e^{i\varphi l'}$, where l'≠l, multiple OAM modes are thus generated.

In some examples, a transmit antenna element 315-*i* and a corresponding receive antenna element 345-*i* may function as a center node within the transmit and receive UCAs. The transmit antenna element 315-*i* and the receive antenna element 345-*i* may be associated with OAM mode 0, which may be dynamically configured or hard-coded. In some examples, the transmit antenna element 315-*i* may be the only transmit antenna element associated with OAM mode 0. In some other examples, both the transmit antenna element 315-*i* and optionally one or more additional transmit antenna elements (e.g., antenna elements 315-*a* and 315-*d*) may be associated with OAM mode 0. Likewise, the receive antenna element 345-*i* may be the only receive antenna element associated with OAM mode 0, or additional receive antenna elements (e.g., antenna elements 345-*a* and 345-*c*) may also be associated with OAM mode 0.

At the OAM receiver UCA antennas 310, the receiving device may have receive antenna elements 345 equipped in a circle. The channel matrix may be denoted from each transmit antenna to each receive antenna as H, and then for the beamformed channel matrix $\tilde{H} = H \cdot [w_1, w_2, \cdots, w_L]$, any two columns of $\tilde{H}$ may be orthogonal. In some examples, for N transmit antennas and N receive antennas, the transfer matrix H may be found via discreet angular sampling using Equation 7, shown below. In some cases, Equation 7 may omit a cosine factor in an amplitude of the Huygens-Fresnel formula.

$$H_{m,n} \propto \frac{\exp\left(jk\sqrt{z^2 + (r_1 - r_2\cos\theta_2)^2 + }\right)}{\sqrt{z^2 + (r_1\cos\theta_1 - r_2\cos\theta_2)^2 + (r_1\sin\theta_1 - r_2\sin\theta_2)^2}} = \frac{\exp\left\{jk\sqrt{z^2 + r_1^2 + r_2^2 - 2r_1r_2\cos(\theta_1 - \theta_2)}\right\}}{z^2 + r_1^2 + r_2^2 - 2r_1r_2\cos(\theta_1 - \theta_2)} \quad (7)$$

In the example of Equation 7, beamformed ports may not experience crosstalk because of orthogonality between columns of the transfer matrix H. This may enable OAM-based communication to realize high-level spatial multiplexing more efficiently. Further, the eigen-based transmit precoding weights and receive combining weights of UCA-based OAM procedures may be equal to a discrete Fourier transform (DFT) matrix. Further, as the transfer matrix H is cyclic, eigenvectors of the transfer matrix H may be DFT vectors or inverse DFT (IDFT) vectors, as described in Equation 8.

$$w_{u,v} = \exp\left\{j\frac{2\pi uv}{N}\right\} \quad (8)$$

In the example of Equation 8, μ and v may be integers within a range (e.g., u=−(N−1), . . . , −1, 0, 1, . . . (N−1), v=0, 1, . . . (N−1)), where μ is a vector index of a DFT vector or an IDFT vector and v is the element index in each DFT vector or each IDFT vector. With respect to each OAM mode, the u-th DFT vector or IDFT vector may correspond to the u-th OAM waveform. In some cases, with N transmit antennas and receive antennas, all OAM modes (e.g., −(N−1), . . . , −1, 0, 1, . . . (N−1)) may be orthogonal at the receiver if any of them are transmitted, regardless of distance z and radii of the transmitter and receiver circles. As a result, per-mode channel estimation and feedback may be used, rather than per-antenna pair feedback. In some cases, it may be beneficial to have both transmitter and receiver planes be co-axial and vertical to the z-axis, although the transmitter and the receiver antennas may have angular offsets, or may be in other configurations.

In some examples, the mode response of each receiver circle may be further analyzed according to Equation 9, which utilizes Taylor expansion approximations.

$$\sqrt{z^2 + r_1^2 + r_2^2 - 2r_1 r_2 \cos(\theta_1 - \theta_2)} = \qquad (9)$$

$$z\sqrt{1 + \frac{r_1^2 + r_2^2 - 2r_1 r_2 \cos(\theta_1 - \theta_2)}{z^2}} \approx$$

$$z\left(1 + \frac{r_1^2 + r_2^2 - 2r_1 r_2 \cos(\theta_1 - \theta_2)}{2z^2}\right) = z + \frac{r_1^2 + r_2^2}{2z} - \frac{r_1 r_2 \cos(\theta_1 - \theta_2)}{Z}$$

Equation 9 may then be incorporated into Equation 7, yielding Equation 10 as shown below.

$$H_{m,n} \propto \frac{\exp\left\{jk\sqrt{z^2 + r_1^2 + r_2^2 - 2r_1 r_2 \cos(\theta_1 - \theta_2)}\right\}}{z^2 + r_1^2 + r_2^2 - 2r_1 r_2 \cos(\theta_1 - \theta_2)} \approx \qquad (10)$$

$$\frac{\exp\left\{jkz\sqrt{1 + \frac{r_1^2 + r_2^2 - 2r_1 r_2 \cos(\theta_1 - \theta_2)}{2z^2}}\right\}}{z + \frac{r_1^2 + r_2^2}{2z} - \frac{2r_1 r_2 \cos(\theta_1 - \theta_2)}{z}} \approx$$

$$\frac{\exp\left\{jk\left(z + \frac{r_1^2 + r_2^2}{2z}\right)\right\}}{z} \exp\left\{\frac{-jk r_1 r_2 \cos(\theta_1 - \theta_2)}{z}\right\}$$

Without losing generality, Equation 10 may be simplified into Equation 11 based on setting $\theta_1$ to 0 and ignoring all common terms among receiver antennas.

$$H_{m,n} \propto \exp\left\{\frac{-jk r_1 r_2 \cos\theta}{z}\right\} = \exp\left\{-j2\pi \frac{r_1 r_2}{\lambda z} \cos\theta\right\} \qquad (11)$$

In the example of Equation 11, θ may be associated with a range of angular values $$\left(\text{e.g., } \theta = 0, \frac{2\pi}{N}, \ldots, \frac{2(N-1)\pi}{N}\right).$$

In Equation 11, using Taylor expansion approximations may be performed on a first term $$\left(\text{e.g., } \exp\left\{-j2\pi \frac{r_1 r_2}{\lambda z} \cos\theta\right\}\right)$$

within the range of angular values associated with $\theta_2$. If a sub-term $$\left(\text{e.g., } \frac{r_1 r_2}{\lambda z}\right)$$

within the first term of Equation 11 is significantly lower than a threshold (e.g., 1), the critical term may be equivalent to $$1 - j2\pi \frac{r_1 r_2}{\lambda z} \cos\theta,$$

which may be an example of a low-pass filter. Alternatively, if the sub-term is higher than the threshold, the critical term may be highly oscillatory. In some cases, the sub-term may represent a spatial dimension with respect to a wavelength (e.g., λ) of an OAM wave. A response of a specific receiver antenna circle to different OAM modes may depend on geometric sizes and wavelengths corresponding to the receive antenna circle and an OAM wave, respectively.

In some examples, based on Equations 7 through 11, the same DFT matrix is the eigen-matrix of H, and this does not depend on communication parameters (e.g., distance, aperture size and carrier frequency), and thus UCA-based OAM procedures may be implemented at relatively low cost.

Figure 4:
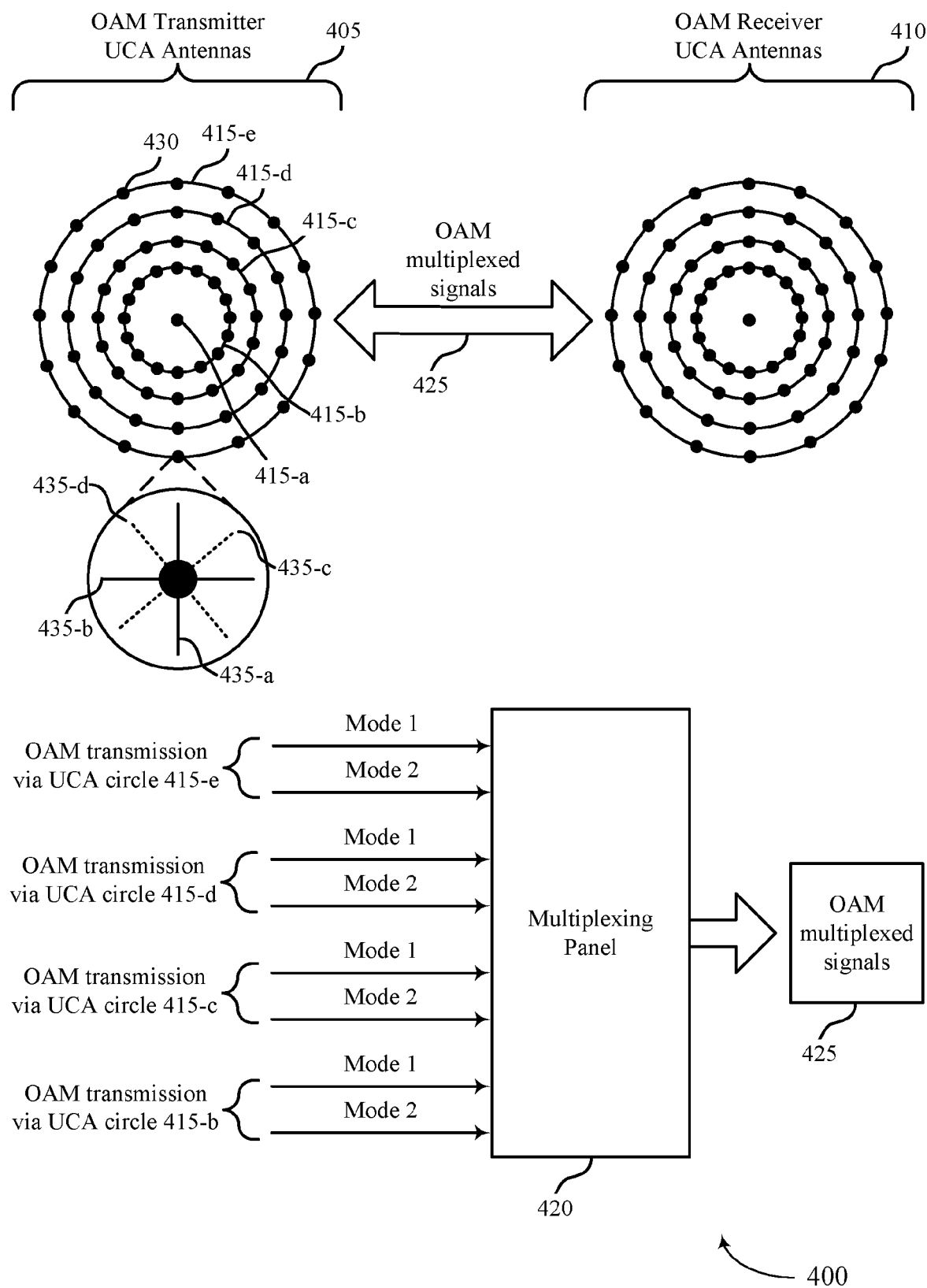
FIG. 4 illustrates an example of a multi-circle UCA-based OAM configuration that supports OAM based codebook for access communications in accordance with aspects of the present disclosure.

FIG. 4 illustrates an example of a multi-circle UCA-based OAM 400 that supports OAM based codebook for access communications in accordance with aspects of the present disclosure In some examples, the multi-circle UCA-based OAM configuration 400 may implement aspects of wireless communications system 100. In this example, a transmitting device (e.g., a UE or a base station) may include OAM transmitter UCA antennas 405 and a receiving device (e.g., a UE or a base station) may include OAM receiver UCA antennas 410.

As described with reference to FIG. 4, the transmitting device and the receiving device may be configured with UCA antennas to realize OAM-based communications. In some implementations, the transmitting device and the receiving device may be configured with multiple UCA antenna circles 415. For example, the transmitting device and the receiving device may each be configured with multiple co-axis UCA antenna circles 415. That is, the transmitting device may be configured with OAM transmitter UCA antennas 405 and the receiving device may be configured with OAM receiver UCA antennas 410. The transmitting device and the receiving device may be configured with the same number of UCA circles 415, or a different number of UCA circles.

In the example depicted by FIG. 4, the transmitting device and the receiving device may each be configured with five antenna circles, where each antenna circle may include one or more antenna elements 430. However, it is to be understood that the transmitting device and the receiving device may each be configured with any number of antenna circles that include any number of antenna elements 430. For example, the transmitting device may be configured with UCA circles 415-a, 415-b 415-c, 415-d, and 415-e, where the number of antenna elements 430 included on each UCA circle 415 may be the same, different, or partially the same. For example, all UCA circles 415 may include the same number of antenna elements 430, or each UCA circle 415 may include a different number of antenna elements 430, or a subset of the UCA circles 415 may include the same number of antenna elements 430. In some cases, the number of antenna elements 430 included on each UCA circle 415 may be based on the radius of the UCA circle 415. Each of the UCA circles 415 that a device is configured with may have the same radius, or different radii, or some may be the same and some may be different. The UCA circles 415 of the transmitting device and the receiving device may be configured in any orientation. For example, the UCA circles 415 may each have a different radius and may be interleaved such that one UCA circle 415 sits inside another UCA circle 415, and so on, as depicted in FIG. 4.

In some examples, each antenna element 430 may include perpendicular antenna sub-arrays 435. For example, an antenna element 430 may include perpendicular antenna sub-arrays 435-a and 435-b or perpendicular antenna sub-arrays 435-c and 435-c. Although illustrated with two potential perpendicular antenna sub-arrays 435, it is to be understood that the antenna elements 430 may be configured with any number of perpendicular antenna sub-arrays 435 that may be arranged in any orientation or configuration. For example, an antenna element 430 may be equipped with antenna sub-arrays 435 that are perpendicular with respect to an x-axis, a y-axis, or a z-axis, among other examples.

Configuring each antenna element 430 with perpendicular antenna sub-arrays 435 may enable the transmitting device to transmit OAM waveforms with different polarizations. For example, by applying different weights to each antenna sub-array 435, the transmitting device may transmit two OAM waveforms with different polarizations such that the two OAM waveforms are orthogonal to each other. As a result, the transmitting device may transmit the orthogonal OAM waveforms over a single channel without the orthogonal OAM waveforms interfering with each other.

In addition to OAM waveforms with different polarizations being orthogonal to each other, intra-circle OAM transmissions (e.g., OAM signals, OAM streams) may also be orthogonal to each other. That is, OAM transmissions from the same UCA circle 415 may not interfere with one another. As such, OAM transmissions from the same UCA circle 415 that are transmitted according to different OAM states or modes may be multiplexed together to increase the capacity of an OAM link. In some cases, inter-circle OAM transmissions may be orthogonal with different OAM modes, such that OAM transmissions from different UCA circles 415 transmitted according to different OAM modes may be orthogonal to one another. In some cases, inter-circle OAM transmissions may be non-orthogonal with OAM transmissions of the same OAM mode, such that OAM transmissions from different UCA circles 415 transmitted according to the same OAM mode may cause interference (e.g., cross-talk) with another other. For each OAM mode, inter-circle interference may occur when an OAM transmission from one UCA circle 415 mutually interferes with an OAM transmission transmitted from another UCA circle 415, where the two OAM transmissions have the same OAM mode.

As an example, multiple OAM transmissions may be transmitted from each UCA circle 415, where the intra-circle transmissions may be multiplexed if the intra-circle transmissions are associated with different modes. For example, the transmitting device may transmit a first OAM transmission according to OAM mode 1 via UCA circle 415-e and a second OAM transmission according to OAM mode 2 via UCA circle 415-e. Similarly, the transmitting device may transmit a third OAM transmission according to OAM mode 1 via UCA circle 415-d, a fourth OAM transmission according to OAM mode 2 via UCA circle 415-d, a fifth OAM transmission according to OAM mode 1 via UCA circle 415-c, a sixth OAM transmission according to OAM mode 2 via UCA circle 415-c, a seventh OAM transmission according to OAM mode 1 via UCA circle 415-b, and an eighth OAM transmission according to OAM mode 2 via UCA circle 415-b.

In some examples, the transmitting device may transmit one or more OAM transmissions according to OAM mode 0 via UCA circle 415-a. The UCA circle 415-a may be referred to herein as a center, a center circle, a center antenna circle, or a center antenna node and may include a single antenna component or multiple antenna components (e.g., in an antenna array or panel). UCA circle 5415-a may be a transmitter configured for the transmitting or receiving device, and may be used for communications according to different modes or polarizations. In some cases, only UCA circle 415-a may transmit OAM transmissions according to OAM mode 0. In some other cases, the center UCA circle 415-a and one or more peripheral UCA circles 415 (e.g., UCA circles 415-e and 415-d) may transmit OAM transmissions according to OAM mode 0. That is, either the center UCA circle 415-a is chosen as the only transmitter or the center and another UCA circle 415 are the transmitters for OAM mode 0.

The center UCA circle 415-a may transmit reference signals that are unique to the center node. That is, the center UCA circle 415-a may transmit reference signals that are specific to OAM mode 0. In addition, the center UCA circle 415-a may have reference signal resources that are reserved for the center UCA circle 415-a. The transmitting device, the receiving device, or both may determine which UCA circles 415 to associate with OAM mode 0 based on the transmitting device using the reserved reference signal resources to transmit one or more reference signals that are unique to the center UCA circle 415-a. In some examples, the one or more reference signals may have different polarizations, such that the receiving device may measure the one or more reference signals and indicate a preferred polarization to the transmitting device.

In some examples, one or more higher OAM modes (e.g., OAM modes other than OAM mode 0) may have a natural null at the center UCA circle 415-a. That is, OAM transmissions that are transmitted from a peripheral UCA circle 415 (e.g., UCA circle 415-e) according to a higher OAM mode may be orthogonal to OAM transmissions transmitted from the center UCA circle 415-a according to OAM mode 0. As a result, the transmitting device may be able to multiplex a first OAM transmission from a peripheral UCA circle 415 with a second OAM transmission from the center UCA circle 415-a.

As described herein, intra-circle OAM transmissions may be orthogonal. As such, the first and second OAM transmissions may be orthogonal to one another, and may, in some cases, be multiplexed. Similarly, the third and fourth transmissions may be orthogonal to one another, the fifth and sixth transmissions may be orthogonal to one another, and the seventh and the eighth transmission may be orthogonal to one another. Further, as described herein, inter-circle OAM transmissions transmitted via different OAM modes may be orthogonal. As such, the first transmission may be orthogonal to the fourth transmission, the sixth transmission, and the eight transmission, for example. Further, as described herein, inter-circle OAM transmissions transmitted via the same OAM mode may be non-orthogonal. As such, the first transmission may be non-orthogonal to the third transmission, the fifth transmission, and the seventh transmission, for example.

In some cases, a transmitting device may transmit the first transmission through the eighth transmission, as described herein, simultaneously. As such, the first transmission through the eighth transmission may pass through a multi-circle UCA panel, such as multiplexing panel 420, that may multiplex one or more of the transmissions into OAM multiplexed signals 425. In some examples, the intra-circle transmissions may be multiplexed. For example, the first transmission and the second transmission may be multiplexed. In another example, the first transmission through the eighth transmission may be multiplexed. The transmitting device may transmit the one or more OAM multiplexed signals 425 to the receiving device, where the OAM receiver UCA antennas 410 of the receiving device may separate the one or more OAM multiplexed signals.

Further, although shown in the example depicted in FIG. 4 as using two OAM modes (a first and a second mode) being transmitted by each UCA circle 415, it is to be understood that each UCA circle 415 may transmit any number of OAM transmissions according to any number of OAM modes. The number of OAM transmissions from each UCA circle 415 may be the same, different, or partially the same, such that all UCA circles 415 at the transmitting device may transmit the same number of transmissions, a different number of transmissions, or some UCA circles 415 may transmit the same number of transmissions while other UCA circles may transmit a different number of transmissions. Further, although the transmitting device and the receiving device are depicted in FIG. 4 as being configured with 5 UCA circles 415, it is to be understood that such devices may be configured with any number of UCA circles 415.

In some cases, as inter-circle OAM transmissions of the same OAM mode may interfere with one another, the transmitting device may be configured to transmit a particular mode via a particular UCA circle 415 so as to mitigate interference caused by inter-cell OAM transmissions of the same mode. The transmitting device, or the receiving device, or both may be configured to determine a transmission scheme for the transmitting device that indicates which UCA circle 415 should be used to transmit which OAM mode. In some implementations, the channel gains of OAM transmission streams may be different from each UCA circle 415 for each OAM mode for a set of parameters. The parameters may include system parameters such as a communication distance between the transmitting device and the receiving device, the radius of each UCA transmitter circle 415, the radius of each UCA receiver circle 415, a carrier frequency, or a number of antenna elements 430 in each UCA circle 415.

For example, for a set of system parameters (in which the parameters are held constant), an OAM mode of 2 or −2 may have a largest channel gain when transmitted via a UCA transmitter circle radius of 0.8 meters. In another example, for the same set of system parameters, an OAM mode of 1 or −1 may have a largest channel gain when transmitted via a UCA transmitter circle radius of 0.6 meters. In another example, for the same set of system parameters, an OAM mode of 0 may have a largest channel gain when transmitted via a UCA transmitter circle radius of 0.2 meters. Therefore, to achieve high data throughput, a transmitting device may be configured to transmit an OAM transmission via an OAM mode-UCA circle pairing that results in the largest channel gain. This low-complexity scheme may increase peak data rates and channel capacity without impairing orthogonality. However, it is to be understood that any number of alternative low-complexity schemes involving OAM transmitter circles with different radii may also be used to improve peak data rates and channel capacity.

Figure 5:
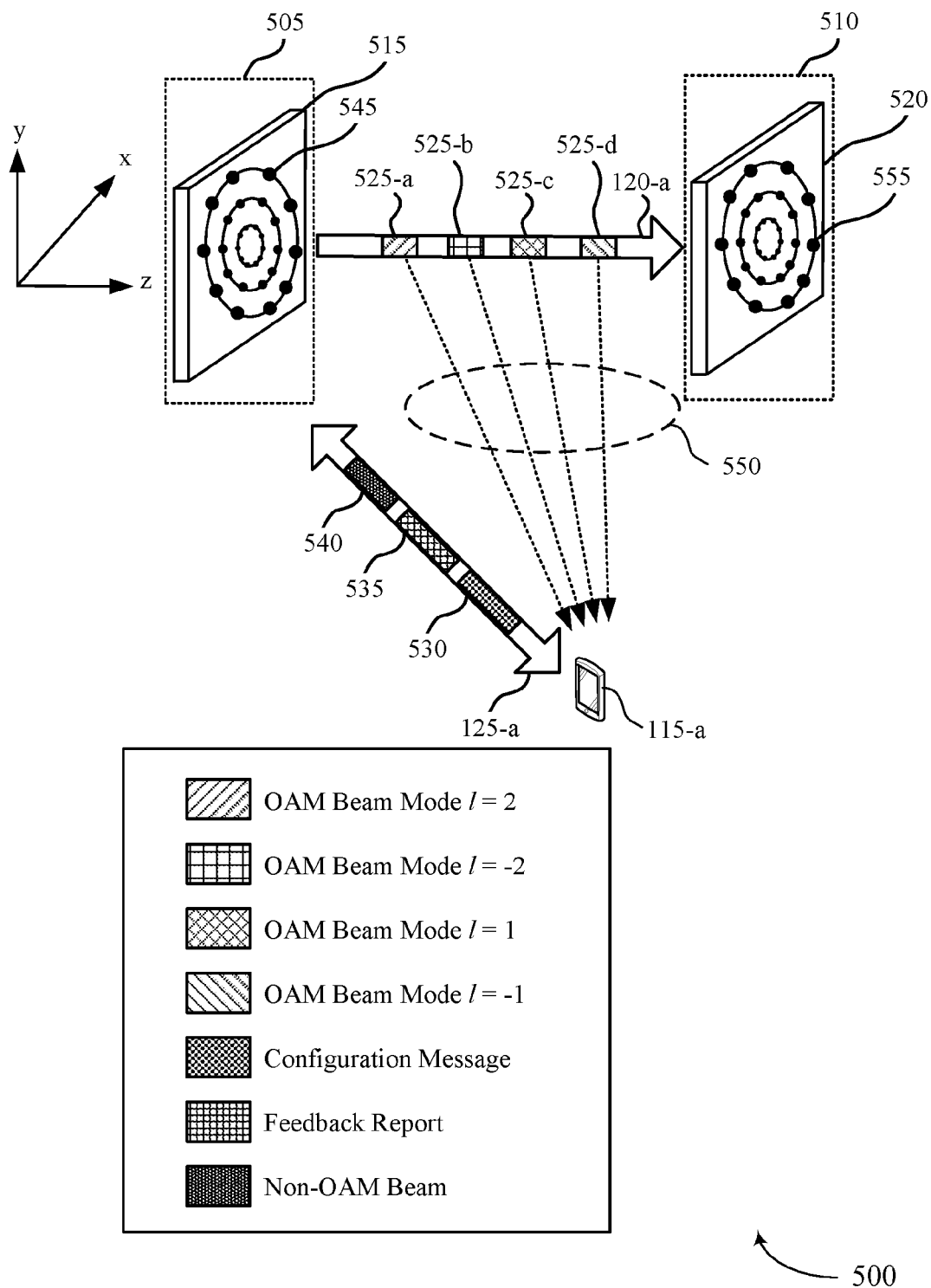
FIG. 5 illustrates an example of a wireless communications system that supports OAM based codebook for access communications in accordance with aspects of the present disclosure.

FIG. 5 illustrates an example of a wireless communications system 500 that supports OAM based codebook for access communications in accordance with aspects of the present disclosure. In some examples, wireless communications system 500 may implement aspects of wireless communications system 100. The wireless communications system 500 may illustrate communications between a first network node 505 and a second network node 510, where the first network node 505 and the second network node 510 may be the same device type or may be different device types. The first network node 505 and the second network node 510 may each be a base station or an IAB node, among other devices. The first network node 505 and the second network node 510 may be examples of corresponding devices described herein. The wireless communications system 500 may further illustrate communications between the first network node 505 and a UE 115-*a*, which may be an example of a UE 115 as described herein.

The first network node 505 may communicate with the second network node 510 via a backhaul link 120-*a* and the first network node 505 may communicate with the UE 115-*a* via an access link 125-*a*. The first network node 505 and the second network node 510 may communicate over the backhaul link 120-*a* using OAM beams 525. In some examples, the first network node 505 may include a co-axial multi-ring UCA panel 515 including a number of antenna elements 545 and the second network node 510 may a co-axial multi-ring UCA panel 520 including a number of antenna elements 555. The UCA panels 515 and 520 may be used to generate and receive OAM beams for backhaul communications. The first network node 505 may transmit access-link signals to the UE 115-*a* via the UCA panel 515 (e.g., via the inner part of the UCA panel) or via a separate antenna panel at the first network node 505. If the first network node 505 transmits backhaul signals via OAM beams 525 and access signals simultaneously (e.g., in spatial division multiplexing (SDM) mode), the OAM beams used for the backhaul communications may cause interference with the communications via the access link 125-*a*. The first network node 505 may use SDM mode, for example, when the number of active UEs communicating with the first network node 505 is low, because backhaul-access SDM mode may increase spectrum efficiency or because at the time slot for transmitting a backhaul and/or access signal, the network may have an urgent message for the UE 115-*a* or the second network node 510.

If the UE 115-*a* is within a physically close proximity to the first network node 505-*a*, the UE 115-*a* may suffer high interference 550 from the backhaul signals transmitted via the OAM beams 525. For example, the received signal power at the UE 115-*a* distribution plane for a non-OAM beam (e.g., an exponential cosine series (ECS) beam) transmitted to the UE 115-*a* via the access link 125-*a* may suffer interference 550 from an OAM beam 525 transmitted to the second network node 510 via the backhaul link 120-*a*. In an entire cell associated with the first network node 505, the signal to interference ratio (SIR) may vary from 0 dB to 20 dB. Accordingly, it may be desirable to mitigate interference 550 on the access link 125-*a* caused by the OAM beams 525 transmitted over the backhaul link 120-*a*. However, when the UE 115-*a* reports a precoding matrix indicator (PMI) to mitigate such interference, a Fourier matrix based codebook (used for inter-Uniform Planar Array antenna precoding) may be unsuitable for inter-OAM mode precoding.

For IAB nodes, though the OAM-based backhaul transmission mostly experiences line of sight (LOS) channel, the interference from an OAM beam to the UE 115-*a* may experience multipath non-LOS channel (e.g., there may be blockages or scatters between the OAM transmitter (e.g., UCA panel 515) and the UE 115-*a*). In some cases, the per-subband digital precoding on top of OAM-based analog precoding at the OAM transmitter (e.g., UCA panel 515) may mitigate the frequency-variant interference from backhaul OAM beams 525 to the access link 125-*a* (e.g., to the UE 115-*a*).

Accordingly, in some examples, an OAM-based PMI codebook may be used for the UE 115-*a* to report a digital precoding matrix on top of OAM-based analog precoding, which may be used at the first network node 505 to reduce the interference from the backhaul OAM beams 525 to the access link 125-*a*. Additionally or alternatively, as discussed in more detail with reference to FIG. 6, the OAM-based PMI codebook may be used to enhance OAM-based access link 125-*a* transmissions.

In some examples, the UE 115-*a* may report backhaul precoding matrix information to mitigate interference to the access link 125-*a* based on the OAM-based PMI codebook. The first network node 505 may transmit reference signals via the UCA panel 515 that are associated with OAM beams 525 of multiple modes (e.g., OAM beam 525-*a* may be associated with mode l=2, OAM beam 525-*b* may be associated with mode l=−2, OAM beam 525-*c* may be associated with mode l=1, and OAM beam 525-*d* may be associated with mode l=−1) and indicate to the UE 115-*a* the parameters associated with the OAM-based PMI codebook, The UE 115-*a* may determine and report a signal subspace or a null subspace of the OAM-to-UE interference matrix (e.g., to reduce interference) or a OAM-to-UE channel matrix (e.g., to enhance OAM-based access transmissions as described in more detail with reference to FIG. 6). In some examples, the first network node 505 may transmit OAM signals with subband digital precoding in OFDM waveforms. The OAM-based PMI codebook may be adopted in the subband PMI report.

The channel gain from an OAM mode to the UE 115-*a* is equivalent to the channel gain from an OAM mode to an antenna, whose position coincides with UE 115-*a* position, in a receiver UCA ring. The channel gain from an antenna 545 of a transmitter circle of the UCA panel 515 to an antenna of a receiver circle is $$h_{m,n} = \frac{\sqrt{G}\lambda}{4\pi d_{m,n}} \exp\left(-j2\pi \frac{d_{m,n}}{\lambda}\right).$$

Without losing generality, and assuming $\theta_1=0$ corresponds to the first antenna 545 in the transmitter circle of the UCA panel 515, then $$\theta_2 = 0, \frac{2\pi}{N}, \ldots, \frac{2\pi(N-1)}{N}.$$

Then based on Taylor expansion approximations, $$\sqrt{z^2 + r_1^2 + r_2^2 - 2r_1r_2\cos\theta} =$$

-continued
$$z\sqrt{1 + \frac{r_1^2 + r_2^2 - 2r_1r_2\cos\theta}{z^2}} \approx z\left(1 + \frac{r_1^2 + r_2^2 - 2r_1r_2\cos\theta}{2z^2}\right) =$$

$$z + \frac{r_1^2 + r_2^2}{2z} - \frac{r_1r_2\cos\theta}{z}.$$

Accordingly, $h_{m,n}$ may be given by Equation 12 below.

$$h_{m,n} = \frac{\sqrt{G}\lambda}{4\pi} \cdot \frac{\exp\left\{-j\frac{2\pi}{\lambda}\sqrt{z^2 + r_1^2 + r_2^2 - 2r_1r_2\cos\theta}\right\}}{\sqrt{z^2 + r_1^2 + r_2^2 - 2r_1r_2\cos\theta}} = \tag{12}$$

$$\frac{\sqrt{G}\lambda}{4\pi} \cdot \frac{\exp\left\{-jk\left(z + \frac{r_1^2 + r_2^2}{2z}\right)\right\}}{z} \exp\left\{\frac{jkr_1r_2\cos\theta}{z}\right\} \triangleq \alpha\exp\left\{\frac{jkr_1r_2\cos\theta}{z}\right\}$$

The matrix $H_{OAM}=\{h_{m,n}\}_{m,n=0-N-1}$ is a circular matrix, where each row represents the channel vector from all the transmitter antennas 545 in the UCA panel 515 to a receiver antenna in a receiver UCA panel, $$h_p = \alpha \cdot \exp\left\{j2\pi\frac{r_1r_2}{\lambda z}\cos\frac{2\pi p}{N}\right\},$$

p=0, 1, . . . (N−1). Transmitting OAM modes is equivalent to performing the Fourier transform or inverse Fourier transform as $\{h_p\}$, p=0, 1, . . . (N−1). Further the Bessel Function property is $\int_0^\pi e^{i\beta \cos x} \cos nx\, dx = i^n\pi J_n(\beta)$, and $\int_{-\pi}^{\pi} e^{i\beta \cos x} \sin nx\, dx = 0$, because sin(nx) is odd. Therefore, when the OAM mode n is transmitted, the channel gain $g_n$ at the receiver antenna 0 is given by equation 13 below.

$$g_n = \sum_{p=0}^{N-1} \exp\left\{j2\pi\frac{pn}{N}\right\} \cdot \alpha \cdot \tag{13}$$

$$\exp\left\{j2\pi\frac{r_1r_2}{\lambda z}\cos\frac{2\pi p}{N}\right\} \xrightarrow{N\to\infty} \alpha \int_{-\pi}^{\pi} \exp\left\{j2\pi\frac{r_1r_2}{\lambda z}\cos\theta\right\}\exp\{jn\theta\}d\theta =$$

$$\alpha \int_{-\pi}^{\pi} \exp\left\{j2\pi\frac{r_1r_2}{\lambda z}\cos\theta\right\}\cos n\theta\, d\theta = 2\alpha \int_0^\pi \exp\left\{j2\pi\frac{r_1r_2}{\lambda z}\cos\theta\right\}\cos n\theta\, d\theta =$$

$$2 \cdot \frac{\sqrt{G}\lambda}{4\pi} \cdot \frac{\exp\left\{-j\frac{2\pi}{\lambda}\left(z + \frac{r_1^2 + r_2^2}{2z}\right)\right\}}{z} \cdot i^n \pi J_n\left(2\pi\frac{r_1r_2}{\lambda z}\right) =$$

$$\frac{\sqrt{G}}{2} \cdot \frac{i^n \lambda J_n\left(2\pi\frac{r_1r_2}{\lambda z}\right)}{z} \cdot \exp\left\{-j\frac{2\pi}{\lambda}\left(z + \frac{r_1^2 + r_2^2}{2z}\right)\right\}$$

The channel gain ratio of two OAM modes $$\frac{g_n}{g_m}, \text{ where } k = \frac{r_1}{\lambda}, \tan(\varphi) = \frac{r_2}{z},$$

is given by equation 14 below.

$$\frac{g_n}{g_m} = \tag{14}$$

-continued $$\frac{i^n J_n(2\pi \frac{r_1 r_2}{\lambda z})e^{j\theta n}}{i^m J_m(2\pi \frac{r_1 r_2}{\lambda z})e^{j\theta m}} = \frac{i^n J_n(2\pi \frac{r_1}{\lambda}\tan(\varphi))e^{j\theta n}}{i^m J_m(2\pi \frac{r_1}{\lambda}\tan(\varphi)))e^{j\theta m}} = \frac{i^n J_n(2\pi k \tan(\varphi))e^{j\theta n}}{i^m J_m(2\pi k \tan(\varphi)))e^{j\theta m}}$$

Accordingly, the precoding codeword $w_{\theta,\varphi}$ for OAM modes $\{n_1, n_2, \cdots, n_L\}$ is given by equation 15 below.

$$w_{\theta,\varphi} = \begin{bmatrix} i^{n_1} J_{n_1}(2\pi k\tan(\varphi))e^{j\theta n_1}, i^{n_2} J_{n_2}(2\pi k\tan(\varphi))e^{j\theta n_2}, \ldots, \\ i^{n_L} J_{n_L}(2\pi k\tan(\varphi))e^{j\theta n_L} \end{bmatrix} \quad (15)$$

Accordingly when OAM mode n is transmitted, the channel gain $g_n$ at the receiver antenna 0 is $$g_n = \frac{\sqrt{G}}{2} \cdot \frac{i^n \lambda J_n(2\pi \frac{r_1 r_2}{\lambda z})}{z} \cdot \exp\left\{-j\frac{2\pi}{\lambda}\left(z + \frac{r_1^2 + r_2^2}{2z}\right)\right\},$$

where $r_1$, $r_2$, z are the UCA panel 515 radius, receiver UCA radius, and distance between the transmitter and receiver, respectively. Thus, the ratio of the received signals at azimuth angle θ by OAM mode n and m is $$\frac{g_n}{g_m} = \frac{i^n J_n(2\pi k\tan(\theta))e^{j\varphi n}}{i^m J_m(2\pi k\tan(\theta)))e^{j\varphi m}}, \text{ where } k = \frac{r_1}{\lambda}, \tan(\theta) = \frac{r_2}{z},$$

θ is the angle between the direction of the UE 115-*a* and the boresight direction of the UCA panel 515, φ is the angle between the direction of the UE 115-*a* onto UCA panel 515 and the x-axis direction of the UCA panel 515. Accordingly, to maximize the equivalent channel gain by multi-mode precoding, the precoding weights for OAM modes $\{n_1,$ $n_2, \cdots, n_L\}$ are in form of $w_{\theta,\varphi}=[i^{n_1}J_{n_1}(2\pi k \tan(\theta))e^{j\varphi n_1},$ $i^{n_2}J_{n_2}(2\pi k \tan(\theta))e^{j\varphi n_2}, \cdots, i^{n_L}J_{n_L}(2\pi k \tan(\theta))e^{j\varphi n_L}]$ The OAM-based PMI codebook may be composed of OAM-based precoding/beamforming vectors W= $\{w_{\theta,\varphi}\}_{\theta \in \Theta, \varphi \in \Phi}$, and therefore $$\theta = \left\{\frac{\pi m}{N_1}\right\}_{m=0}^{N_1-1} = \{0, \frac{\pi}{N_1}, \frac{2\pi}{N_1}, \ldots, \frac{(N_1-1)\pi}{N_1}\},$$

$$\Phi = \left\{\frac{2\pi n}{N_2}\right\}_{n=0}^{N_2-1} = \{0, \frac{2\pi}{N_2}, \frac{4\pi}{N_2}, \ldots, \frac{(N_2-1)2\pi}{N_2}\}.$$

And to express a codeword $w_{\theta,\varphi}$, $\lceil \log_2(N_1) \rceil + \lceil \log_2(N_2) \rceil$ bits may be used in quantization. Such a codebook may be used for LOS and non-LOS channels between the first network node 505 and the UE 115-*a*. When the codebook is used for a non-LOS channel, the codewords whose angle parameters θ,φ match the positions of each reflector may be selected.

The PMI codebook W for OAM modes $\{n_1, n_2, \cdots, n_L\}$ by the UCA panel 515 antenna ring is given by equation 16 below.

$$W = \begin{bmatrix} f(n_1,0,0) & f\left(n_1,0,\frac{2\pi}{N_2}\right) & \cdots & f\left(n_1,0,\frac{(N_2-1)2\pi}{N_2}\right) \\ \vdots & \vdots & \cdots & \vdots \\ f(n_L,0,0) & f\left(n_L,0,\frac{2\pi}{N_2}\right) & \cdots & f\left(n_L,0,\frac{(N_2-1)2\pi}{N_2}\right) \\ f\left(n_1,\frac{\pi}{N_1},0\right) & f\left(n_1,\frac{\pi}{N_1},\frac{2\pi}{N_2}\right) & \cdots & f\left(n_1,\frac{\pi}{N_1},\frac{(N_2-1)2\pi}{N_2}\right) \\ \vdots & \vdots & \cdots & \vdots \\ f\left(n_L,\frac{\pi}{N_1},0\right) & f\left(n_L,\frac{\pi}{N_1},\frac{2\pi}{N_2}\right) & \cdots & f\left(n_L,\frac{\pi}{N_1},\frac{(N_2-1)2\pi}{N_2}\right) \\ \cdots \\ f\left(n_1,\frac{(N_1-1)\pi}{N_1},0\right) & f\left(n_1,\frac{(N_1-1)\pi}{N_1},\frac{2\pi}{N_2}\right) \\ f\left(n_L,\frac{(N_1-1)\pi}{N_1},0\right) & f\left(n_L,\frac{(N_1-1)\pi}{N_1},\frac{2\pi}{N_2}\right) \\ \cdots & f\left(n_1,\frac{(N_1-1)\pi}{N_1},\frac{(N_2-1)2\pi}{N_2}\right) \\ & \vdots \\ \cdots & f\left(n_L,\frac{(N_1-1)\pi}{N_1},\frac{(N_2-1)2\pi}{N_2}\right) \end{bmatrix} \quad (16)$$

$$\{\theta=0, \varphi=0 \sim \frac{(N_2-1)2\pi}{N_2}\}$$
$$\{\theta=\frac{\pi}{N_1}, \varphi=0 \sim \frac{(N_2-1)2\pi}{N_2}\}$$
$$\{\theta=\frac{(N_1-1)\pi}{N_1}, \varphi=0 \sim \frac{(N_1-1)2\pi}{N_2}\}$$

Accordingly, $f(n,\theta,\varphi)=i^n J_n(2\pi k \tan(\theta))e^{j\varphi n}$.

In order to configure the feedback codebook, the first network node 505 may transmit a configuration message 530 to the UE 115-*a* that indicates a configuration for the feedback codebook. The configuration message 530 may include the values of $\{n_1, n_2, \cdots, n_L\}$, $N_1$, $N_2$, k (or $r_1$, λ) associated with the codebook. $N_{access}$ refers to the number of data streams in access link, $N_{backhaul}$ refers to the number of data streams in backhaul link and $N_{OAM}$ refers to the number of used OAM modes. In some examples, the value of $N_{backhaul}$ or the maximum value of $N_{access}$ may be predetermined and indicated in the message 530.

The first network node 505 may transmit, using the UCA panel 515, a plurality of reference signals, each of the plurality of reference signals using OAM beams 525 (e.g., each reference signal may be associated with a respective OAM mode). The UE 115-*a* may generate one or more codewords based on the configuration of the codebook and the received reference signals, and transmit a feedback report to the first network node 505 indicating the one or more codewords.

In some examples, the UE 115-*a* may generate the one or more codewords by measuring the interference 550 from each OAM beam 525 and then determining a digital domain combinational coefficient matrix W* for multiple OAM modes to minimize the interference 550. Determining the digital domain combinational coefficient matrix W* for multiple OAM modes may be equivalent to selecting analog beams and then calculating their digital precoding coefficients, so as to minimize the interference strength, $$\text{(e.g., } W^* = \underset{W}{\arg\min} \left\| W^H \tilde{H}^H \tilde{H} W \right\|_2^2 \text{).}$$

$\tilde{H} = H_{interference} F$ is the equivalent interference matrix after OAM analog beamforming, and $F=[f_1, f_2, \cdots, f_M]$ is the analog domain discrete Fourier transform beamforming matrix, and $W=[w_1, w_2, \cdots, w_L]$ is digital-domain coefficient matrix.

If $N_{OAM} \leq N_{access}$, then $H^- = HF \times W$, where W* is equal to the non-dominant eigenvectors of $H^{-\wedge}H\ H^-$, and thus interference 550 may not be mitigated. If $N_{access} + N_{backhaul} \leq N_{OAM}$, then the non-dominant eigenvectors $W^* \subseteq$ zero subspace of $H^-$ and interference may be thoroughly nullified. $N_{backhaul}$ should be $< N_{OAM}$, otherwise interference may not be mitigated. Accordingly, it may be regulated or configured that $N_{access} \leq N_{OAM} - N_{backhaul}$ or $N_{access} \leq N_{access}^{(max)}$.

The UE 115-*a* may report the codewords in a channel state information (CSI) report based on the configured codebook in order to represent the interference matrix of the digital precoding matrix of OAM beams. In some examples, the UE 115-*a* may determine the value of $N_{access}$ and report the value of $N_{access}$ (equivalent to rank indicator (RI)) and $N_{backhaul}$ non-dominant eigen vectors of $\tilde{H}^H \tilde{H}$ based on the OAM-based PMI feedback codebook. It may be expected that the digital beam of the backhaul link 120-*a* is within or similar to the subspace of the non-dominant eigenvectors of $\tilde{H}^H \tilde{H}$.

In some examples, because the link between the first network node 505 and the UE 115-*a* may include multi-path propagation, to adapt with frequency-selective channel fading, per-subband precoding may be used. Accordingly, OFDM waveforms may be used in the OAM transmissions. When OFDM waveforms are transmitted in the OAM-based backhaul link 120-*a*, the report of dominant or non-dominant eigenvectors of $\tilde{H}^H \tilde{H}$ may correspond to a wideband channel associated with the reference signals received or per-subband associated with the reference signals received.

Reporting non-dominant eigenvectors of $\tilde{H}^H \tilde{H}$ may be equivalent to reporting a precoding matrix for interference 550. Accordingly, the subband PMI may be $W_1 \cdot W_{2,k}$ or $W_1 \cdot W_2 \cdot W_f^H$, and accordingly: $W_1$ (wideband) may be constructed based on the OAM-based PMI feedback codebook; $W_2$ (wideband) or $W_{2,k}$ (subband) may be the coefficient matrix; and $W_f$ may contain a set of DFT vectors.

The first network node 505 may use the reported codewords on top of OAM beamforming such that the interference 550 from the backhaul OAM beams to the access link 125-*a* is mitigated. As the OAM-based PMI feedback codebook is derived from strict formula deduction, it may accurately represent the equivalent channel matrix from OAM beams 525 to the UE 115-*a* at any position of the UE 115-*a*. As discussed herein, based on the OAM-based PMI feedback codebook, the UE 115-*a* may feed back the subspace of interference matrix from OAM beams 525. The first network node 505 may add digital beamforming (wideband or subband) onto multiple OAM modes 525 (e.g., via analog beamforming) to suppress the interference of the OAM beams 525 to the UE 115-*a*. Thus, backhaul signals may be transmitted via OAM beams 525 while mitigating the interference to non-OAM signals 540 transmitted via the access link 125-*a* to the UE 115-*a*.

Figure 6:
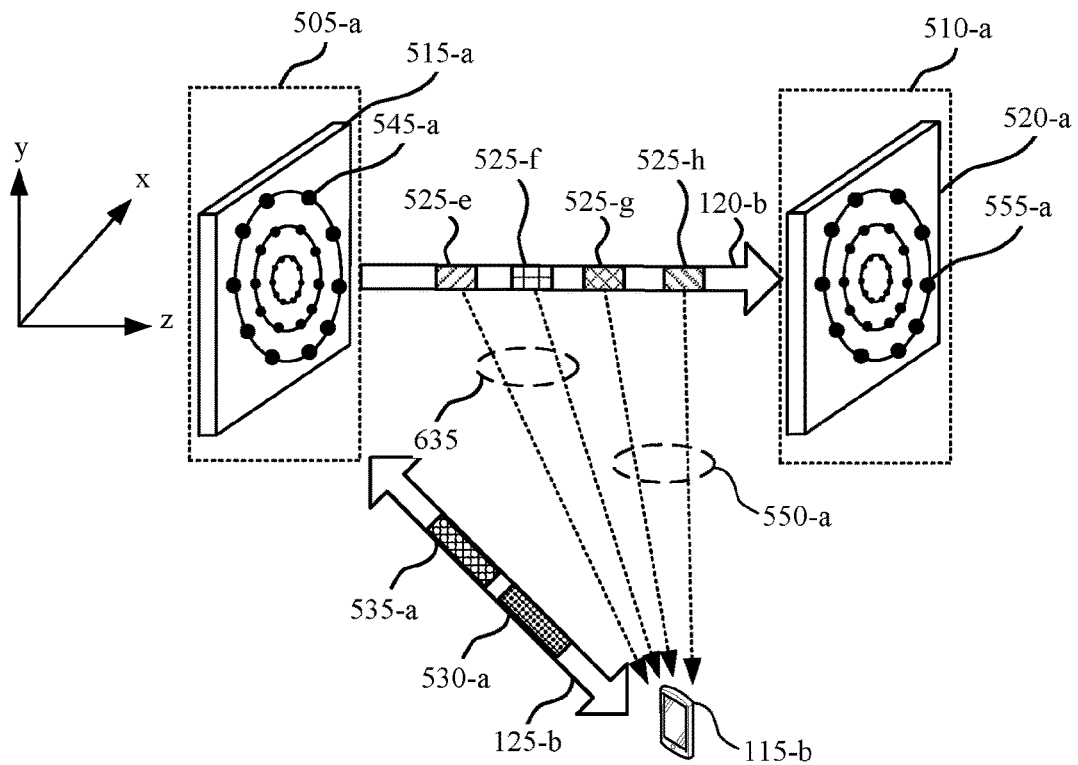
FIG. 6 illustrates an example of a wireless communications system that supports OAM based codebook for access communications in accordance with aspects of the present disclosure.
Figure 6:
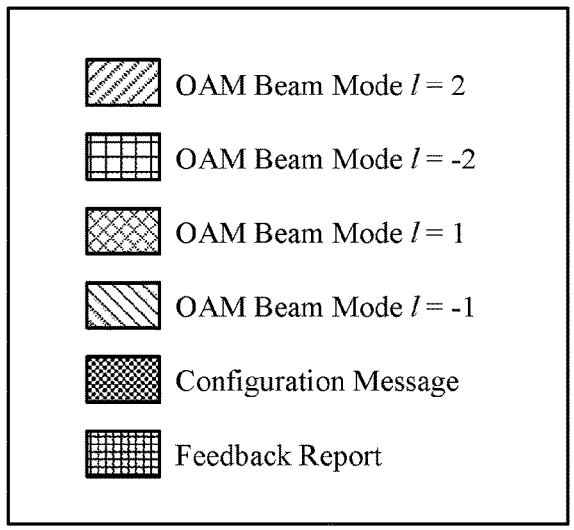

FIG. 6 illustrates an example of a wireless communications system 600 that supports OAM based codebook for access communications in accordance with aspects of the present disclosure. In some examples, wireless communications system 600 may implement aspects of wireless communications systems 100 and 500. The wireless communications system 600 may illustrate communications between a first network node 505-*a* and a second network node 510-*a*, where the first network node 505-*a* and the second network node 510-*a* may be the same device or may be different devices. The first network node 505-*a* and the second network node 510-*a* may each be a base station or an IAB node, among other devices. The first network node 505-*a* and the second network node 510-*a* may be examples of corresponding devices described herein. The wireless communications system 600 may further illustrate communications between the first network node 505-*a* and a UE 115-*b*, which may be an example of a UE 115 as described herein.

The first network node 505-*a* may communicate with the second network node 510-*a* via a backhaul link 120-*a* and the first network node 505-*a* may communicate with the UE 115-*b* via an access link 125-*a*. The first network node 505-*a* and the second network node 510-*a* may communicate over the backhaul link 120-*a* using OAM beams 525, for example as described with reference to the wireless communications system of FIG. 5. In some examples, the first network node 505-*a* may include a co-axial multi-ring UCA panel 515-*a* including a number of antenna elements 545-*a* and the second network node 510-*a* may a co-axial multi-ring UCA panel 520-*a* including a number of antenna elements 555-*a*. The UCA panels 515-*a* and 520-*a* may be used to generate and receive OAM beams for backhaul communications. If the UE 115-*b* is within a physically close proximity to the first network node 505-*a*, the UE 115-*b* may suffer high interference 550-*a* from the backhaul signals transmitted via the OAM beams 525, as described with reference to FIG. 5.

Accordingly, in some examples, the first network node 505-*a* may transmit OAM beams using the UCA panel 515-*a* as data beams 635 to the UE 115-*b* for access communications. As non-OAM beams transmitted to the UE 115-*b* may cause interference with the backhaul OAM beams transmitted to the second network node 510-*a*, the first network node 505-*a* may transmit some OAM beams (e.g., OAM beams 525-*e* and 525-*f*) to the UE 115-*b* for access communications. As OAM modes are orthogonal, the OAM beams 525-*e* and 525-*f*, which may correspond to mode l=2 and l=−2 do not interfere with the beams 525-*g* and 525-*h* which may correspond to mode l=1 and l=−1 which are transmitted to the second network node 510-*a* for backhaul communications. Because the OAM beams 525-*e* and 525-*f* may not be aimed or pointed at the UE 115-*b*, to improve channel gain, the OAM beams 525-*e* and 525-*f* may be combined (e.g., digitally precoded) based on the PMI report from the UE 115-*b*.

Accordingly, the first network node 505-*a* may transmit a configuration message 530-*a* to the UE 115-*b* that indicates a configuration for the feedback codebook. The first network node 505-*a* may transmit, using the UCA panel 515-*a*, a plurality of reference signals, each of the plurality of reference signals using OAM beams 525 (e.g., each reference signal may be associated with a respective OAM mode). In some examples, the value of $N_{backhaul}$ may not be predetermined and may not be indicated in the configuration message 530-a.

The UE 115-b may generate one or more codewords based on the configuration of the codebook and the received reference signals, and transmit a feedback report 535-a to the first network node 505-a indicating the one or more codewords. The UE 115-b may report the one or more codewords to the first network node 505-a. In some examples, the UE 115-b may determine the value of $N_{access}$ satisfying $N_{access} < N_{OAM}$, then report the value of $N_{access}$ (equivalent to RI) and $N_{access}$ dominant eigen vectors of $\tilde{H}^H \tilde{H}$ (denoted as D) based on OAM-based PMI feedback codebook. In some examples, the UE 115-b may report the one or more codewords in a CSI report, where the one or more codewords are based on the OAM-based PMI feedback codebook and represent the digital precoding matrix of parts of the OAM beams.

Reporting dominant eigenvectors of $\tilde{H}^H \tilde{H}$ may be equivalent to reporting a channel matrix from the OAM modes to UE 115-b. The subband channel matrix may be $H_1 \cdot H_{2,k}$ or $H_1 \cdot H_2 \cdot H_f^H$, and accordingly $H_1$ (wideband) may be constructed based on the OAM-based PMI feedback codebook; $H_2$ (wideband) or $H_{2,k}$ (subband) may be the coefficient matrix; and $H_f$ may contain a set of DFT vectors.

The first network node 505-a may use the reported one or more codewords on top of OAM beamforming so that a data signal 635 transmitted to the UE 115-b via OAM beams is enhanced. Further, due to the inter-mode orthogonality of the OAM modes, the access signals transmitted via OAM beams 525-e and 525-f may not interfere with or be interfered by the backhaul data signal 635 transmitted via OAM beams 525-g and 525-h, or interference may be limited. For example, the first network node 505-a may add digital beamforming (e.g., wideband or per subband) onto multiple OAM modes (analog beamforming) to enhance the equivalent channel gain to the UE 115-b.

Figure 7:
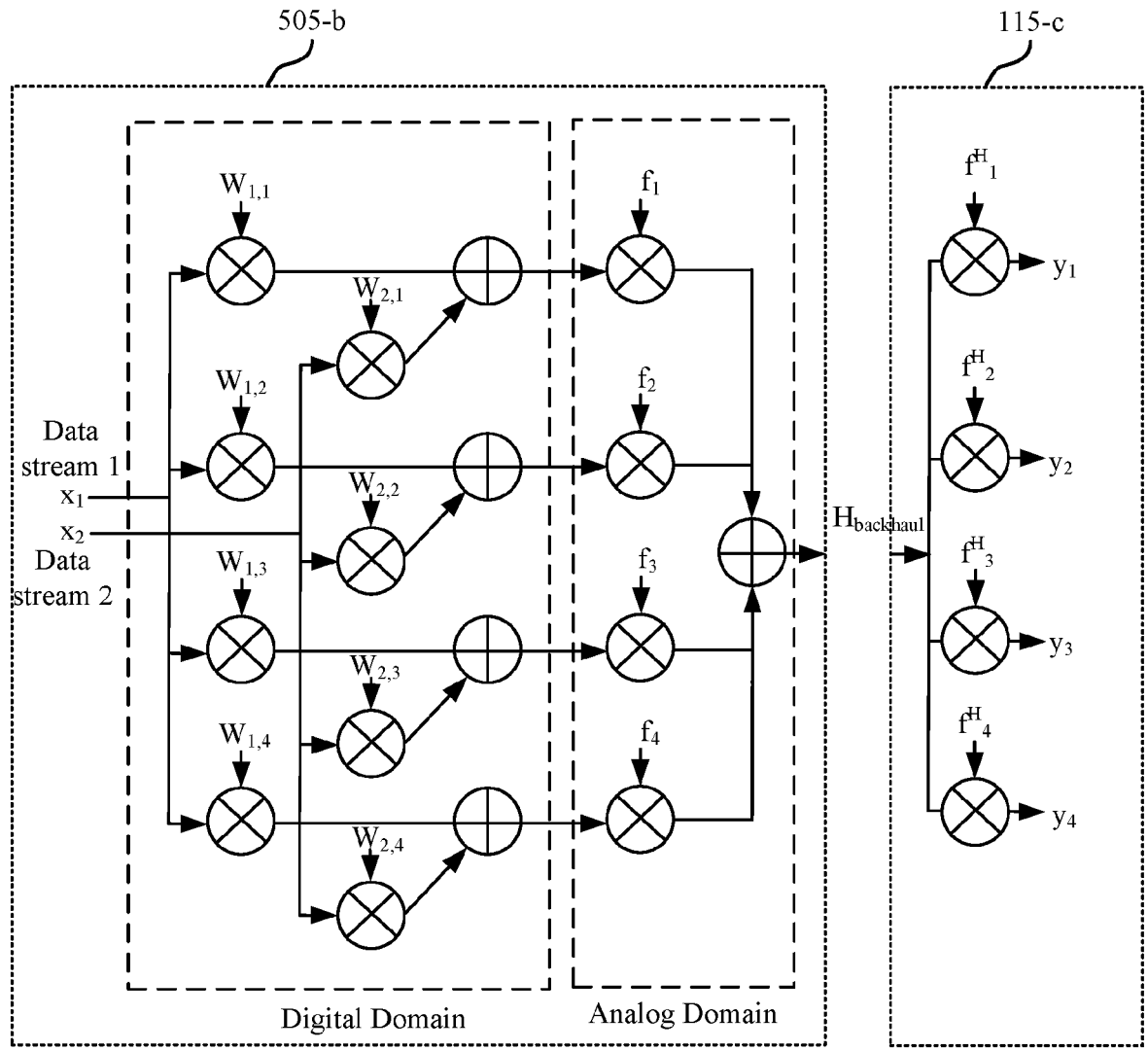
FIG. 7 illustrates an example of a precoding scheme that supports OAM based codebook for access communications in accordance with aspects of the present disclosure.

FIG. 7 illustrates an example of a precoding scheme 700 that supports OAM based codebook for access communications in accordance with aspects of the present disclosure. In some examples, the precoding scheme 700 may implement aspects of wireless communications systems 100, 500, or 600. The precoding scheme 700 may illustrate a precoding scheme for communications between a first network node 505-b and a second network node, where the first network node 505-b and the second network node may be the same device or may be different devices. The first network node 505-b and the second network node may each be a base station or an IAB node, among other devices. The precoding scheme 700 may also illustrate a precoding scheme for communications between the first network node 505-b and a UE 115-c, which may be an example of a corresponding device described herein.

As discussed herein the orthogonality of OAM modes guarantees that when OAM beams of given modes are used for access communications between the first network node 505-b and a UE 115-c, the OAM beams used for access communications will not interfere with OAM beams of different modes used for backhaul communications between the first network node 505-b and a second network node.

As illustrated in FIG. 7, the precoding scheme 700 may include 4 OAM modes, accordingly $N_{OAM}=4$. The number of backhaul streams $N_{backhaul}=2$, and the number of access antennas at the UE, $N_{Rx}=2$. The analog beam correlation may be denoted as $\rho_{m,n} = f_{rx}^H H_{backhaul} f_{tx}$, and the output of the receive analog beam m for data stream is given by $y_{i,m} = [W_{i,1}, \cdots, W_{i,N}] \cdot [\rho_{m,1}, \cdots, \rho_{m,N}]^T$. If without analog beam orthogonality, (i.e., $\rho_{m,n} \neq 0$ when $m \neq n$), the power of $y_{i,m}$ depends on two vectors' correlation (which may possibly be degraded greatly). With OAM beams, with analog beam orthogonality, $\rho_{m,n}=0$ when $m \neq n$, $y_{i,m} = w_{i,m} \lambda_m$, where $\lambda_m$ is channel gain of OAM mode m. Accordingly, the analog beam orthogonality property of OAM beams of different modes provides flexibility to mitigate or null interference between the access link and backhaul OAM beams.

Figure 8:
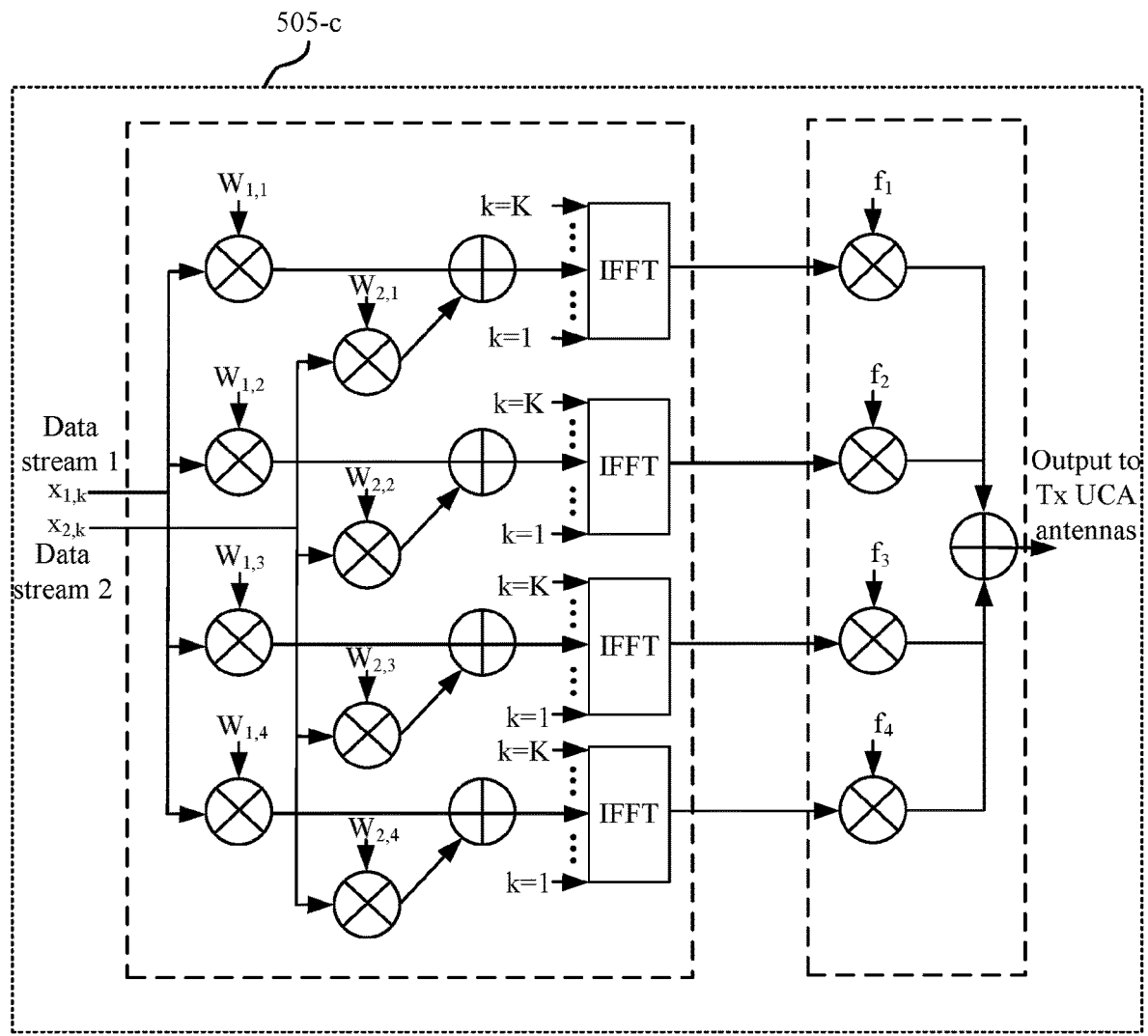
FIG. 8 illustrates an example of a precoding scheme that supports OAM based codebook for access communications in accordance with aspects of the present disclosure.

FIG. 8 illustrates an example of a precoding scheme 800 that supports OAM based codebook for access communications in accordance with aspects of the present disclosure. In some examples, the precoding scheme 800 may implement aspects of wireless communications systems 100, 500, or 600. The precoding scheme 00 may illustrate a precoding scheme for communications between a first network node 505-c and a second network node, where the first network node 505-c and the second network node may be the same device or may be different devices. The first network node 505-c and the second network node may each be a base station or an IAB node, among other devices. The precoding scheme 800 may also illustrate a precoding scheme for communications between the first network node 505-c and a UE, which may be an example of a corresponding device described herein.

As described herein, in some examples, because the link between the first network node 505-c and the UE may include multi-path propagation, to adapt with frequency-selective channel fading, per-subband precoding may be used. Accordingly, OFDM waveforms may be used in the OAM transmissions. For a subband k, the digital precoding matrix $W_1 W_{2,k}$ may be given by $$W_1 W_{2,k} = \begin{bmatrix} w_{1,1,k} & w_{2,1,k} \\ \vdots & \vdots \\ w_{1,4,k} & w_{2,4,k} \end{bmatrix}.$$

And for the subband k, the hybrid precoding matrix $FW_1 W_{2,k}$ based on the OAM-based PMI feedback codebook may be given by $$[f_1 \cdots f_4] \begin{bmatrix} w_{1,1,k} & w_{2,1,k} \\ \vdots & \vdots \\ w_{1,4,k} & w_{2,4,k} \end{bmatrix} = FW_1 W_{2,k},$$

where $f_1 \cdots f_4$ are Fourier vectors of OAM modes.

Figure 9:
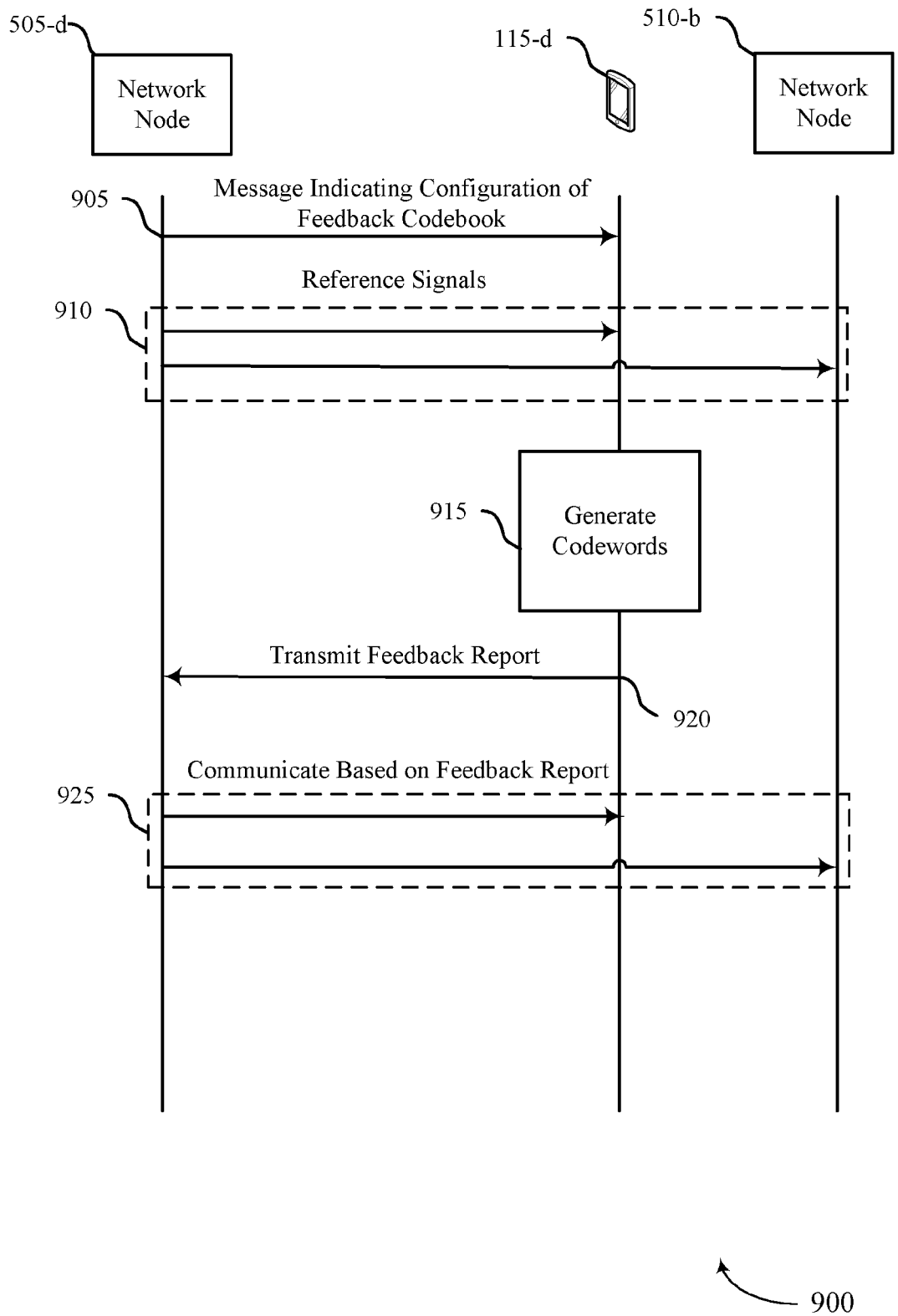
FIG. 9 illustrates an example of a process flow that supports OAM based codebook for access communications in accordance with aspects of the present disclosure.

FIG. 9 illustrates an example of a process flow 900 that supports OAM based codebook for access communications in accordance with aspects of the present disclosure. In some examples, the process flow 900 may implement aspects of wireless communications systems 100, 500, or 600. The process flow 900 may include a UE 115-d, which may be an example of a UE 115 as described herein. The process flow 900 may also include a first network node 505-d and a second network node 510-b. The first network node 505-d and the second network node 510-b may each be a base station or an IAB node, among other devices. The first network node 505-d and the second network node 510-b may be examples of corresponding devices described herein. The first network node 505-d and the second network node 510-b may be configured to communicate via a backhaul link using OAM beams. The first network node 505-d and the UE 115-d may be configured to communicate via an access link.

At 905, the first network node 505-*d* may transmit, to the UE 115-*d*, a message indicating a configuration for a feedback codebook for a plurality of reference signals associated with one or more OAM modes for backhaul communications associated with the first network node 505-*d*. In some examples, the message may indicate at least one of a maximum number of data streams in the access link or a number of data streams in the backhaul link. In some examples, the feedback codebook is based on a quantization of an angle between a possible direction of the UE 115-*d* and a transmission panel boresight direction of the first network node 505-*d* and the quantization of the angle between a projection of a possible direction of the UE 115-*d* onto a transmission panel of the first network node 505-*d* and an x-axis direction of the transmission panel of the first network node 505-*d*.

At 910, the first network node 505-*d* may transmit, and the UE 115-*d* may receive, a plurality of reference signals. Each of the plurality of reference signals may be associated with a respective OAM mode of the one or more OAM modes for the backhaul communications associated with the first network node 505-*d*. In some examples, the second network node 510-*b* may also receive the plurality of reference signals.

At 915, the UE 115-*d* may generate one or more codewords corresponding to UE feedback for the received plurality of reference signals and the respective OAM modes based on the feedback codebook and the plurality of reference signals received at 910. In some examples, the message received at 905 may indicate one or more parameters associated with the feedback codebook, the one or more parameters including a number of transmitter antennas, a set of orbital angular momentum modes, a radius of a transmitter antenna array of the first network node 505-*d*, a wavelength associated with the backhaul communications, or a combination thereof, and the UE 115-*d* may generate the one or more codewords based on the one or more parameters.

In some examples, the one or more codewords are based on a first angle between a possible direction of the UE 115-*d* and a transmission panel boresight direction of the network node, a second angle between a projection of a possible direction of the UE 115-*d* onto a transmission panel of the first network node 505-*d* and an x-axis direction of the transmission panel of the first network node 505-*d*, a radius of a transmitter antenna array of the first network node 505-*d*, a wavelength associated with the backhaul communications, and an OAM mode.

In some examples, the one or more codewords are based on one or more Bessel functions, where input values of the one or more Bessel functions include at least one of an angle between a possible direction of the UE 115-*d* and a transmission panel boresight direction of the first network node 505-*d*, a radius of a transmitter antenna array of the first network node 505-*d*, and a wavelength associated with the backhaul communications, and orders of the one or more Bessel functions are equal to orders of the one or more OAM modes for the backhaul communications.

At 920, the UE 115-*d* may transmit, to the first network node 505-*d*, a feedback report indicating the one or more codewords corresponding to UE feedback for the received plurality of reference signals and the respective OAM modes. In some cases, transmitting the feedback report may include transmitting an indication of channel state information of an access link between the UE 115-*d* and the first network node 505-*d* based on the received plurality of reference signals.

In some cases, the one or more codewords are associated with a reduction in interference the one or more OAM modes associated with the backhaul communications for the first network node 505-*d* to the access link. In some examples, the one or more codewords are associated with a number of non-dominant eigenvectors of a channel response matrix associated with the plurality of reference signals. In some examples, the number of non-dominant eigenvectors is equal to a number of data streams associated with the backhaul communications between the first network node 505-*d* and the second network node 510-*b*.

In some cases, transmitting the feedback report may include transmitting an indication of a number of data streams associated with the access link based at least in part on the number of non-dominant eigenvectors and the number of data streams associated with the backhaul communications between the first network node 505-*d* and the second network node 510-*b*. In some cases, transmitting the feedback report may include transmitting the feedback report indicating the one or more codewords associated with the number of non-dominant eigenvectors corresponding to a wideband channel associated with the plurality of reference signals. In some cases, transmitting the feedback report may include transmitting the feedback report indicating the one or more codewords associated with the first number of non-dominant eigenvectors per sub-band associated with the plurality of reference signals.

In some cases, transmitting the feedback report may include transmitting an indication of a number of data streams associated with the access link, where the one or more codewords include a number of dominant eigenvectors of a channel response matrix associated with the plurality of reference signals, where the number of dominant eigenvectors is equal to the number of data streams associated with the access link. In some cases, transmitting the feedback report may include transmitting the feedback report indicating the one or more codewords including the number of dominant eigenvectors corresponding to a wideband channel associated with the plurality of reference signals. In some cases, transmitting the feedback report may include transmitting the feedback report indicating the one or more codewords including the number of dominant eigenvectors per sub-band associated with the plurality of reference signals.

At 925, the first network node 505-*d* may communicate with the UE 115-*d* and/or the second network node 510-*b* based on the feedback report.

In some cases, the first network node 505-*d* may communicate with the UE 115-*d* via one or more non-OAM beamformed data signals transmitted from the first network node 505-*d* to the UE 115-*d* via the access link. In some cases, the UE 115-*d* may receive, from the first network node 505-*d*, a physical downlink shared channel message based at least in part on a quasi co-location information, where the quasi co-location information indicates an interference by the one or more codewords. For example, the one or more codewords may indicate a quasi co-location preference for the UE 115-*d* corresponding to a transmission configuration indicator (TCI) state that is associated with a reduced interference from the OAM beams used for backhaul communications for the first network node 505-*d* to use to transmit physical downlink shared channel messages.

In some cases, the first network node 505-*d* may communicate with the UE 115-*d* via transmitting OAM beamformed data signals of a set of OAM beamformed data signals from the first network node 505-*d* to the UE 115-*d* via the access link, where each of the set of orbital angular momentum beamformed data signals is associated with a respective OAM mode of the one or more OAM modes corresponding to the plurality of reference signals. In some examples, OAM modes associated with the OAM beamformed data signals transmitted via the access link are different from the OAM modes associated with OAM beamformed data signals transmitted via the backhaul link. In some examples, the UE 115-d may communicate with the first network node 505-d based on the OAM modes associated with the OAM beamformed data signals received via the access link, where at least one of the OAM modes associated with the OAM beamformed data signals received via the access link is associated with an OFDM waveform. And in some examples, the one or more codewords generated at 915 and reported at 920 are associated with data streams of the OAM modes associated with the OAM beamformed data signals received via the access link and the OFDM waveform.

Figure 10:
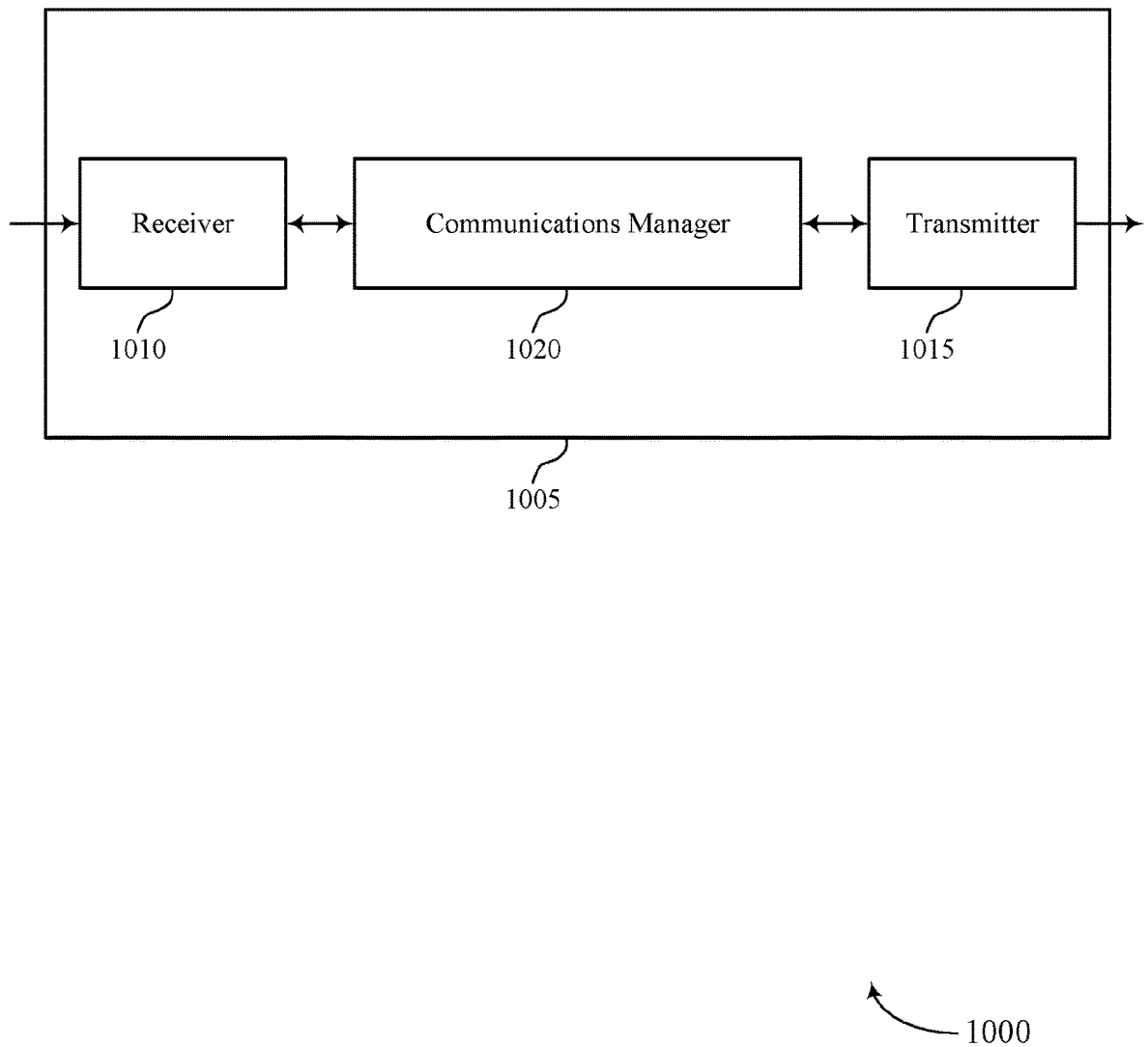
FIGS. 10 and 11 show block diagrams of devices that support OAM based codebook for access communications in accordance with aspects of the present disclosure.

FIG. 10 shows a block diagram 1000 of a device 1005 that supports OAM based codebook for access communications in accordance with aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to OAM based codebook for access communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to OAM based codebook for access communications). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of OAM based codebook for access communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a UE in accordance with examples as disclosed herein. For example, the communications manager 1020 may be configured as or otherwise support a means for receiving, from a network node, a message indicating a configuration for a feedback codebook for a set of multiple reference signals associated with one or more OAM modes for backhaul communications associated with the network node. The communications manager 1020 may be configured as or otherwise support a means for receiving, from the network node, the set of multiple reference signals, each of the set of multiple reference signals associated with a respective OAM mode of the one or more OAM modes for the backhaul communications associated with the network node. The communications manager 1020 may be configured as or otherwise support a means for transmitting, to the network node and based on the configuration for the feedback codebook, a feedback report indicating one or more codewords corresponding to UE feedback for the received set of multiple reference signals and the respective OAM modes.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources by reducing or eliminating interference between backhaul OAM beams and access communications.

Figure 11:
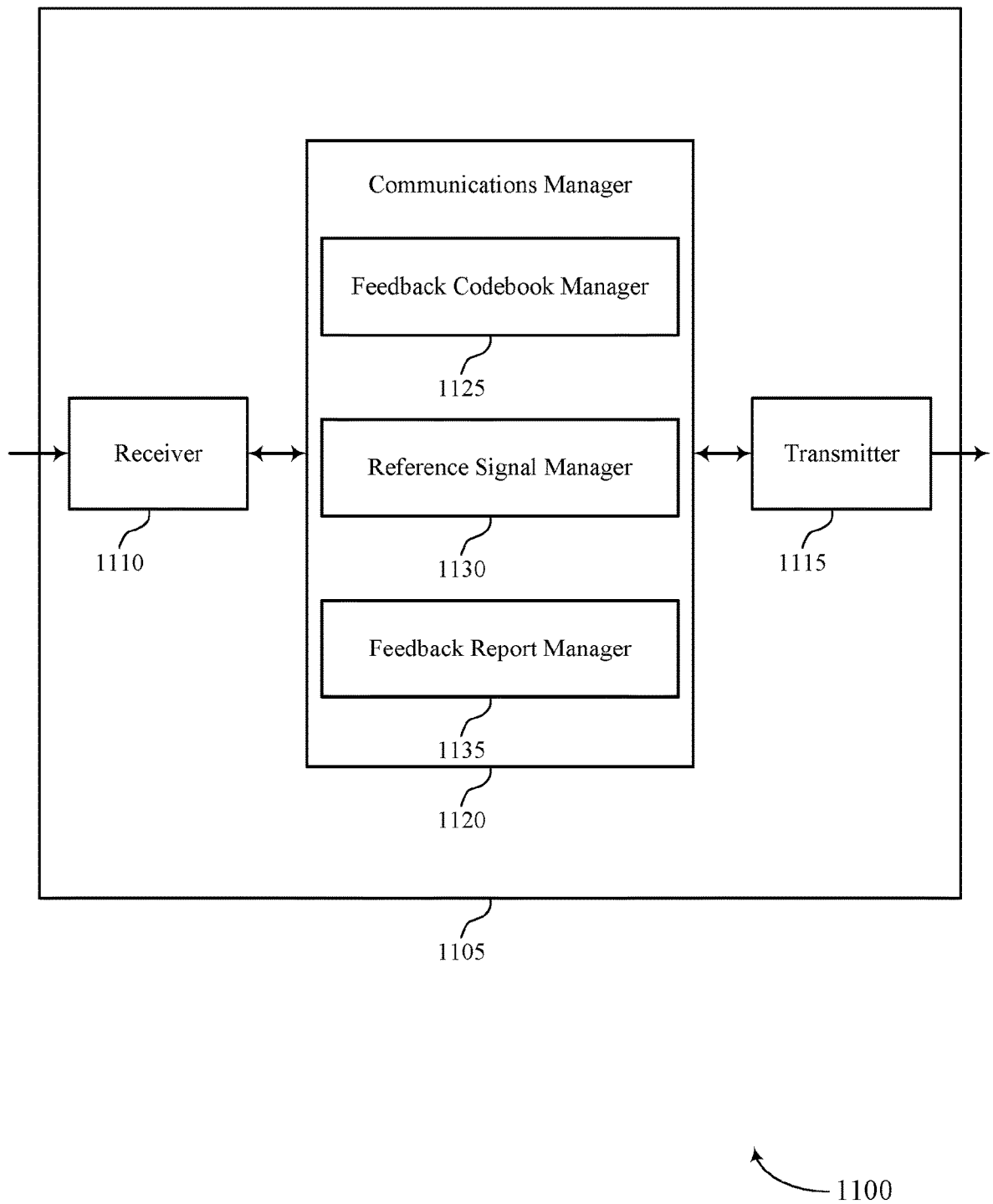

FIG. 11 shows a block diagram 1100 of a device 1105 that supports OAM based codebook for access communications in accordance with aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to OAM based codebook for access communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to OAM based codebook for access communications). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of OAM based codebook for access communications as described herein. For example, the communications manager 1120 may include a feedback codebook manager 1125, a reference signal manager 1130, a feedback report manager 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a UE in accordance with examples as disclosed herein. The feedback codebook manager 1125 may be configured as or otherwise support a means for receiving, from a network node, a message indicating a configuration for a feedback codebook for a set of multiple reference signals associated with one or more OAM modes for backhaul communications associated with the network node. The reference signal manager 1130 may be configured as or otherwise support a means for receiving, from the network node, the set of multiple reference signals, each of the set of multiple reference signals associated with a respective OAM mode of the one or more OAM modes for the backhaul communications associated with the network node. The feedback report manager 1135 may be configured as or otherwise support a means for transmitting, to the network node and based on the configuration for the feedback codebook, a feedback report indicating one or more codewords corresponding to UE feedback for the received set of multiple reference signals and the respective OAM modes.

Figure 12:
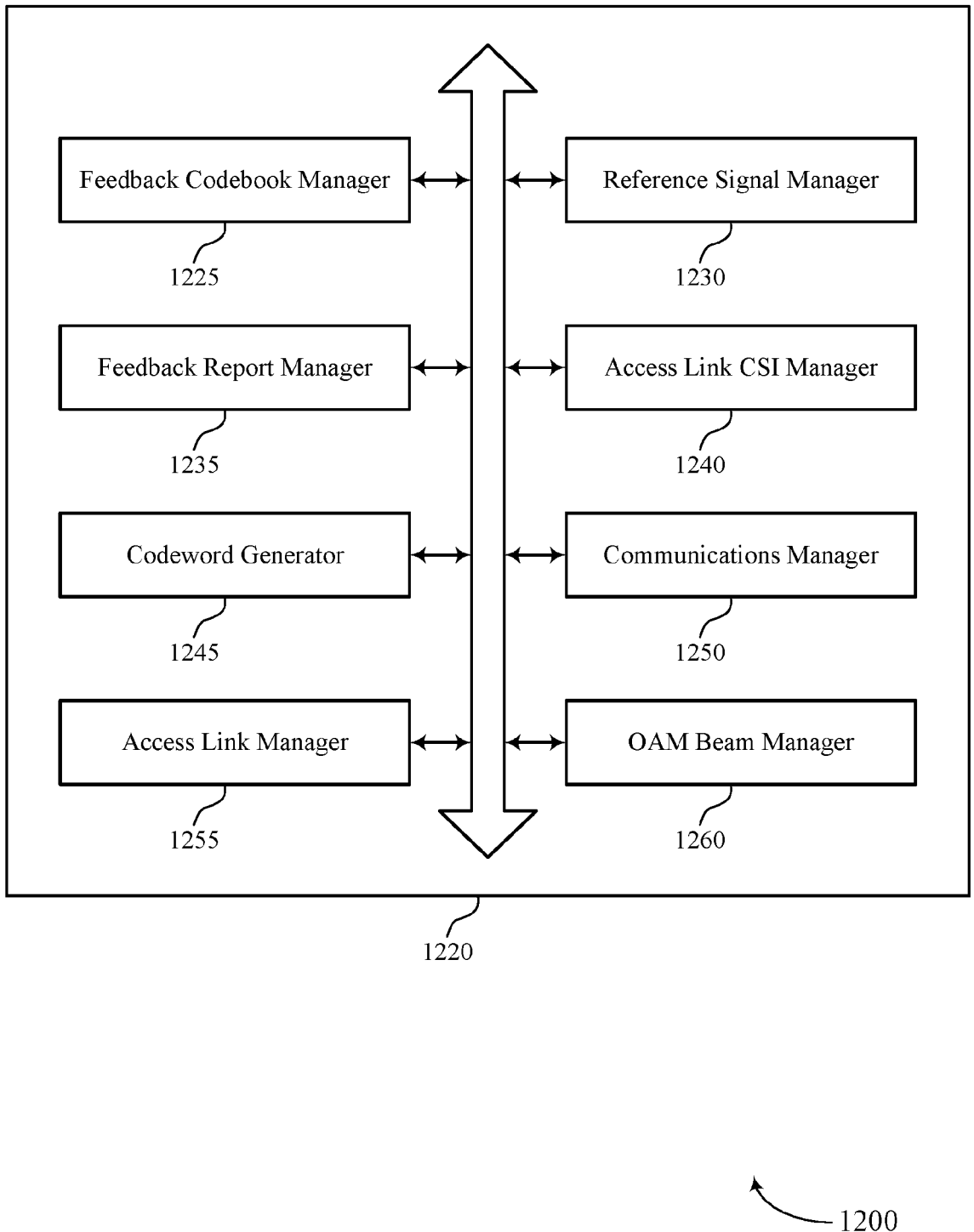
FIG. 12 shows a block diagram of a communications manager that supports OAM based codebook for access communications in accordance with aspects of the present disclosure.

FIG. 12 shows a block diagram 1200 of a communications manager 1220 that supports OAM based codebook for access communications in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of OAM based codebook for access communications as described herein. For example, the communications manager 1220 may include a feedback codebook manager 1225, a reference signal manager 1230, a feedback report manager 1235, an access link CSI manager 1240, a codeword generator 1245, a communications manager 1250, an access link manager 1255, a OAM beam manager 1260, or any combination thereof. Each of these components may communicate, directly or indirectly, with one another (e.g., via one or more buses).

The communications manager 1220 may support wireless communications at a UE in accordance with examples as disclosed herein. The feedback codebook manager 1225 may be configured as or otherwise support a means for receiving, from a network node, a message indicating a configuration for a feedback codebook for a set of multiple reference signals associated with one or more OAM modes for backhaul communications associated with the network node. The reference signal manager 1230 may be configured as or otherwise support a means for receiving, from the network node, the set of multiple reference signals, each of the set of multiple reference signals associated with a respective OAM mode of the one or more OAM modes for the backhaul communications associated with the network node. The feedback report manager 1235 may be configured as or otherwise support a means for transmitting, to the network node and based on the configuration for the feedback codebook, a feedback report indicating one or more codewords corresponding to UE feedback for the received set of multiple reference signals and the respective OAM modes.

In some examples, to support transmitting the feedback report, the access link CSI manager 1240 may be configured as or otherwise support a means for transmitting an indication of channel state information of an access link between the UE and the network node based on the received set of multiple reference signals.

In some examples, the one or more codewords are associated with a reduction in interference the one or more OAM modes associated with the backhaul communications for the network node to the access link.

In some examples, the one or more codewords are associated with a first number of non-dominant eigenvectors of a channel response matrix associated with the set of multiple reference signals.

In some examples, the first number of non-dominant eigenvectors is equal to a second number of data streams associated with the backhaul communications.

In some examples, to support transmitting the feedback report, the access link manager 1255 may be configured as or otherwise support a means for transmitting an indication of a third number of data streams associated with the access link based on the first number of non-dominant eigenvectors and the second number of data streams associated with the backhaul communications.

In some examples, to support transmitting the feedback report, the feedback report manager 1235 may be configured as or otherwise support a means for transmitting the feedback report indicating the one or more codewords associated with the first number of non-dominant eigenvectors corresponding to a wideband channel associated with the set of multiple reference signals.

In some examples, to support transmitting the feedback report, the feedback report manager 1235 may be configured as or otherwise support a means for transmitting the feedback report indicating the one or more codewords associated with the first number of non-dominant eigenvectors per sub-band associated with the set of multiple reference signals.

In some examples, the communications manager 1250 may be configured as or otherwise support a means for communicating with the network node based on the feedback report.

In some examples, to support communicating with the network node, the access link manager 1255 may be configured as or otherwise support a means for receiving one or more non-OAM beamformed data signals from the network node via the access link.

In some examples, to support receiving one or more non-OAM beamformed data signals from the network node via the access link, the access link manager 1255 may be configured as or otherwise support a means for receiving, from the network node, a physical downlink shared channel message based on a quasi co-location information, where the quasi co-location information indicates an interference by the one or more codewords.

In some examples, to support communicating with the network node, the OAM beam manager 1260 may be configured as or otherwise support a means for receiving OAM beamformed data signals of a set of OAM beamformed data signals via the access link, where each of the set of OAM beamformed data signals is associated with a respective OAM mode of the one or more OAM modes.

In some examples, the OAM modes associated with the OAM beamformed data signals received via the access link are different from OAM modes associated with OAM beamformed data signals received via a backhaul link.

In some examples, to support transmitting the feedback report, the access link manager 1255 may be configured as or otherwise support a means for transmitting an indication of a first number of data streams associated with the access link, where the one or more codewords include a second number of dominant eigenvectors of a channel response matrix associated with the set of multiple reference signals, where the second number of dominant eigenvectors is equal to the first number of data streams.

In some examples, to support transmitting the feedback report, the feedback report manager 1235 may be configured as or otherwise support a means for transmitting the feedback report indicating the one or more codewords including the second number of dominant eigenvectors corresponding to a wideband channel associated with the set of multiple reference signals.

In some examples, to support transmitting the feedback report, the feedback report manager 1235 may be configured as or otherwise support a means for transmitting the feedback report indicating the one or more codewords including the second number of dominant eigenvectors per sub-band associated with the set of multiple reference signals.

In some examples, the OAM beam manager 1260 may be configured as or otherwise support a means for communicating with the network node based on the OAM modes associated with the OAM beamformed data signals received via the access link, where at least one of the OAM modes associated with the OAM beamformed data signals received via the access link is associated with an orthogonal frequency division modulation waveform.

In some examples, the one or more codewords are associated with data streams of the OAM modes associated with the OAM beamformed data signals received via the access link and the orthogonal frequency division modulation waveform.

In some examples, the feedback codebook manager 1225 may be configured as or otherwise support a means for receiving, with the message, one or more parameters associated with the feedback codebook, the one or more parameters including a number of transmitter antennas, a set of OAM modes, a radius of a transmitter antenna array of the network node, a wavelength associated with the backhaul communications, or a combination thereof. In some examples, the codeword generator 1245 may be configured as or otherwise support a means for generating the one or more codewords based on the one or more parameters.

In some examples, the feedback codebook manager 1225 may be configured as or otherwise support a means for receiving, with the message, at least one of a maximum number of data streams in access link or a number of data streams in backhaul link.

In some examples, the one or more codewords are based on a first angle between a first possible direction of the UE and a transmission panel boresight direction of the network node, a second angle between a projection of a second possible direction of the UE onto a transmission panel of the network node and an x-axis direction of the transmission panel of the network node, a radius of a transmitter antenna array of the network node, a wavelength associated with the backhaul communications, and an OAM mode.

In some examples, the one or more codewords are based on one or more Bessel functions. In some examples, input values of the one or more Bessel functions include at least one of an angle between a first possible direction of the UE and a transmission panel boresight direction of the network node, a radius of a transmitter antenna array of the network node, and a wavelength associated with the backhaul communications. In some examples, orders of the one or more Bessel functions are equal to orders of the one or more OAM modes for the backhaul communications.

In some examples, the feedback codebook is based on a quantization of an angle between a first possible direction of the UE and a transmission panel boresight direction of the network node and the quantization of the angle between a projection of a second possible direction of the UE onto a transmission panel of the network node and an x-axis direction of the transmission panel of the network node.

Figure 13:
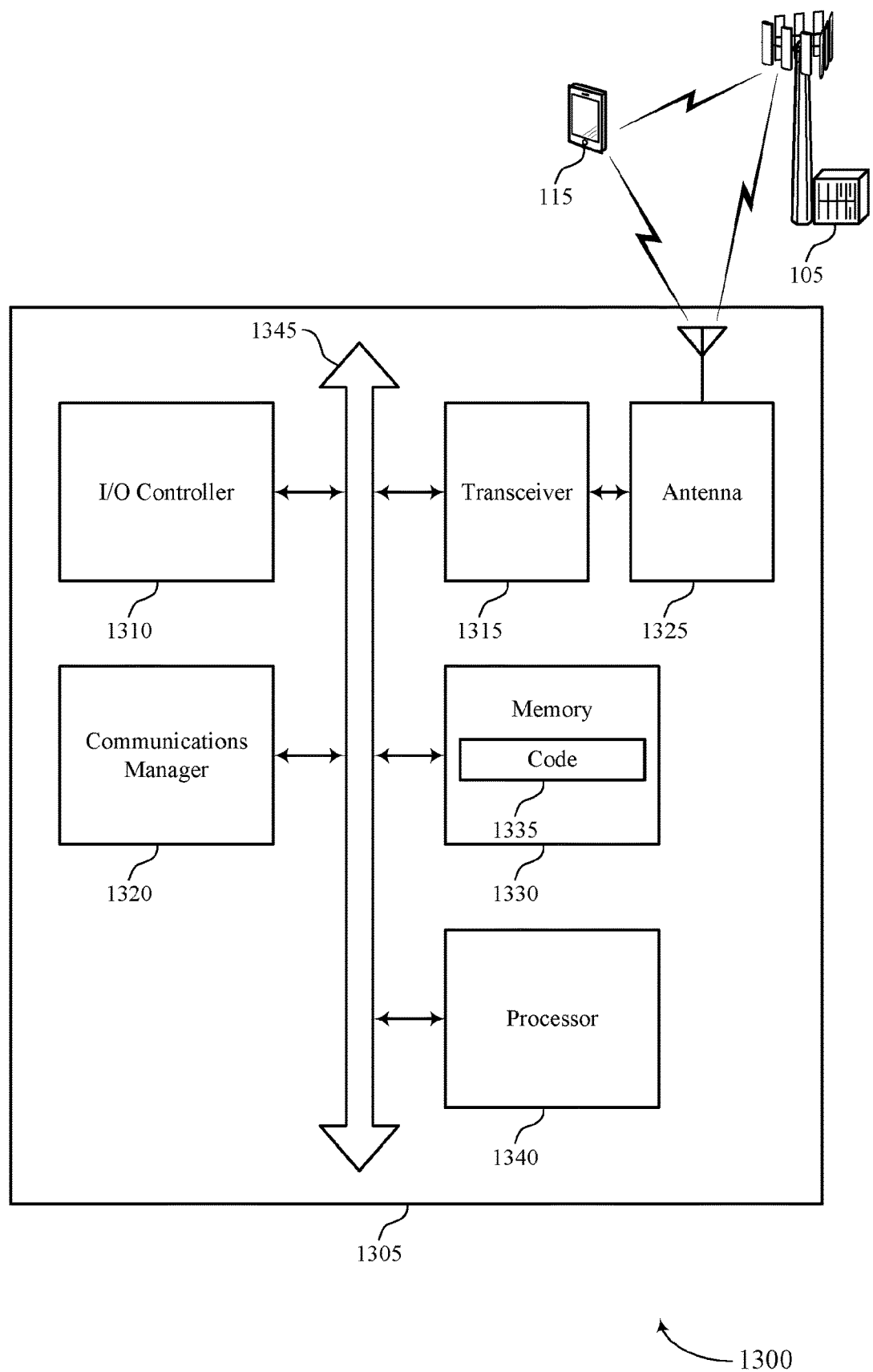
FIG. 13 shows a diagram of a system including a device that supports OAM based codebook for access communications in accordance with aspects of the present disclosure.

FIG. 13 shows a diagram of a system 1300 including a device 1305 that supports OAM based codebook for access communications in accordance with aspects of the present disclosure. The device 1305 may be an example of or include the components of a device 1005, a device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting OAM based codebook for access communications). For example, the device 1305 or a component of the device 1305 may include a processor 1340 and memory 1330 coupled to the processor 1340, the processor 1340 and memory 1330 configured to perform various functions described herein.

The communications manager 1320 may support wireless communications at a UE in accordance with examples as disclosed herein. For example, the communications manager 1320 may be configured as or otherwise support a means for receiving, from a network node, a message indicating a configuration for a feedback codebook for a set of multiple reference signals associated with one or more OAM modes for backhaul communications associated with the network node. The communications manager 1320 may be configured as or otherwise support a means for receiving, from the network node, the set of multiple reference signals, each of the set of multiple reference signals associated with a respective OAM mode of the one or more OAM modes for the backhaul communications associated with the network node. The communications manager 1320 may be configured as or otherwise support a means for transmitting, to the network node and based on the configuration for the feedback codebook, a feedback report indicating one or more codewords corresponding to UE feedback for the received set of multiple reference signals and the respective OAM modes.

By including or configuring the communications manager 1320 in accordance with examples as described herein, the device 1305 may support techniques for improved communication reliability, more efficient utilization of communication, and improved coordination between devices by reducing or eliminating interference between backhaul OAM beams and access communications.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of OAM based codebook for access communications as described herein, or the processor 1340 and the memory 1330 may be otherwise configured to perform or support such operations.

Figure 14:
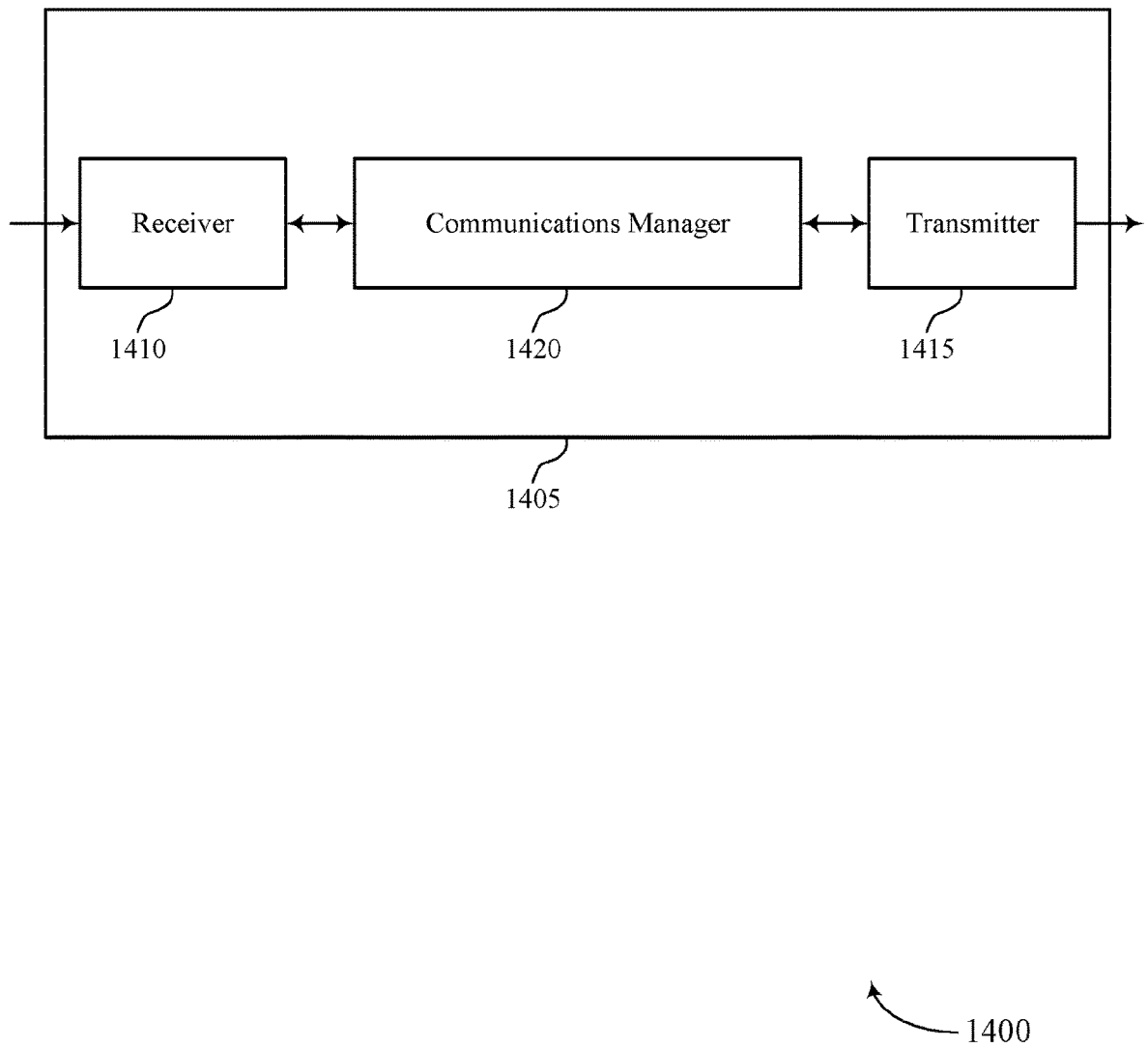
FIGS. 14 and 15 show block diagrams of devices that support OAM based codebook for access communications in accordance with aspects of the present disclosure.

FIG. 14 shows a block diagram 1400 of a device 1405 that supports OAM based codebook for access communications in accordance with aspects of the present disclosure. The device 1405 may be an example of aspects of a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to OAM based codebook for access communications). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to OAM based codebook for access communications). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of OAM based codebook for access communications as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1420 may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communications at a first network node in accordance with examples as disclosed herein. For example, the communications manager 1420 may be configured as or otherwise support a means for transmitting, to a UE, a message indicating a configuration for a feedback codebook for a set of multiple reference signals associated with one or more OAM modes for backhaul communications associated with the first network node. The communications manager 1420 may be configured as or otherwise support a means for transmitting, to the UE, the set of multiple reference signals, each of the set of multiple reference signals associated with a respective OAM mode of the one or more OAM modes, where the one or more OAM modes are associated with the backhaul communications between the first network node and a second network node. The communications manager 1420 may be configured as or otherwise support a means for receiving, from the UE and based on the configuration for the feedback codebook, a feedback report indicating one or more codewords corresponding to UE feedback for the transmitted set of multiple reference signals and the respective OAM modes. The communications manager 1420 may be configured as or otherwise support a means for communicating with the UE, the second network node, or both based on the feedback report.

By including or configuring the communications manager 1420 in accordance with examples as described herein, the device 1405 (e.g., a processor controlling or otherwise coupled to the receiver 1410, the transmitter 1415, the communications manager 1420, or a combination thereof) may support techniques for more efficient utilization of communication resources by reducing or eliminating interference between backhaul OAM beams and access communications.

Figure 15:
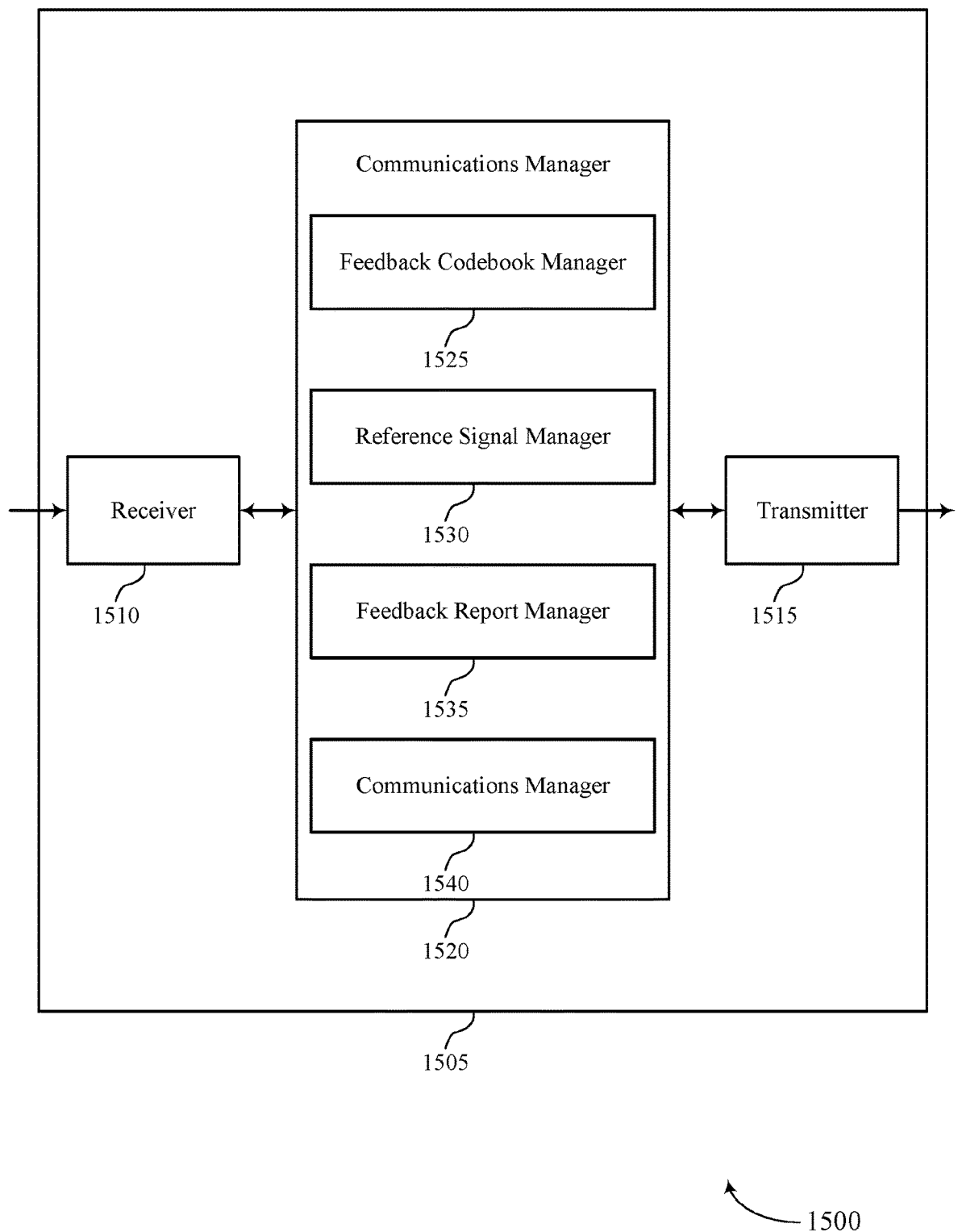

FIG. 15 shows a block diagram 1500 of a device 1505 that supports OAM based codebook for access communications in accordance with aspects of the present disclosure. The device 1505 may be an example of aspects of a device 1405 or a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to OAM based codebook for access communications). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to OAM based codebook for access communications). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of OAM based codebook for access communications as described herein. For example, the communications manager 1520 may include a feedback codebook manager 1525, a reference signal manager 1530, a feedback report manager 1535, a communications manager 1540, or any combination thereof. The communications manager 1520 may be an example of aspects of a communications manager 1420 as described herein. In some examples, the communications manager 1520, or various components thereof, may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communications at a first network node in accordance with examples as disclosed herein. The feedback codebook manager 1525 may be configured as or otherwise support a means for transmitting, to a UE, a message indicating a configuration for a feedback codebook for a set of multiple reference signals associated with one or more OAM modes for backhaul communications associated with the first network node. The reference signal manager 1530 may be configured as or otherwise support a means for transmitting, to the UE, the set of multiple reference signals, each of the set of multiple reference signals associated with a respective OAM mode of the one or more OAM modes, where the one or more OAM modes are associated with the backhaul communications between the first network node and a second network node. The feedback report manager 1535 may be configured as or otherwise support a means for receiving, from the UE and based on the configuration for the feedback codebook, a feedback report indicating one or more codewords corresponding to UE feedback for the transmitted set of multiple reference signals and the respective OAM modes. The communications manager 1540 may be configured as or otherwise support a means for communicating with the UE, the second network node, or both based on the feedback report.

Figure 16:
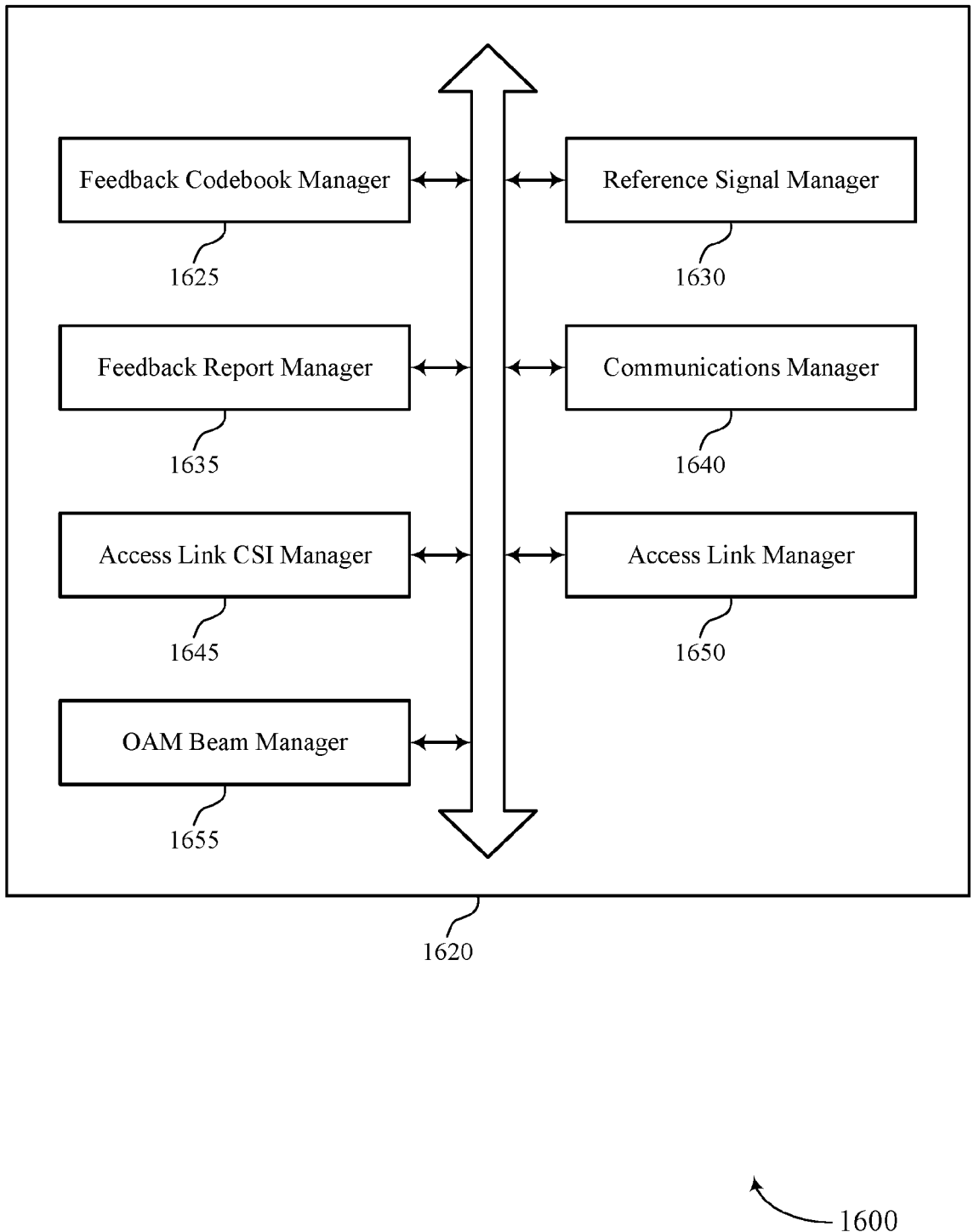
FIG. 16 shows a block diagram of a communications manager that supports OAM based codebook for access communications in accordance with aspects of the present disclosure.

FIG. 16 shows a block diagram 1600 of a communications manager 1620 that supports OAM based codebook for access communications in accordance with aspects of the present disclosure. The communications manager 1620 may be an example of aspects of a communications manager 1420, a communications manager 1520, or both, as described herein. The communications manager 1620, or various components thereof, may be an example of means for performing various aspects of OAM based codebook for access communications as described herein. For example, the communications manager 1620 may include a feedback codebook manager 1625, a reference signal manager 1630, a feedback report manager 1635, a communications manager 1640, an access link CSI manager 1645, an access link manager 1650, a OAM beam manager 1655, or any combination thereof. Each of these components may communicate, directly or indirectly, with one another (e.g., via one or more buses).

The communications manager 1620 may support wireless communications at a first network node in accordance with examples as disclosed herein. The feedback codebook manager 1625 may be configured as or otherwise support a means for transmitting, to a UE, a message indicating a configuration for a feedback codebook for a set of multiple reference signals associated with one or more OAM modes for backhaul communications associated with the first network node. The reference signal manager 1630 may be configured as or otherwise support a means for transmitting, to the UE, the set of multiple reference signals, each of the set of multiple reference signals associated with a respective OAM mode of the one or more OAM modes, where the one or more OAM modes are associated with the backhaul communications between the first network node and a second network node. The feedback report manager 1635 may be configured as or otherwise support a means for receiving, from the UE and based on the configuration for the feedback codebook, a feedback report indicating one or more codewords corresponding to UE feedback for the transmitted set of multiple reference signals and the respective OAM modes. The communications manager 1640 may be configured as or otherwise support a means for communicating with the UE, the second network node, or both based on the feedback report.

In some examples, to support receiving the feedback report, the access link CSI manager 1645 may be configured as or otherwise support a means for receiving an indication of channel state information of an access link between the UE and the first network node based on the transmitted set of multiple reference signals.

In some examples, the one or more codewords are associated with a reduction in interference the one or more OAM modes associated with the backhaul communications for the first network node to the access link.

In some examples, the one or more codewords are associated with a first number of non-dominant eigenvectors of a channel response matrix associated with the set of multiple reference signals.

In some examples, the first number of non-dominant eigenvectors is equal to a second number of data streams associated with the backhaul communications.

In some examples, to support receiving the feedback report, the access link CSI manager 1645 may be configured as or otherwise support a means for receiving an indication of a third number of data streams associated with the access link based on the first number of non-dominant eigenvectors and the second number of data streams associated with the backhaul communications.

In some examples, to support receiving the feedback report, the feedback report manager 1635 may be configured as or otherwise support a means for receiving the feedback report indicating the one or more codewords associated with the first number of non-dominant eigenvectors corresponding to a wideband channel associated with the set of multiple reference signals.

In some examples, to support receiving the feedback report, the feedback report manager 1635 may be configured as or otherwise support a means for receiving the feedback report indicating the one or more codewords associated with the first number of non-dominant eigenvectors per sub-band associated with the set of multiple reference signals.

In some examples, to support communicating with the UE, the access link manager 1650 may be configured as or otherwise support a means for transmitting one or more non-OAM beamformed data signals to the UE via the access link.

In some examples, to support transmitting one or more non-OAM beamformed data signals from the first network node via the access link, the access link manager 1650 may be configured as or otherwise support a means for transmitting a physical downlink shared channel message based on a quasi co-location information, where the quasi co-location information indicates an interference by the one or more codewords.

In some examples, to support communicating with the UE, the OAM beam manager 1655 may be configured as or otherwise support a means for transmitting OAM beamformed data signals of a set of OAM beamformed data signals via the access link, where each of the set of OAM beamformed data signals is associated with a respective OAM mode of the one or more OAM modes.

In some examples, the OAM modes associated with the OAM beamformed data signals received via the access link are different from OAM modes associated with OAM beamformed data signals received via a backhaul link.

In some examples, to support receiving the feedback report, the feedback codebook manager 1625 may be configured as or otherwise support a means for receiving an indication of a first number of data streams associated with the access link, where the one or more codewords include a second number of dominant eigenvectors of a channel response matrix associated with the set of multiple reference signals, where the second number of dominant eigenvectors is equal to the first number of data streams.

In some examples, to support receiving the feedback report, the feedback codebook manager 1625 may be configured as or otherwise support a means for receiving the feedback report indicating the one or more codewords including the second number of dominant eigenvectors corresponding to a wideband channel associated with the set of multiple reference signals.

In some examples, to support receiving the feedback report, the feedback report manager 1635 may be configured as or otherwise support a means for receiving the feedback report indicating the one or more codewords including the second number of dominant eigenvectors per sub-band associated with the set of multiple reference signals.

In some examples, to support communicating with the UE, the OAM beam manager 1655 may be configured as or otherwise support a means for communicating with the UE based on the OAM modes associated with the OAM beamformed data signals received via the access link, where at least one of the OAM modes associated with the OAM beamformed data signals received via the access link is associated with an orthogonal frequency division modulation waveform.

In some examples, the one or more codewords are associated with data streams of the OAM modes associated with the OAM beamformed data signals received via the access link and the orthogonal frequency division modulation waveform.

In some examples, the feedback codebook manager 1625 may be configured as or otherwise support a means for transmitting, with the message, one or more parameters associated with the feedback codebook, the one or more parameters including a number of transmitter antennas, a set of OAM modes, a radius of a transmitter antenna array of the first network node, a wavelength associated with the backhaul communications, or a combination thereof.

In some examples, the feedback codebook manager 1625 may be configured as or otherwise support a means for transmitting, with the message, at least one of a maximum number of data streams in an access link or a number of data streams in a backhaul link.

In some examples, the one or more codewords are based on a first angle between a first possible direction of the UE and a transmission panel boresight direction of the first network node, a second angle between a projection of a possible direction of the UE onto a transmission panel of the first network node and an x-axis direction of the transmission panel of the first network node, a radius of a transmitter antenna array of the first network node, a wavelength associated with the backhaul communications, and an OAM mode.

In some examples, the one or more codewords are based on one or more Bessel functions. In some examples, input values of the one or more Bessel functions include at least one of an angle between a first possible direction of the UE and a transmission panel boresight direction of the first network node, a radius of a transmitter antenna array of the first network node, and a wavelength associated with the backhaul communications. In some examples, orders of the one or more Bessel functions are equal to orders of the one or more OAM modes for the backhaul communications.

In some examples, the feedback codebook is based on a quantization of an angle between a first possible direction of the UE and a transmission panel boresight direction of the first network node and the quantization of the angle between a projection of a possible direction of the UE onto a transmission panel of the first network node and an x-axis direction of the transmission panel of the first network node.

Figure 17:
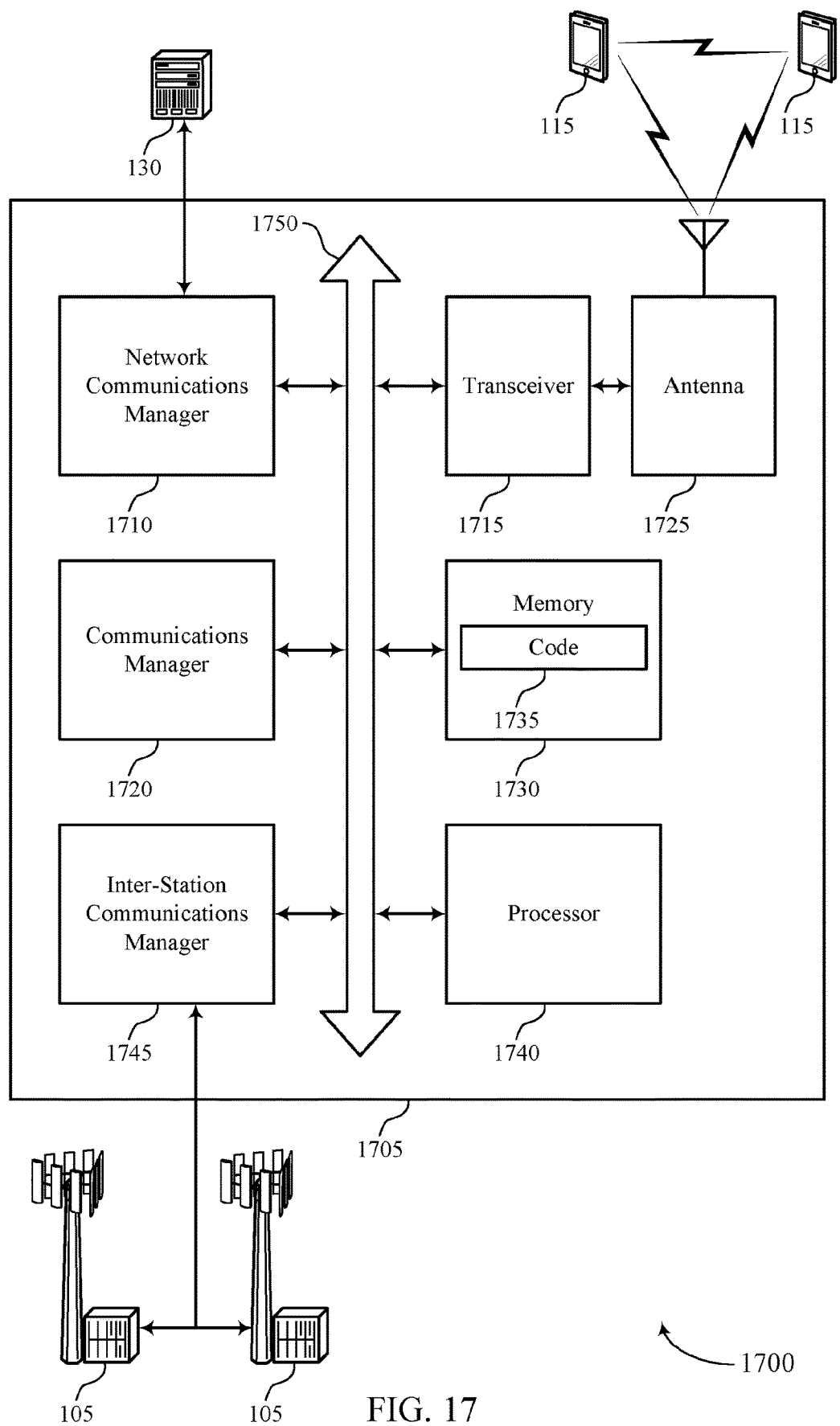
FIG. 17 shows a diagram of a system including a device that supports OAM based codebook for access communications in accordance with aspects of the present disclosure.

FIG. 17 shows a diagram of a system 1700 including a device 1705 that supports OAM based codebook for access communications in accordance with aspects of the present disclosure. The device 1705 may be an example of or include the components of a device 1405, a device 1505, or a base station 105 as described herein. The device 1705 may communicate wirelessly with one or more base stations 105, UEs 115, or any combination thereof. The device 1705 may include components for bi-directional voice and data communications including components for transmitting and receiving communications, such as a communications manager 1720, a network communications manager 1710, a transceiver 1715, an antenna 1725, a memory 1730, code 1735, a processor 1740, and an inter-station communications manager 1745. These components may be in electronic communication or otherwise coupled (e.g., operatively, communicatively, functionally, electronically, electrically) via one or more buses (e.g., a bus 1750).

The network communications manager 1710 may manage communications with a core network 130 (e.g., via one or more wired backhaul links). For example, the network communications manager 1710 may manage the transfer of data communications for client devices, such as one or more UEs 115.

In some cases, the device 1705 may include a single antenna 1725. However, in some other cases the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include RAM and ROM. The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a BIOS which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting OAM based codebook for access communications). For example, the device 1705 or a component of the device 1705 may include a processor 1740 and memory 1730 coupled to the processor 1740, the processor 1740 and memory 1730 configured to perform various functions described herein.

The inter-station communications manager 1745 may manage communications with other base stations 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communications network technology to provide communication between base stations 105.

The communications manager 1720 may support wireless communications at a first network node in accordance with examples as disclosed herein. For example, the communications manager 1720 may be configured as or otherwise support a means for transmitting, to a UE, a message indicating a configuration for a feedback codebook for a set of multiple reference signals associated with one or more OAM modes for backhaul communications associated with the first network node. The communications manager 1720 may be configured as or otherwise support a means for transmitting, to the UE, the set of multiple reference signals, each of the set of multiple reference signals associated with a respective OAM mode of the one or more OAM modes, where the one or more OAM modes are associated with the backhaul communications between the first network node and a second network node. The communications manager 1720 may be configured as or otherwise support a means for receiving, from the UE and based on the configuration for the feedback codebook, a feedback report indicating one or more codewords corresponding to UE feedback for the transmitted set of multiple reference signals and the respective OAM modes. The communications manager 1720 may be configured as or otherwise support a means for communicating with the UE, the second network node, or both based on the feedback report.

By including or configuring the communications manager 1720 in accordance with examples as described herein, the device 1705 may support techniques for improved communication reliability, more efficient utilization of communication, and improved coordination between devices by reducing or eliminating interference between backhaul OAM beams and access communications.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of OAM based codebook for access communications as described herein, or the processor 1740 and the memory 1730 may be otherwise configured to perform or support such operations.

Figure 18:
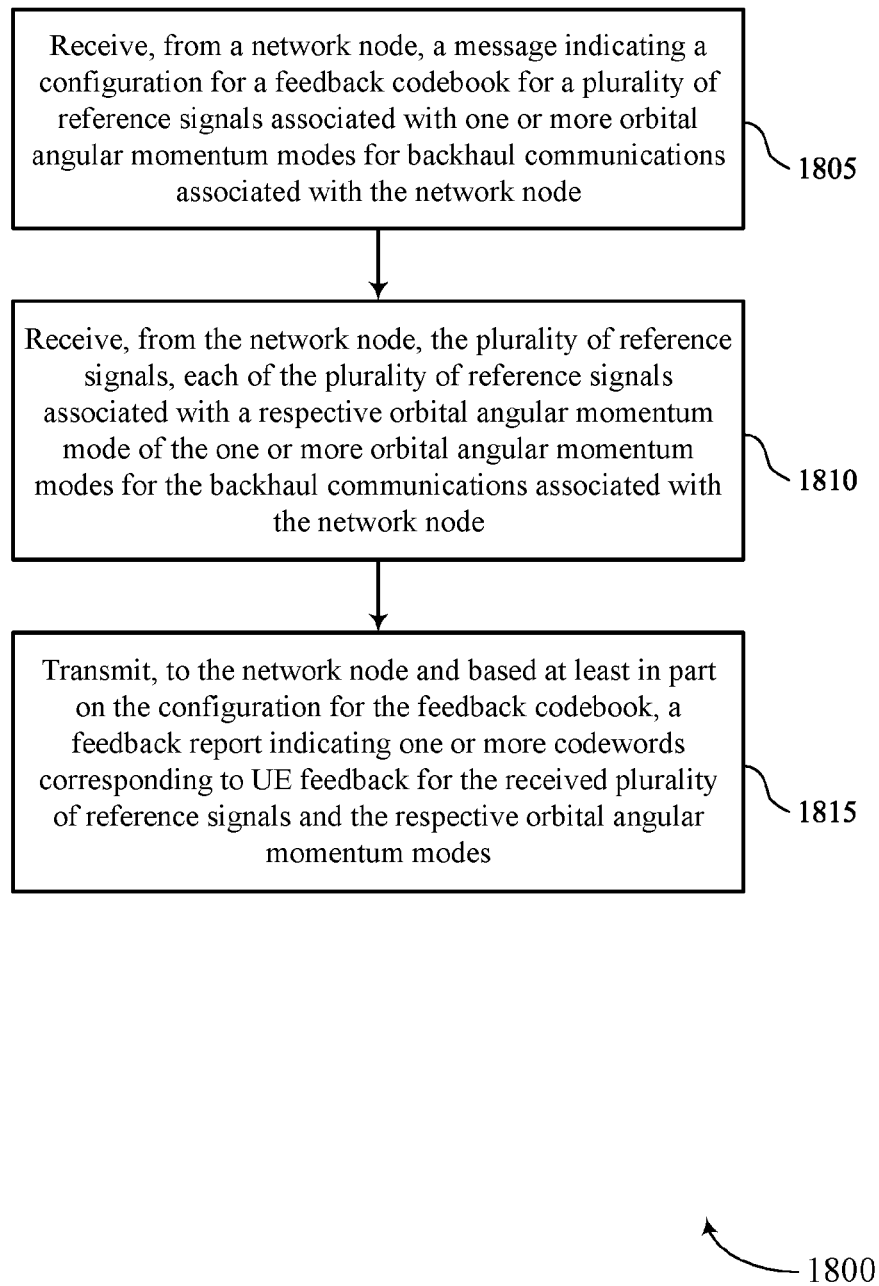
FIGS. 18 through 24 show flowcharts illustrating methods that support OAM based codebook for access communications in accordance with aspects of the present disclosure.

FIG. 18 shows a flowchart illustrating a method 1800 that supports OAM based codebook for access communications in accordance with aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1805, the method may include receiving, from a network node, a message indicating a configuration for a feedback codebook for a set of multiple reference signals associated with one or more OAM modes for backhaul communications associated with the network node. The operations of 1805 may be performed in accordance with examples as disclosed herein. In some examples, aspects of the operations of 1805 may be performed by a feedback codebook manager 1225 as described with reference to FIG. 12.

At 1810, the method may include receiving, from the network node, the set of multiple reference signals, each of the set of multiple reference signals associated with a respective OAM mode of the one or more OAM modes for the backhaul communications associated with the network node. The operations of 1810 may be performed in accordance with examples as disclosed herein. In some examples, aspects of the operations of 1810 may be performed by a reference signal manager 1230 as described with reference to FIG. 12.

At 1815, the method may include transmitting, to the network node and based on the configuration for the feedback codebook, a feedback report indicating one or more codewords corresponding to UE feedback for the received set of multiple reference signals and the respective OAM modes. The operations of 1815 may be performed in accordance with examples as disclosed herein. In some examples, aspects of the operations of 1815 may be performed by a feedback report manager 1235 as described with reference to FIG. 12.

Figure 19:
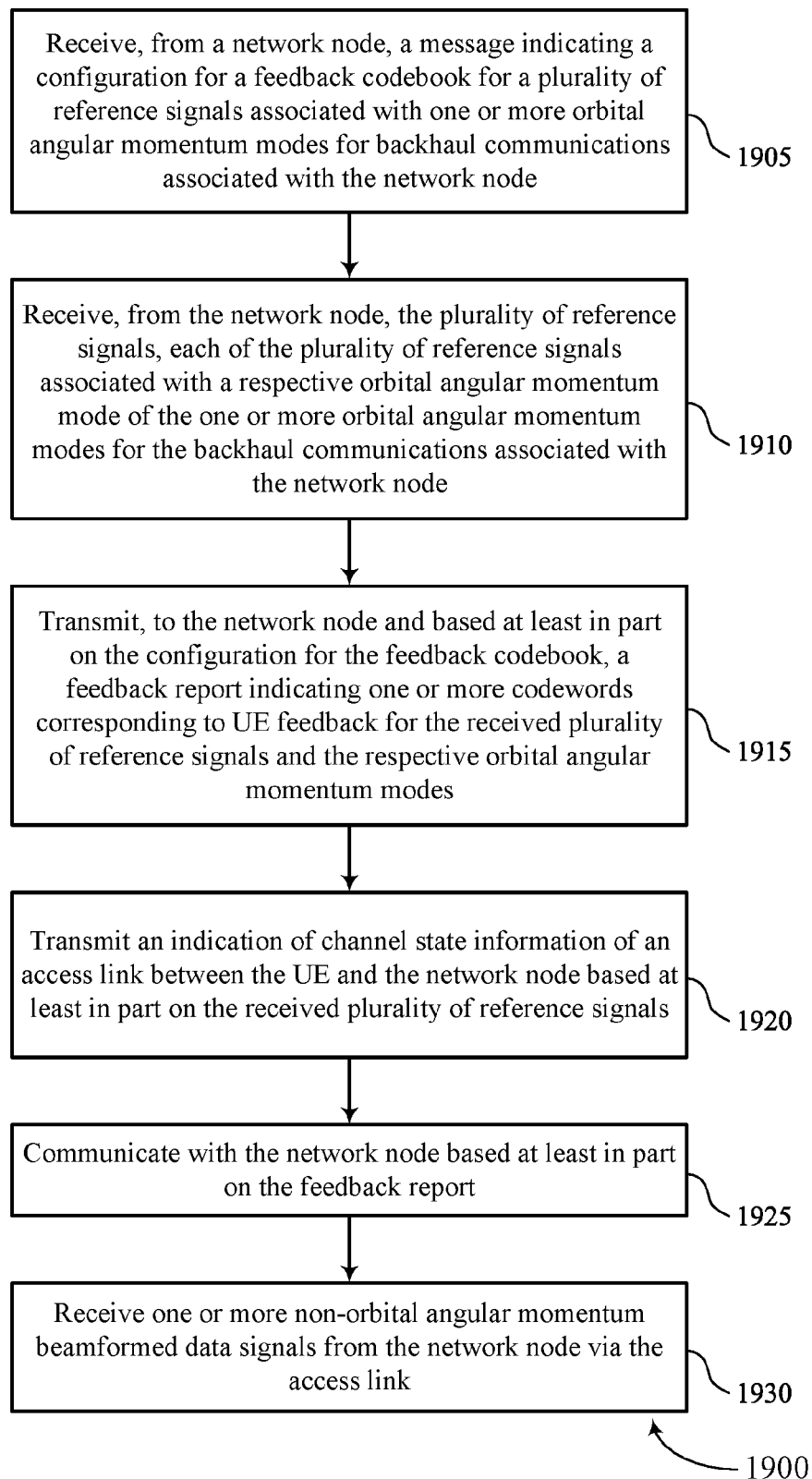

FIG. 19 shows a flowchart illustrating a method 1900 that supports OAM based codebook for access communications in accordance with aspects of the present disclosure. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1905, the method may include receiving, from a network node, a message indicating a configuration for a feedback codebook for a set of multiple reference signals associated with one or more OAM modes for backhaul communications associated with the network node. The operations of 1905 may be performed in accordance with examples as disclosed herein. In some examples, aspects of the operations of 1905 may be performed by a feedback codebook manager 1225 as described with reference to FIG. 12.

At 1910, the method may include receiving, from the network node, the set of multiple reference signals, each of the set of multiple reference signals associated with a respective OAM mode of the one or more OAM modes for the backhaul communications associated with the network node. The operations of 1910 may be performed in accordance with examples as disclosed herein. In some examples, aspects of the operations of 1910 may be performed by a reference signal manager 1230 as described with reference to FIG. 12.

At 1915, the method may include transmitting, to the network node and based on the configuration for the feedback codebook, a feedback report indicating one or more codewords corresponding to UE feedback for the received set of multiple reference signals and the respective OAM modes. The operations of 1915 may be performed in accordance with examples as disclosed herein. In some examples, aspects of the operations of 1915 may be performed by a feedback report manager 1235 as described with reference to FIG. 12.

At 1920, the method may include transmitting an indication of channel state information of an access link between the UE and the network node based on the received set of multiple reference signals. The operations of 1920 may be performed in accordance with examples as disclosed herein. In some examples, aspects of the operations of 1920 may be performed by an access link CSI manager 1240 as described with reference to FIG. 12.

At 1925, the method may include communicating with the network node based on the feedback report. The operations of 1925 may be performed in accordance with examples as disclosed herein. In some examples, aspects of the operations of 1925 may be performed by a communications manager 1250 as described with reference to FIG. 12.

At 1930, the method may include receiving one or more non-OAM beamformed data signals from the network node via the access link. The operations of 1930 may be performed in accordance with examples as disclosed herein. In some examples, aspects of the operations of 1930 may be performed by an access link manager 1255 as described with reference to FIG. 12.

Figure 20:
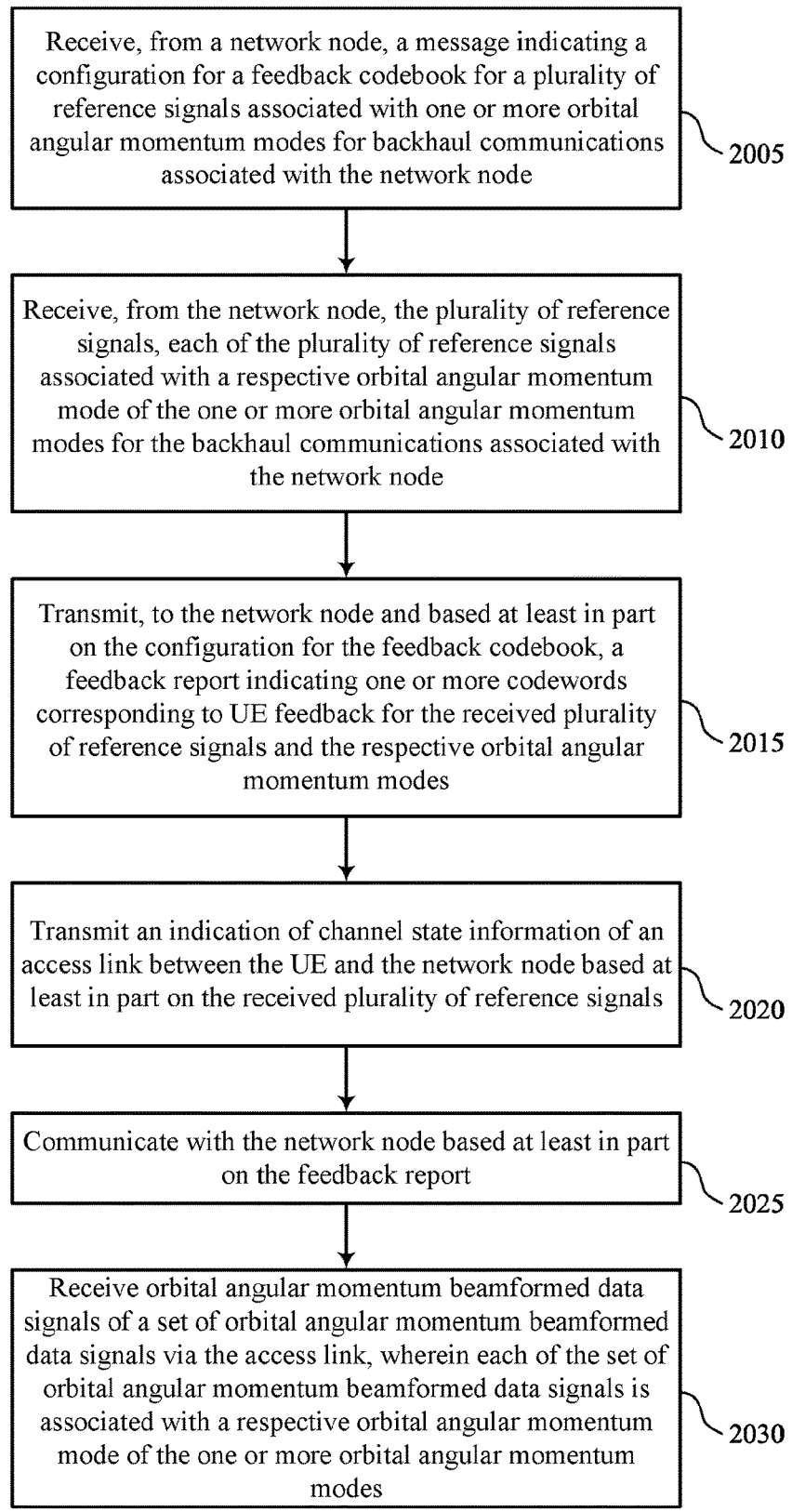

FIG. 20 shows a flowchart illustrating a method 2000 that supports OAM based codebook for access communications in accordance with aspects of the present disclosure. The operations of the method 2000 may be implemented by a UE or its components as described herein. For example, the operations of the method 2000 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2005, the method may include receiving, from a network node, a message indicating a configuration for a feedback codebook for a set of multiple reference signals associated with one or more OAM modes for backhaul communications associated with the network node. The operations of 2005 may be performed in accordance with examples as disclosed herein. In some examples, aspects of the operations of 2005 may be performed by a feedback codebook manager 1225 as described with reference to FIG. 12.

At 2010, the method may include receiving, from the network node, the set of multiple reference signals, each of the set of multiple reference signals associated with a respective OAM mode of the one or more OAM modes for the backhaul communications associated with the network node. The operations of 2010 may be performed in accordance with examples as disclosed herein. In some examples, aspects of the operations of 2010 may be performed by a reference signal manager 1230 as described with reference to FIG. 12.

At 2015, the method may include transmitting, to the network node and based on the configuration for the feedback codebook, a feedback report indicating one or more codewords corresponding to UE feedback for the received set of multiple reference signals and the respective OAM modes. The operations of 2015 may be performed in accordance with examples as disclosed herein. In some examples, aspects of the operations of 2015 may be performed by a feedback report manager 1235 as described with reference to FIG. 12.

At 2020, the method may include transmitting an indication of channel state information of an access link between the UE and the network node based on the received set of multiple reference signals. The operations of 2020 may be performed in accordance with examples as disclosed herein. In some examples, aspects of the operations of 2020 may be performed by an access link CSI manager 1240 as described with reference to FIG. 12.

At 2025, the method may include communicating with the network node based on the feedback report. The operations of 2025 may be performed in accordance with examples as disclosed herein. In some examples, aspects of the operations of 2025 may be performed by a communications manager 1250 as described with reference to FIG. 12.

At 2030, the method may include receiving OAM beamformed data signals of a set of OAM beamformed data signals via the access link, where each of the set of OAM beamformed data signals is associated with a respective OAM mode of the one or more OAM modes. The operations of 2030 may be performed in accordance with examples as disclosed herein. In some examples, aspects of the operations of 2030 may be performed by a OAM beam manager 1260 as described with reference to FIG. 12.

Figure 21:
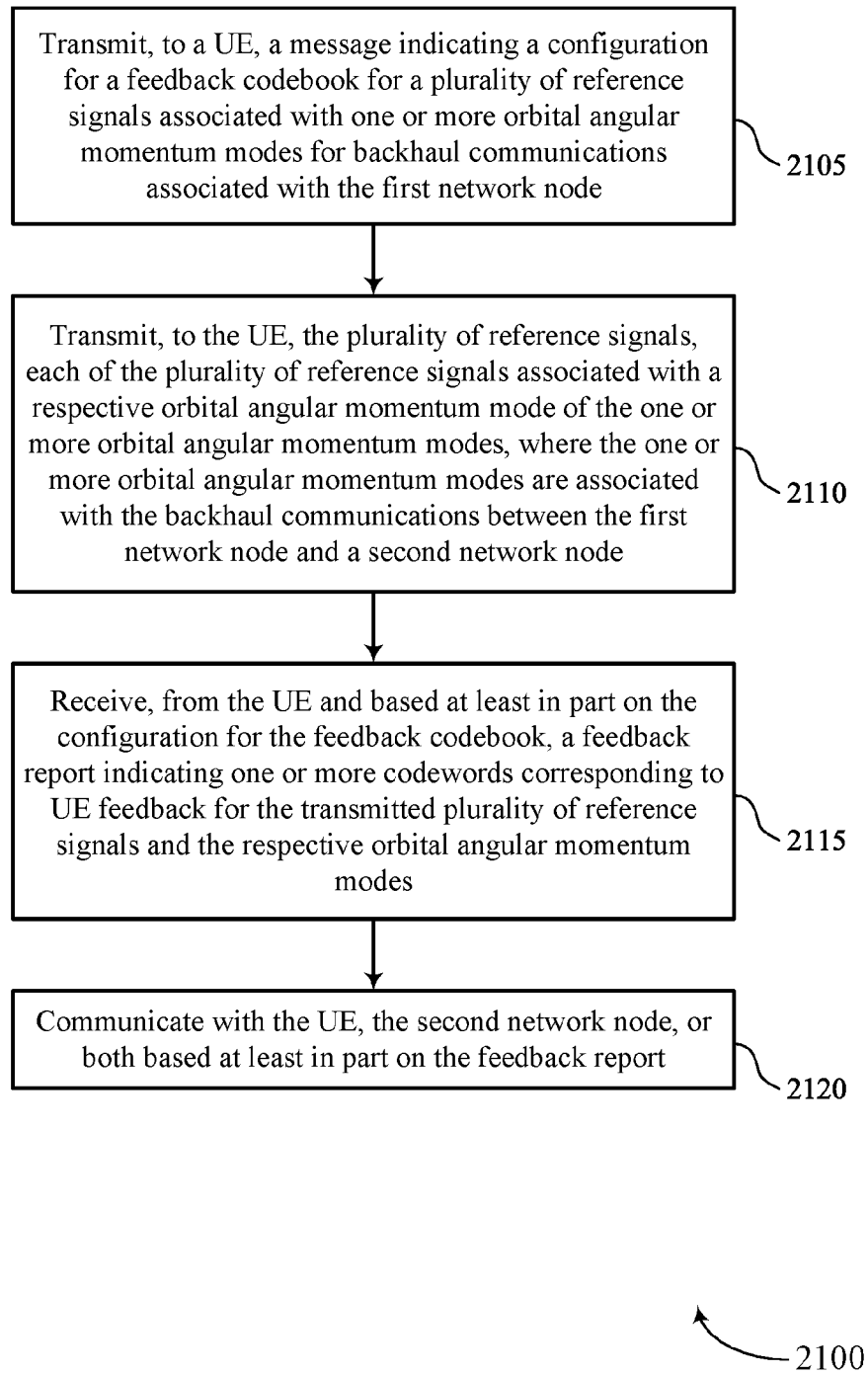

FIG. 21 shows a flowchart illustrating a method 2100 that supports OAM based codebook for access communications in accordance with aspects of the present disclosure. The operations of the method 2100 may be implemented by a base station or its components as described herein. For example, the operations of the method 2100 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2105, the method may include transmitting, to a UE, a message indicating a configuration for a feedback codebook for a set of multiple reference signals associated with one or more OAM modes for backhaul communications associated with the first network node. The operations of 2105 may be performed in accordance with examples as disclosed herein. In some examples, aspects of the operations of 2105 may be performed by a feedback codebook manager 1625 as described with reference to FIG. 16.

At 2110, the method may include transmitting, to the UE, the set of multiple reference signals, each of the set of multiple reference signals associated with a respective OAM mode of the one or more OAM modes, where the one or more OAM modes are associated with the backhaul communications between the first network node and a second network node. The operations of 2110 may be performed in accordance with examples as disclosed herein. In some examples, aspects of the operations of 2110 may be performed by a reference signal manager 1630 as described with reference to FIG. 16.

At 2115, the method may include receiving, from the UE and based on the configuration for the feedback codebook, a feedback report indicating one or more codewords corresponding to UE feedback for the transmitted set of multiple reference signals and the respective OAM modes. The operations of 2115 may be performed in accordance with examples as disclosed herein. In some examples, aspects of the operations of 2115 may be performed by a feedback report manager 1635 as described with reference to FIG. 16.

At 2120, the method may include communicating with the UE, the second network node, or both based on the feedback report. The operations of 2120 may be performed in accordance with examples as disclosed herein. In some examples, aspects of the operations of 2120 may be performed by a communications manager 1640 as described with reference to FIG. 16.

Figure 22:
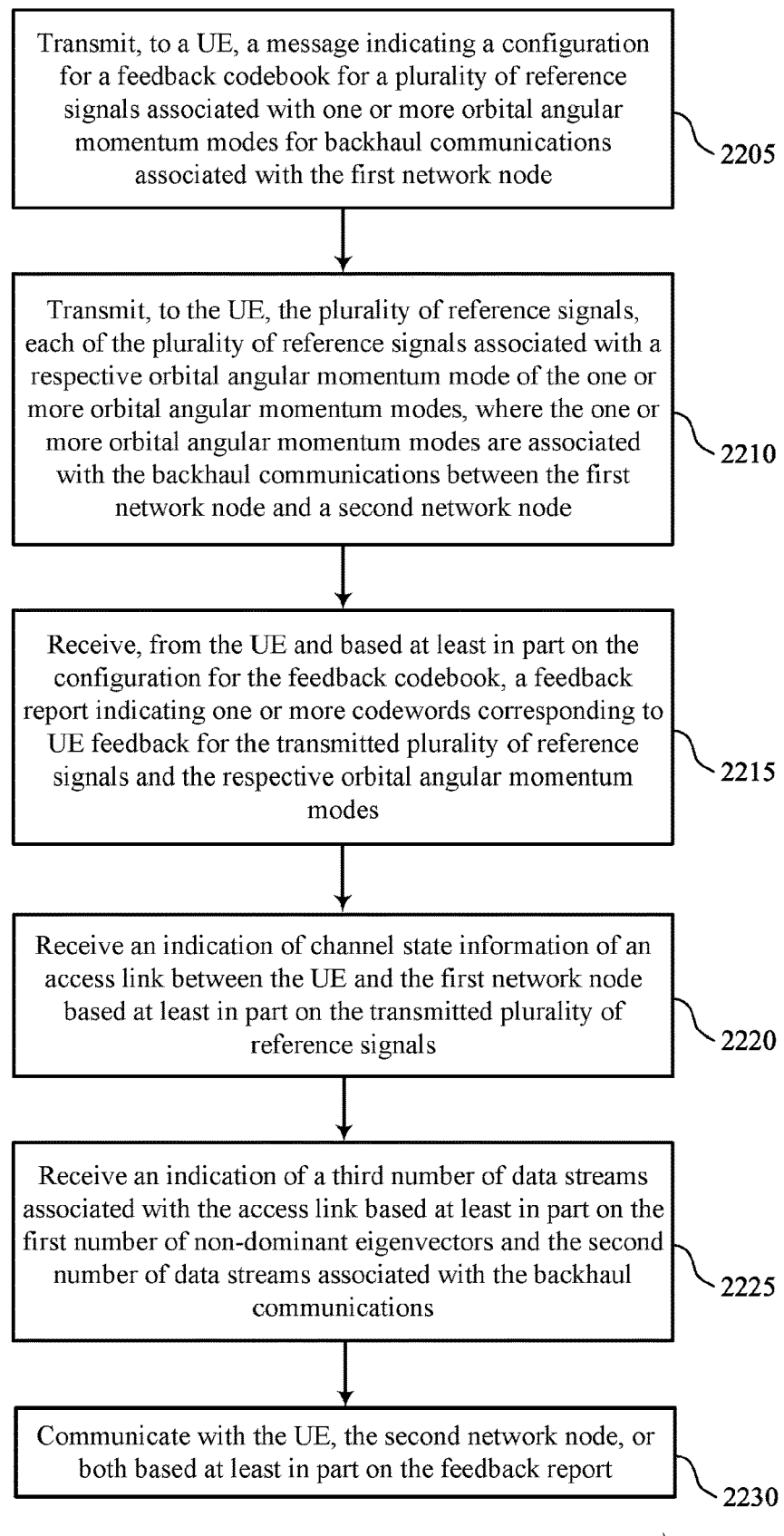

FIG. 22 shows a flowchart illustrating a method 2200 that supports OAM based codebook for access communications in accordance with aspects of the present disclosure. The operations of the method 2200 may be implemented by a base station or its components as described herein. For example, the operations of the method 2200 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2205, the method may include transmitting, to a UE, a message indicating a configuration for a feedback codebook for a set of multiple reference signals associated with one or more OAM modes for backhaul communications associated with the first network node. The operations of 2205 may be performed in accordance with examples as disclosed herein. In some examples, aspects of the operations of 2205 may be performed by a feedback codebook manager 1625 as described with reference to FIG. 16.

At 2210, the method may include transmitting, to the UE, the set of multiple reference signals, each of the set of multiple reference signals associated with a respective OAM mode of the one or more OAM modes, where the one or more OAM modes are associated with the backhaul communications between the first network node and a second network node. The operations of 2210 may be performed in accordance with examples as disclosed herein. In some examples, aspects of the operations of 2210 may be performed by a reference signal manager 1630 as described with reference to FIG. 16.

At 2215, the method may include receiving, from the UE and based on the configuration for the feedback codebook, a feedback report indicating one or more codewords corresponding to UE feedback for the transmitted set of multiple reference signals and the respective OAM modes. The operations of 2215 may be performed in accordance with examples as disclosed herein. In some examples, aspects of the operations of 2215 may be performed by a feedback report manager 1635 as described with reference to FIG. 16.

At 2220, the method may include receiving an indication of channel state information of an access link between the UE and the first network node based on the transmitted set of multiple reference signals. The operations of 2220 may be performed in accordance with examples as disclosed herein. In some examples, aspects of the operations of 2220 may be performed by an access link CSI manager 1645 as described with reference to FIG. 16.

At 2225, the method may include receiving an indication of a third number of data streams associated with the access link based on the first number of non-dominant eigenvectors and the second number of data streams associated with the backhaul communications. The operations of 2225 may be performed in accordance with examples as disclosed herein. In some examples, aspects of the operations of 2225 may be performed by an access link CSI manager 1645 as described with reference to FIG. 16.

At 2230, the method may include communicating with the UE, the second network node, or both based on the feedback report. The operations of 2230 may be performed in accordance with examples as disclosed herein. In some examples, aspects of the operations of 2230 may be performed by a communications manager 1640 as described with reference to FIG. 16.

Figure 23:
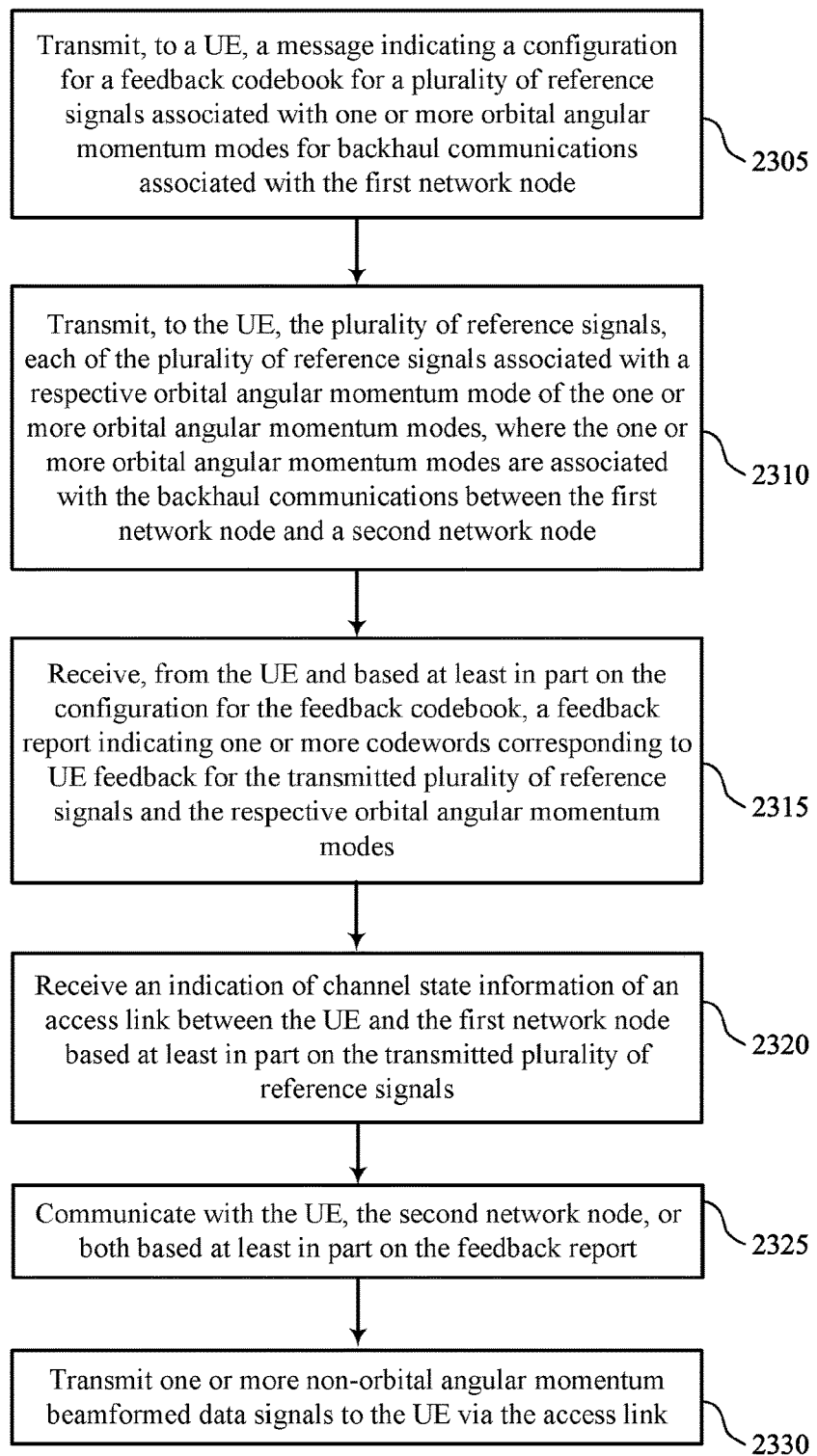

FIG. 23 shows a flowchart illustrating a method 2300 that supports OAM based codebook for access communications in accordance with aspects of the present disclosure. The operations of the method 2300 may be implemented by a base station or its components as described herein. For example, the operations of the method 2300 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2305, the method may include transmitting, to a UE, a message indicating a configuration for a feedback codebook for a set of multiple reference signals associated with one or more OAM modes for backhaul communications associated with the first network node. The operations of 2305 may be performed in accordance with examples as disclosed herein. In some examples, aspects of the operations of 2305 may be performed by a feedback codebook manager 1625 as described with reference to FIG. 16.

At 2310, the method may include transmitting, to the UE, the set of multiple reference signals, each of the set of multiple reference signals associated with a respective OAM mode of the one or more OAM modes, where the one or more OAM modes are associated with the backhaul communications between the first network node and a second network node. The operations of 2310 may be performed in accordance with examples as disclosed herein. In some examples, aspects of the operations of 2310 may be performed by a reference signal manager 1630 as described with reference to FIG. 16.

At 2315, the method may include receiving, from the UE and based on the configuration for the feedback codebook, a feedback report indicating one or more codewords corresponding to UE feedback for the transmitted set of multiple reference signals and the respective OAM modes. The operations of 2315 may be performed in accordance with examples as disclosed herein. In some examples, aspects of the operations of 2315 may be performed by a feedback report manager 1635 as described with reference to FIG. 16.

At 2320, the method may include receiving an indication of channel state information of an access link between the UE and the first network node based on the transmitted set of multiple reference signals. The operations of 2320 may be performed in accordance with examples as disclosed herein. In some examples, aspects of the operations of 2320 may be performed by an access link CSI manager 1645 as described with reference to FIG. 16.

At 2325, the method may include communicating with the UE, the second network node, or both based on the feedback report. The operations of 2325 may be performed in accordance with examples as disclosed herein. In some examples, aspects of the operations of 2325 may be performed by a communications manager 1640 as described with reference to FIG. 16.

At 2330, the method may include transmitting one or more non-OAM beamformed data signals to the UE via the access link. The operations of 2330 may be performed in accordance with examples as disclosed herein. In some examples, aspects of the operations of 2330 may be performed by an access link manager 1650 as described with reference to FIG. 16.

Figure 24:
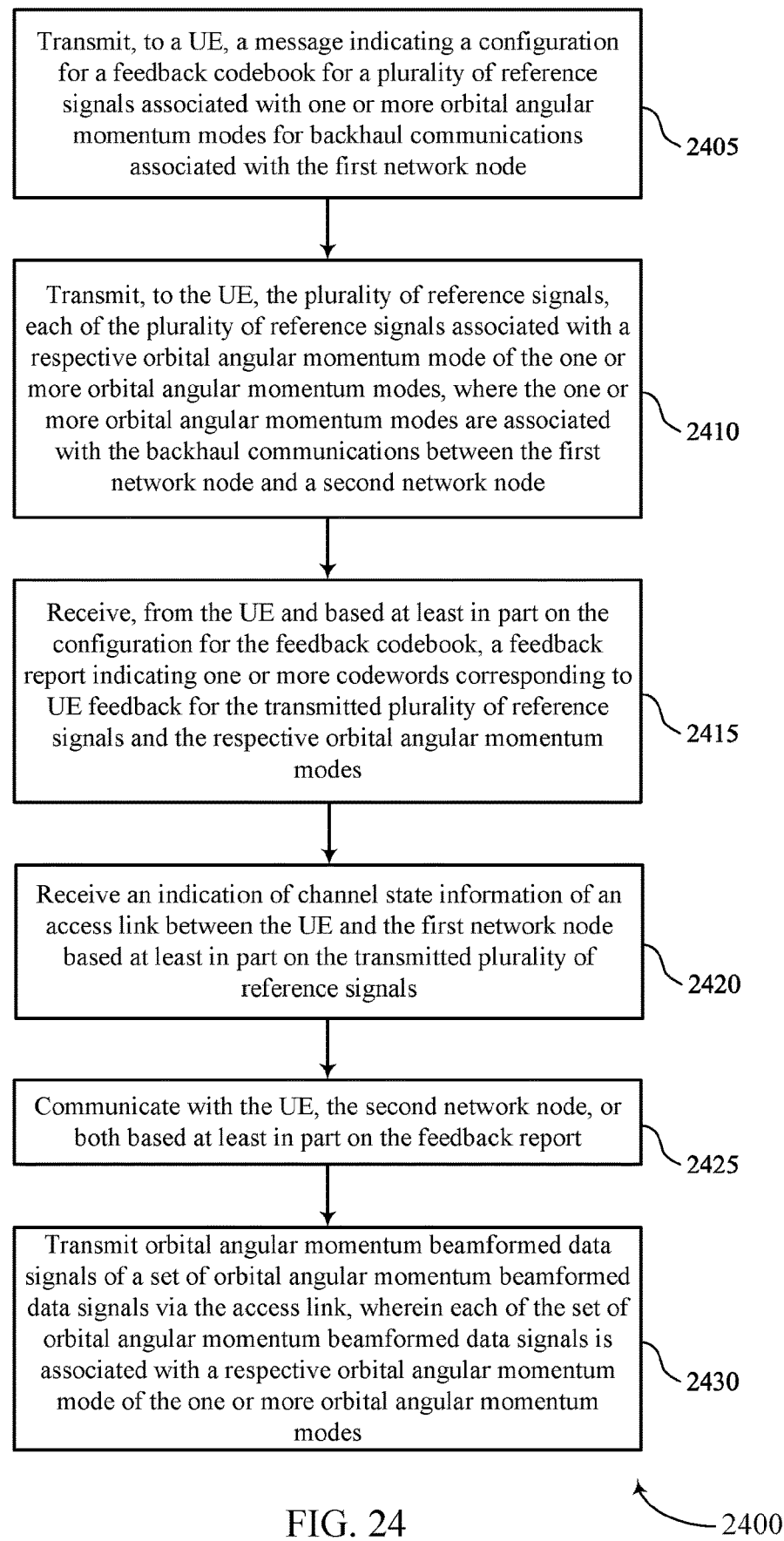

FIG. 24 shows a flowchart illustrating a method 2400 that supports OAM based codebook for access communications in accordance with aspects of the present disclosure. The operations of the method 2400 may be implemented by a base station or its components as described herein. For example, the operations of the method 2400 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2405, the method may include transmitting, to a UE, a message indicating a configuration for a feedback codebook for a set of multiple reference signals associated with one or more OAM modes for backhaul communications associated with the first network node. The operations of 2405 may be performed in accordance with examples as disclosed herein. In some examples, aspects of the operations of 2405 may be performed by a feedback codebook manager 1625 as described with reference to FIG. 16.

At 2410, the method may include transmitting, to the UE, the set of multiple reference signals, each of the set of multiple reference signals associated with a respective OAM mode of the one or more OAM modes, where the one or more OAM modes are associated with the backhaul communications between the first network node and a second network node. The operations of 2410 may be performed in accordance with examples as disclosed herein. In some examples, aspects of the operations of 2410 may be performed by a reference signal manager 1630 as described with reference to FIG. 16.

At 2415, the method may include receiving, from the UE and based on the configuration for the feedback codebook, a feedback report indicating one or more codewords corresponding to UE feedback for the transmitted set of multiple reference signals and the respective OAM modes. The operations of 2415 may be performed in accordance with examples as disclosed herein. In some examples, aspects of the operations of 2415 may be performed by a feedback report manager 1635 as described with reference to FIG. 16.

At 2420, the method may include receiving an indication of channel state information of an access link between the UE and the first network node based on the transmitted set of multiple reference signals. The operations of 2420 may be performed in accordance with examples as disclosed herein. In some examples, aspects of the operations of 2420 may be performed by an access link CSI manager 1645 as described with reference to FIG. 16.

At 2425, the method may include communicating with the UE, the second network node, or both based on the feedback report. The operations of 2425 may be performed in accordance with examples as disclosed herein. In some examples, aspects of the operations of 2425 may be performed by a communications manager 1640 as described with reference to FIG. 16.

At 2430, the method may include transmitting OAM beamformed data signals of a set of OAM beamformed data signals via the access link, where each of the set of OAM beamformed data signals is associated with a respective OAM mode of the one or more OAM modes. The operations of 2430 may be performed in accordance with examples as disclosed herein. In some examples, aspects of the operations of 2430 may be performed by a OAM beam manager 1655 as described with reference to FIG. 16.

The following provides an overview of aspects of the present disclosure:

Aspect 1: A method for wireless communications at a UE, comprising: receiving, from a network node, a message indicating a configuration for a feedback codebook for a plurality of reference signals associated with one or more orbital angular momentum modes for backhaul communications associated with the network node; receiving, from the network node, the plurality of reference signals, each of the plurality of reference signals associated with a respective orbital angular momentum mode of the one or more orbital angular momentum modes for the backhaul communications associated with the network node; and transmitting, to the network node and based at least in part on the configuration for the feedback codebook, a feedback report indicating one or more codewords corresponding to UE feedback for the received plurality of reference signals and the respective orbital angular momentum modes.

Aspect 2: The method of aspect 1, wherein transmitting the feedback report comprises: transmitting an indication of channel state information of an access link between the UE and the network node based at least in part on the received plurality of reference signals.

Aspect 3: The method of aspect 2, wherein the one or more codewords are associated with a reduction in interference the one or more orbital angular momentum modes associated with the backhaul communications for the network node to the access link.

Aspect 4: The method of aspect 3, wherein the one or more codewords are associated with a first number of non-dominant eigenvectors of a channel response matrix associated with the plurality of reference signals.

Aspect 5: The method of aspect 4, wherein the first number of non-dominant eigenvectors is equal to a second number of data streams associated with the backhaul communications.

Aspect 6: The method of aspect 5, wherein transmitting the feedback report comprises: transmitting an indication of a third number of data streams associated with the access link based at least in part on the first number of non-dominant eigenvectors and the second number of data streams associated with the backhaul communications.

Aspect 7: The method of aspect 6, wherein transmitting the feedback report comprises: transmitting the feedback report indicating the one or more codewords associated with the first number of non-dominant eigenvectors corresponding to a wideband channel associated with the plurality of reference signals.

Aspect 8: The method of any of aspects 6 through 7, wherein transmitting the feedback report comprises: transmitting the feedback report indicating the one or more codewords associated with the first number of non-dominant eigenvectors per sub-band associated with the plurality of reference signals.

Aspect 9: The method of any of aspects 2 through 8, further comprising: communicating with the network node based at least in part on the feedback report.

Aspect 10: The method of aspect 9, wherein communicating with the network node comprises: receiving one or more non-orbital angular momentum beamformed data signals from the network node via the access link.

Aspect 11: The method of aspect 10, wherein receiving one or more non-orbital angular momentum beamformed data signals from the network node via the access link comprises: receiving, from the network node, a physical downlink shared channel message based at least in part on a quasi co-location information, wherein the quasi co-location information indicates an interference by the one or more codewords.

Aspect 12: The method of any of aspects 9 through 11, wherein communicating with the network node comprises: receiving orbital angular momentum beamformed data signals of a set of orbital angular momentum beamformed data signals via the access link, wherein each of the set of orbital angular momentum beamformed data signals is associated with a respective orbital angular momentum mode of the one or more orbital angular momentum modes.

Aspect 13: The method of aspect 12, wherein the orbital angular momentum modes associated with the orbital angular momentum beamformed data signals received via the access link are different from orbital angular momentum modes associated with orbital angular momentum beamformed data signals received via a backhaul link.

Aspect 14: The method of any of aspects 12 through 13, wherein transmitting the feedback report comprises: transmitting an indication of a first number of data streams associated with the access link, wherein the one or more codewords comprise a second number of dominant eigenvectors of a channel response matrix associated with the plurality of reference signals, wherein the second number of dominant eigenvectors is equal to the first number of data streams.

Aspect 15: The method of aspect 14, wherein transmitting the feedback report comprises: transmitting the feedback report indicating the one or more codewords comprising the second number of dominant eigenvectors corresponding to a wideband channel associated with the plurality of reference signals.

Aspect 16: The method of any of aspects 14 through 15, wherein transmitting the feedback report comprises: transmitting the feedback report indicating the one or more codewords comprising the second number of dominant eigenvectors per sub-band associated with the plurality of reference signals.

Aspect 17: The method of any of aspects 12 through 16, further comprising: communicating with the network node based at least in part on the orbital angular momentum modes associated with the orbital angular momentum beamformed data signals received via the access link, wherein at least one of the orbital angular momentum modes associated with the orbital angular momentum beamformed data signals received via the access link is associated with an orthogonal frequency division modulation waveform.

Aspect 18: The method of aspect 17, wherein the one or more codewords are associated with data streams of the orbital angular momentum modes associated with the orbital angular momentum beamformed data signals received via the access link and the orthogonal frequency division modulation waveform.

Aspect 19: The method of any of aspects 1 through 18, further comprising: receiving, with the message, one or more parameters associated with the feedback codebook, the one or more parameters comprising a number of transmitter antennas, a set of orbital angular momentum modes, a radius of a transmitter antenna array of the network node, a wavelength associated with the backhaul communications, or a combination thereof; and generating the one or more codewords based at least in part on the one or more parameters.

Aspect 20: The method of any of aspects 1 through 19, further comprising: receiving, with the message, at least one of a maximum number of data streams in access link or a number of data streams in backhaul link.

Aspect 21: The method of any of aspects 1 through 20, wherein the one or more codewords are based at least in part on a first angle between a first possible direction of the UE and a transmission panel boresight direction of the network node, a second angle between a projection of a second possible direction of the UE onto a transmission panel of the network node and an x-axis direction of the transmission panel of the network node, a radius of a transmitter antenna array of the network node, a wavelength associated with the backhaul communications, and an orbital angular momentum mode.

Aspect 22: The method of any of aspects 1 through 21, further comprising: the one or more codewords are based at least in part on one or more Bessel functions; input values of the one or more Bessel functions include at least one of an angle between a first possible direction of the UE and a transmission panel boresight direction of the network node, a radius of a transmitter antenna array of the network node, and a wavelength associated with the backhaul communications; and orders of the one or more Bessel functions are equal to orders of the one or more orbital angular momentum modes for the backhaul communications.

Aspect 23: The method of any of aspects 1 through 22, wherein the feedback codebook is based on a quantization of an angle between a first possible direction of the UE and a transmission panel boresight direction of the network node and the quantization of the angle between a projection of a second possible direction of the UE onto a transmission panel of the network node and an x-axis direction of the transmission panel of the network node.

Aspect 24: A method for wireless communications at a first network node, comprising: transmitting, to a UE, a message indicating a configuration for a feedback codebook for a plurality of reference signals associated with one or more orbital angular momentum modes for backhaul communications associated with the first network node; transmitting, to the UE, the plurality of reference signals, each of the plurality of reference signals associated with a respective orbital angular momentum mode of the one or more orbital angular momentum modes, where the one or more orbital angular momentum modes are associated with the backhaul communications between the first network node and a second network node; receiving, from the UE and based at least in part on the configuration for the feedback codebook, a feedback report indicating one or more codewords corresponding to UE feedback for the transmitted plurality of reference signals and the respective orbital angular momentum modes; and communicating with the UE, the second network node, or both based at least in part on the feedback report.

Aspect 25: The method of aspect 24, wherein receiving the feedback report comprises: receiving an indication of channel state information of an access link between the UE and the first network node based at least in part on the transmitted plurality of reference signals.

Aspect 26: The method of aspect 25, wherein the one or more codewords are associated with a reduction in interference the one or more orbital angular momentum modes associated with the backhaul communications for the first network node to the access link.

Aspect 27: The method of aspect 26, wherein the one or more codewords are associated with a first number of non-dominant eigenvectors of a channel response matrix associated with the plurality of reference signals.

Aspect 28: The method of aspect 27, wherein the first number of non-dominant eigenvectors is equal to a second number of data streams associated with the backhaul communications.

Aspect 29: The method of aspect 28, wherein receiving the feedback report comprises: receiving an indication of a third number of data streams associated with the access link based at least in part on the first number of non-dominant eigenvectors and the second number of data streams associated with the backhaul communications.

Aspect 30: The method of aspect 29, wherein receiving the feedback report comprises: receiving the feedback report indicating the one or more codewords associated with the first number of non-dominant eigenvectors corresponding to a wideband channel associated with the plurality of reference signals.

Aspect 31: The method of any of aspects 29 through 30, wherein receiving the feedback report comprises: receiving the feedback report indicating the one or more codewords associated with the first number of non-dominant eigenvectors per sub-band associated with the plurality of reference signals.

Aspect 32: The method of any of aspects 25 through 31, wherein communicating with the UE comprises: transmitting one or more non-orbital angular momentum beamformed data signals to the UE via the access link.

Aspect 33: The method of aspect 32, wherein transmitting one or more non-orbital angular momentum beamformed data signals from the first network node via the access link comprises: transmitting a physical downlink shared channel message based at least in part on a quasi co-location information, wherein the quasi co-location information indicates an interference by the one or more codewords.

Aspect 34: The method of any of aspects 25 through 33, wherein communicating with the UE comprises: transmitting orbital angular momentum beamformed data signals of a set of orbital angular momentum beamformed data signals via the access link, wherein each of the set of orbital angular momentum beamformed data signals is associated with a respective orbital angular momentum mode of the one or more orbital angular momentum modes.

Aspect 35: The method of aspect 34, wherein the orbital angular momentum modes associated with the orbital angular momentum beamformed data signals received via the access link are different from orbital angular momentum modes associated with orbital angular momentum beamformed data signals received via a backhaul link.

Aspect 36: The method of any of aspects 34 through 35, wherein receiving the feedback report comprises: receiving an indication of a first number of data streams associated with the access link, wherein the one or more codewords comprise a second number of dominant eigenvectors of a channel response matrix associated with the plurality of reference signals, wherein the second number of dominant eigenvectors is equal to the first number of data streams.

Aspect 37: The method of aspect 36, wherein receiving the feedback report comprises: receiving the feedback report indicating the one or more codewords comprising the second number of dominant eigenvectors corresponding to a wideband channel associated with the plurality of reference signals.

Aspect 38: The method of any of aspects 36 through 37, wherein receiving the feedback report comprises: receiving the feedback report indicating the one or more codewords comprising the second number of dominant eigenvectors per sub-band associated with the plurality of reference signals.

Aspect 39: The method of any of aspects 34 through 38, wherein communicating with the UE comprises: communicating with the UE based at least in part on the orbital angular momentum modes associated with the orbital angular momentum beamformed data signals received via the access link, wherein at least one of the orbital angular momentum modes associated with the orbital angular momentum beamformed data signals received via the access link is associated with an orthogonal frequency division modulation waveform.

Aspect 40: The method of aspect 39, wherein the one or more codewords are associated with data streams of the orbital angular momentum modes associated with the orbital angular momentum beamformed data signals received via the access link and the orthogonal frequency division modulation waveform.

Aspect 41: The method of any of aspects 24 through 40, further comprising: transmitting, with the message, one or more parameters associated with the feedback codebook, the one or more parameters comprising a number of transmitter antennas, a set of orbital angular momentum modes, a radius of a transmitter antenna array of the first network node, a wavelength associated with the backhaul communications, or a combination thereof.

Aspect 42: The method of any of aspects 24 through 41, further comprising: transmitting, with the message, at least one of a maximum number of data streams in an access link or a number of data streams in a backhaul link.

Aspect 43: The method of any of aspects 24 through 42, wherein the one or more codewords are based at least in part on a first angle between a first possible direction of the UE and a transmission panel boresight direction of the first network node, a second angle between a projection of a possible direction of the UE onto a transmission panel of the first network node and an x-axis direction of the transmission panel of the first network node, a radius of a transmitter antenna array of the first network node, a wavelength associated with the backhaul communications, and an orbital angular momentum mode.

Aspect 44: The method of any of aspects 24 through 43, further comprising: the one or more codewords are based at least in part on one or more Bessel functions; input values of the one or more Bessel functions include at least one of an angle between a first possible direction of the UE and a transmission panel boresight direction of the first network node, a radius of a transmitter antenna array of the first network node, and a wavelength associated with the backhaul communications; and orders of the one or more Bessel functions are equal to orders of the one or more orbital angular momentum modes for the backhaul communications.

Aspect 45: The method of any of aspects 24 through 44, wherein the feedback codebook is based on a quantization of an angle between a first possible direction of the UE and a transmission panel boresight direction of the first network node and the quantization of the angle between a projection of a possible direction of the UE onto a transmission panel of the first network node and an x-axis direction of the transmission panel of the first network node.

Aspect 46: An apparatus for wireless communications at a UE, comprising a processor; memory coupled with the processor; and instructions stored in the memory and executable by the processor to cause the apparatus to perform a method of any of aspects 1 through 23.

Aspect 47: An apparatus for wireless communications at a UE, comprising at least one means for performing a method of any of aspects 1 through 23.

Aspect 48: A non-transitory computer-readable medium storing code for wireless communications at a UE, the code comprising instructions executable by a processor to perform a method of any of aspects 1 through 23.

Aspect 49: An apparatus for wireless communications at a first network node, comprising a processor; memory coupled with the processor; and instructions stored in the memory and executable by the processor to cause the apparatus to perform a method of any of aspects 24 through 45.

Aspect 50: An apparatus for wireless communications at a first network node, comprising at least one means for performing a method of any of aspects 24 through 45.

Aspect 51: A non-transitory computer-readable medium storing code for wireless communications at a first network node, the code comprising instructions executable by a processor to perform a method of any of aspects 24 through 45.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a network node, a message indicating a configuration for a feedback codebook for a plurality of reference signals associated with one or more orbital angular momentum modes for backhaul communications associated with the network node;
   receiving, from the network node, the plurality of reference signals, each of the plurality of reference signals associated with a respective orbital angular momentum mode of the one or more orbital angular momentum modes for the backhaul communications associated with the network node; and
   transmitting, to the network node and based at least in part on the configuration for the feedback codebook, a feedback report indicating one or more codewords corresponding to UE feedback for the received plurality of reference signals and the respective orbital angular momentum modes.

2. The method of claim 1, wherein transmitting the feedback report comprises:
   transmitting an indication of channel state information of an access link between the UE and the network node based at least in part on the received plurality of reference signals.

3. The method of claim 2, wherein the one or more codewords are associated with a reduction in interference the one or more orbital angular momentum modes associated with the backhaul communications for the network node to the access link.

4. The method of claim 3, wherein the one or more codewords are associated with a first number of non-dominant eigenvectors of a channel response matrix associated with the plurality of reference signals.

5. The method of claim 4, wherein the first number of non-dominant eigenvectors is equal to a second number of data streams associated with the backhaul communications.

6. The method of claim 5, wherein transmitting the feedback report comprises:
   transmitting an indication of a third number of data streams associated with the access link based at least in part on the first number of non-dominant eigenvectors and the second number of data streams associated with the backhaul communications.

7. The method of claim 6, wherein transmitting the feedback report comprises:
   transmitting the feedback report indicating the one or more codewords associated with the first number of non-dominant eigenvectors corresponding to a wideband channel associated with the plurality of reference signals.

8. The method of claim 6, wherein transmitting the feedback report comprises:
   transmitting the feedback report indicating the one or more codewords associated with the first number of non-dominant eigenvectors per sub-band associated with the plurality of reference signals.

9. The method of claim 2, further comprising:
   communicating with the network node based at least in part on the feedback report.

10. The method of claim 9, wherein communicating with the network node comprises:
    receiving one or more non-orbital angular momentum beamformed data signals from the network node via the access link.

11. The method of claim 10, wherein receiving one or more non-orbital angular momentum beamformed data signals from the network node via the access link comprises:
    receiving, from the network node, a physical downlink shared channel message based at least in part on a quasi co-location information, wherein the quasi co-location information indicates an interference by the one or more codewords.

12. The method of claim 9, wherein communicating with the network node comprises:
    receiving orbital angular momentum beamformed data signals of a set of orbital angular momentum beamformed data signals via the access link, wherein each of the set of orbital angular momentum beamformed data signals is associated with a respective orbital angular momentum mode of the one or more orbital angular momentum modes.

13. The method of claim 12, wherein the orbital angular momentum modes associated with the orbital angular momentum beamformed data signals received via the access link are different from orbital angular momentum modes associated with orbital angular momentum beamformed data signals received via a backhaul link.

14. The method of claim 12, wherein transmitting the feedback report comprises:
    transmitting an indication of a first number of data streams associated with the access link, wherein the one or more codewords comprise a second number of dominant eigenvectors of a channel response matrix associated with the plurality of reference signals, wherein the second number of dominant eigenvectors is equal to the first number of data streams.

15. The method of claim 14, wherein transmitting the feedback report comprises:
    transmitting the feedback report indicating the one or more codewords comprising the second number of dominant eigenvectors corresponding to a wideband channel associated with the plurality of reference signals.

16. The method of claim 14, wherein transmitting the feedback report comprises:
   transmitting the feedback report indicating the one or more codewords comprising the second number of dominant eigenvectors per sub-band associated with the plurality of reference signals.

17. The method of claim 12, further comprising:
   communicating with the network node based at least in part on the orbital angular momentum modes associated with the orbital angular momentum beamformed data signals received via the access link, wherein at least one of the orbital angular momentum modes associated with the orbital angular momentum beamformed data signals received via the access link is associated with an orthogonal frequency division modulation waveform.

18. The method of claim 17, wherein the one or more codewords are associated with data streams of the orbital angular momentum modes associated with the orbital angular momentum beamformed data signals received via the access link and the orthogonal frequency division modulation waveform.

19. The method of claim 1, further comprising:
   receiving, with the message, one or more parameters associated with the feedback codebook, the one or more parameters comprising a number of transmitter antennas, a set of orbital angular momentum modes, a radius of a transmitter antenna array of the network node, a wavelength associated with the backhaul communications, or a combination thereof, and
   generating the one or more codewords based at least in part on the one or more parameters.

20. The method of claim 1, further comprising:
   receiving, with the message, at least one of a maximum number of data streams in access link or a number of data streams in backhaul link.

21. The method of claim 1, wherein the one or more codewords are based at least in part on a first angle between a first possible direction of the UE and a transmission panel boresight direction of the network node, a second angle between a projection of a second possible direction of the UE onto a transmission panel of the network node and an x-axis direction of the transmission panel of the network node, a radius of a transmitter antenna array of the network node, a wavelength associated with the backhaul communications, and an orbital angular momentum mode.

22. The method of claim 1, wherein:
   the one or more codewords are based at least in part on one or more Bessel functions;
   input values of the one or more Bessel functions include at least one of an angle between a first possible direction of the UE and a transmission panel boresight direction of the network node, a radius of a transmitter antenna array of the network node, and a wavelength associated with the backhaul communications; and
   orders of the one or more Bessel functions are equal to orders of the one or more orbital angular momentum modes for the backhaul communications.

23. The method of claim 1, wherein the feedback codebook is based on a quantization of an angle between a first possible direction of the UE and a transmission panel boresight direction of the network node and the quantization of the angle between a projection of a second possible direction of the UE onto a transmission panel of the network node and an x-axis direction of the transmission panel of the network node.

24. A method for wireless communications at a first network node, comprising:
   transmitting, to a user equipment (UE), a message indicating a configuration for a feedback codebook for a plurality of reference signals associated with one or more orbital angular momentum modes for backhaul communications associated with the first network node;
   transmitting, to the UE, the plurality of reference signals, each of the plurality of reference signals associated with a respective orbital angular momentum mode of the one or more orbital angular momentum modes, where the one or more orbital angular momentum modes are associated with the backhaul communications between the first network node and a second network node;
   receiving, from the UE and based at least in part on the configuration for the feedback codebook, a feedback report indicating one or more codewords corresponding to UE feedback for the transmitted plurality of reference signals and the respective orbital angular momentum modes; and
   communicating with the UE, the second network node, or both based at least in part on the feedback report.

25. The method of claim 24, wherein receiving the feedback report comprises:
   receiving an indication of channel state information of an access link between the UE and the first network node based at least in part on the transmitted plurality of reference signals.

26. The method of claim 25, wherein the one or more codewords are associated with a reduction in interference the one or more orbital angular momentum modes associated with the backhaul communications for the first network node to the access link.

27. The method of claim 26, wherein the one or more codewords are associated with a first number of non-dominant eigenvectors of a channel response matrix associated with the plurality of reference signals.

28. The method of claim 27, wherein the first number of non-dominant eigenvectors is equal to a second number of data streams associated with the backhaul communications.

29. An apparatus for wireless communications at a user equipment (UE), comprising:
   a processor;
   memory coupled with the processor; and
   instructions stored in the memory and executable by the processor to cause the apparatus to:
      receive, from a network node, a message indicating a configuration for a feedback codebook for a plurality of reference signals associated with one or more orbital angular momentum modes for backhaul communications associated with the network node;
      receive, from the network node, the plurality of reference signals, each of the plurality of reference signals associated with a respective orbital angular momentum mode of the one or more orbital angular momentum modes for the backhaul communications associated with the network node; and
      transmit, to the network node and based at least in part on the configuration for the feedback codebook, a feedback report indicating one or more codewords corresponding to UE feedback for the received plurality of reference signals and the respective orbital angular momentum modes.

30. An apparatus for wireless communications at a first network node, comprising:
- a processor;
- memory coupled with the processor; and
- instructions stored in the memory and executable by the processor to cause the apparatus to:
  - transmit, to a user equipment (UE), a message indicating a configuration for a feedback codebook for a plurality of reference signals associated with one or more orbital angular momentum modes for backhaul communications associated with the first network node;
  - transmit, to the UE, the plurality of reference signals, each of the plurality of reference signals associated with a respective orbital angular momentum mode of the one or more orbital angular momentum modes, where the one or more orbital angular momentum modes are associated with the backhaul communications between the first network node and a second network node;
  - receive, from the UE and based at least in part on the configuration for the feedback codebook, a feedback report indicating one or more codewords corresponding to UE feedback for the transmitted plurality of reference signals and the respective orbital angular momentum modes; and
  - communicate with the UE, the second network node, or both based at least in part on the feedback report.

* * * * *